United States Patent
Byrne et al.

(10) Patent No.: US 11,732,680 B2
(45) Date of Patent: *Aug. 22, 2023

(54) EVAPORATIVE FUEL VAPOR EMISSION CONTROL SYSTEMS

(71) Applicant: Ingevity South Carolina, LLC, North Charleston, SC (US)

(72) Inventors: Timothy M. Byrne, North Charleston, SC (US); Laurence H. Hiltzik, Charleston, SC (US); Marta Leon Garcia, Mount Pleasant, SC (US); Cameron I. Thomson, Charleston, SC (US)

(73) Assignee: INGEVITY SOUTH CAROLINA, LLC, North Charleston, SC (US)

( * ) Notice: Subject to any disclaimer, the term of this patent is extended or adjusted under 35 U.S.C. 154(b) by 270 days.

This patent is subject to a terminal disclaimer.

(21) Appl. No.: 17/178,449

(22) Filed: Feb. 18, 2021

(65) Prior Publication Data

US 2021/0172402 A1 Jun. 10, 2021

Related U.S. Application Data

(62) Division of application No. 16/888,323, filed on May 29, 2020, now Pat. No. 10,968,870, which is a
(Continued)

(51) Int. Cl.
*B01D 53/02* (2006.01)
*F02M 25/08* (2006.01)
*B01D 53/04* (2006.01)

(52) U.S. Cl.
CPC ..... *F02M 25/0854* (2013.01); *B01D 53/0415* (2013.01); *B01D 53/0438* (2013.01);
(Continued)

(58) Field of Classification Search
CPC ........ B01D 2253/102; B01D 2253/104; B01D 2253/106; B01D 2253/108;
(Continued)

(56) References Cited

U.S. PATENT DOCUMENTS

| 4,448,594 A | 5/1984 | Kozawa |
| 4,684,382 A | 8/1987 | Abu-Isa |

(Continued)

FOREIGN PATENT DOCUMENTS

| BR | PI 0816516-5 | 4/2009 |
| CN | 1583968 A | 2/2005 |

(Continued)

OTHER PUBLICATIONS

U.S. Appl. No. 16/012,637, filed Jun. 19, 2018, U.S. Pat. No. 10,704,501.

(Continued)

*Primary Examiner* — Christopher P Jones
(74) *Attorney, Agent, or Firm* — Bryan D. Zerhusen, Esq.; Nicholas R. Herrel, Esq.; Cantor Colburn LLP

(57) ABSTRACT

The present disclosure describes an evaporative emission control canister system that includes: one or more canisters comprising at least one vent-side particulate adsorbent volume comprising a particulate adsorbent having microscopic pores with a diameter of less than about 100 nm; macroscopic pores having a diameter of about 100-100,000 nm; and a ratio of a volume of the macroscopic pores to a volume of the microscopic pores that is greater than about 150%, and having a retentivity of about 1.0 g/dL or less. The system may further include a high butane working capacity adsorbent. The disclosure also describes a method for reducing emissions in an evaporative emission control system.

26 Claims, 38 Drawing Sheets

Related U.S. Application Data division of application No. 16/012,637, filed on Jun. 19, 2018, now Pat. No. 10,704,501.

(60) Provisional application No. 62/685,174, filed on Jun. 14, 2018, provisional application No. 62/521,912, filed on Jun. 19, 2017.

(52) U.S. Cl.
CPC .. *B01D 2253/102* (2013.01); *B01D 2253/104* (2013.01); *B01D 2253/106* (2013.01); *B01D 2253/108* (2013.01); *B01D 2253/11* (2013.01); *B01D 2253/1124* (2013.01); *B01D 2253/308* (2013.01); *B01D 2253/311* (2013.01); *B01D 2253/34* (2013.01); *B01D 2253/3425* (2013.01); *B01D 2257/708* (2013.01); *B01D 2257/7022* (2013.01); *B01D 2259/40086* (2013.01); *B01D 2259/4516* (2013.01)

(58) Field of Classification Search
CPC ........ B01D 2253/11; B01D 2253/1124; B01D 2253/308; B01D 2253/311; B01D 2253/34; B01D 2253/3425; B01D 2257/7022; B01D 2257/708; B01D 2259/40086; B01D 2259/41; B01D 2259/4145; B01D 2259/4516; B01D 53/02; B01D 53/0407; B01D 53/0415; B01D 53/0438
See application file for complete search history.

(56) References Cited

U.S. PATENT DOCUMENTS

| | | | |
|---|---|---|---|
| 4,894,072 A | 1/1990 | Turner et al. | |
| 5,204,310 A | 4/1993 | Tolles et al. | |
| 5,207,808 A | 5/1993 | Haruta et al. | |
| 5,324,703 A | 6/1994 | Mccue et al. | |
| 5,395,428 A | 3/1995 | Blucher et al. | |
| 5,456,236 A | 10/1995 | Wakashiro et al. | |
| 5,456,237 A | 10/1995 | Yamazaki et al. | |
| 5,460,136 A | 10/1995 | Yamazaki et al. | |
| 5,477,836 A | 12/1995 | Hyodo et al. | |
| 5,914,457 A | 6/1999 | Itakura et al. | |
| 5,957,114 A | 9/1999 | Johnson et al. | |
| 6,098,601 A | 8/2000 | Reddy | |
| 6,136,075 A | 10/2000 | Bragg et al. | |
| 6,230,693 B1 | 5/2001 | Meiller et al. | |
| 6,279,548 B1 | 8/2001 | Reddy | |
| 6,540,815 B1 | 4/2003 | Hiltzik et al. | |
| 6,573,212 B2 | 6/2003 | Mccrae et al. | |
| RE38,844 E | 10/2005 | Hiltzik et al. | |
| 7,186,291 B2 | 3/2007 | Wolff | |
| 7,305,974 B2 | 12/2007 | Nakano | |
| 7,507,278 B2 | 3/2009 | Makino et al. | |
| 7,666,507 B2 | 2/2010 | Ishikawa et al. | |
| 8,015,965 B2 | 9/2011 | Yamasaki | |
| 8,814,987 B2 | 8/2014 | Tschantz et al. | |
| 9,174,195 B2 | 11/2015 | Yamasaki et al. | |
| 9,322,368 B2 | 4/2016 | Arase et al. | |
| 9,732,649 B2 | 8/2017 | Hiltzik et al. | |
| 2006/0288872 A1 | 12/2006 | Nakano et al. | |
| 2007/0078056 A1 | 4/2007 | Abe et al. | |
| 2009/0013973 A1 | 1/2009 | Yamasaki et al. | |
| 2009/0209418 A1 | 8/2009 | Watanabe et al. | |
| 2010/0107581 A1 | 5/2010 | Mochizuki et al. | |
| 2013/0269521 A1 | 10/2013 | Nishita et al. | |
| 2014/0124385 A1 | 5/2014 | Yamasaki et al. | |
| 2015/0184621 A1 | 7/2015 | Arase et al. | |
| 2018/0207611 A1 | 7/2018 | Byrne et al. | |

FOREIGN PATENT DOCUMENTS

| | | |
|---|---|---|
| EP | 1113163 A2 | 7/2001 |
| JP | 2010-031711 A | 2/2010 |
| JP | 2009019572 A | 8/2010 |
| JP | 2011132903 A | 7/2011 |
| KR | 20020012826 A | 2/2002 |
| WO | 199201585 A1 | 2/1992 |
| WO | 200162367 A1 | 8/2001 |
| WO | 2004110928 A1 | 12/2004 |
| WO | WO 2014/059190 | 4/2014 |
| WO | WO 2015/053815 A1 | 4/2015 |

OTHER PUBLICATIONS

U.S. Appl. No. 16/888,323, filed May 29, 2020, U.S. Pat. No. 10,968,870.
International Search Report and Written Opinion for PCT/US2018/038370, dated Oct. 12, 2018.
International Preliminary Report on Patentability for PCT/US2018/038370, dated Dec. 24, 2019.
International Preliminary Report on Patentability for PCT/US2017/043267, dated Jul. 30, 2019.
International Search Report and Written Opinion for PCT/US2017/043267, dated Oct. 30, 2017.
SAE—Technical Paper Series 2000-01-0895, "Studies on Carbon Canisters to Satisfy LEVII EVAP Regulations", Mar. 6-9, 2000.
File History for U.S. Appl. No. 16/656,643, filed Jul. 21, 2017.
U.S. Appl. No. 16/888,323, filed May 29, 2020, US 2018-0363594 A1.

FIG. 3A
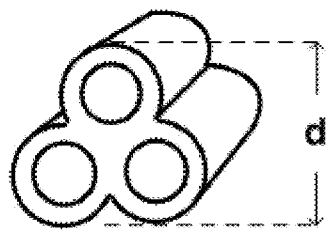
FIG. 3B
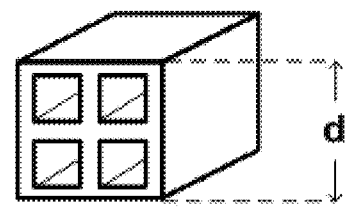
FIG. 3C
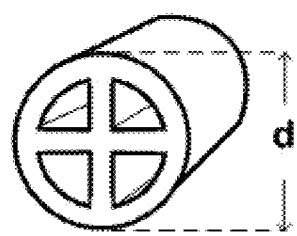
FIG. 3D
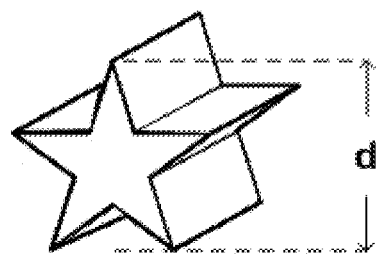
FIG. 3E
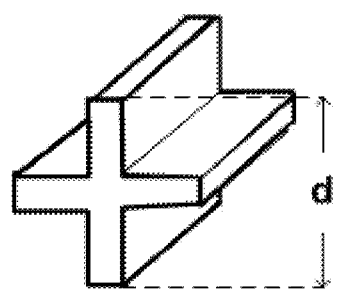
FIG. 3F
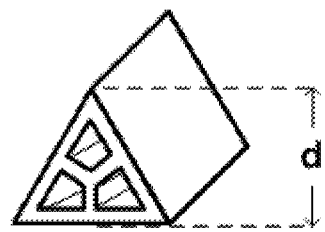
FIG. 3G
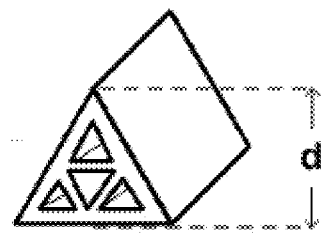
FIG. 3H1

FIG. 3H2    FIG. 3I
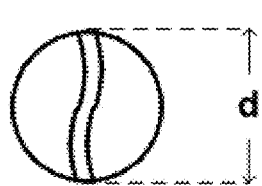
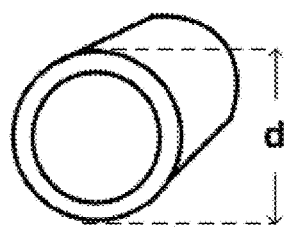
FIG. 4
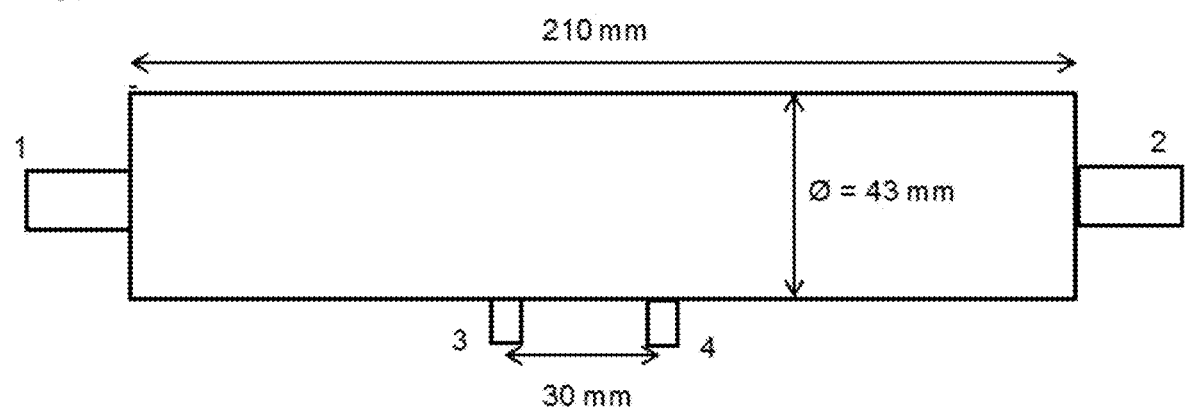

FIG. 5
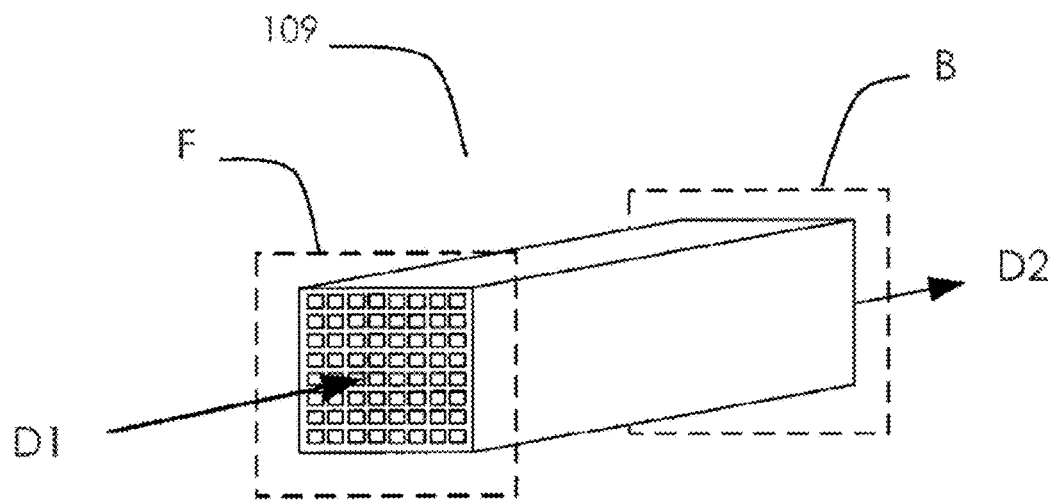
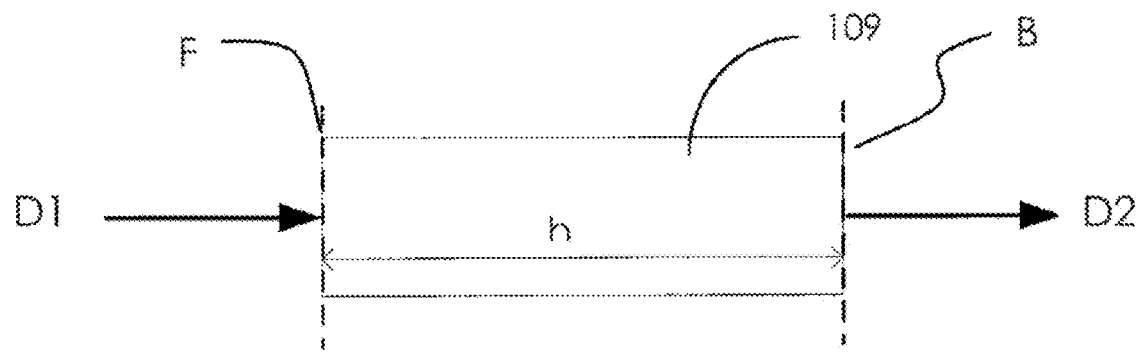
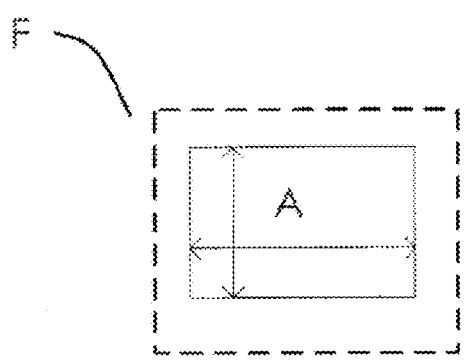

FIG. 6
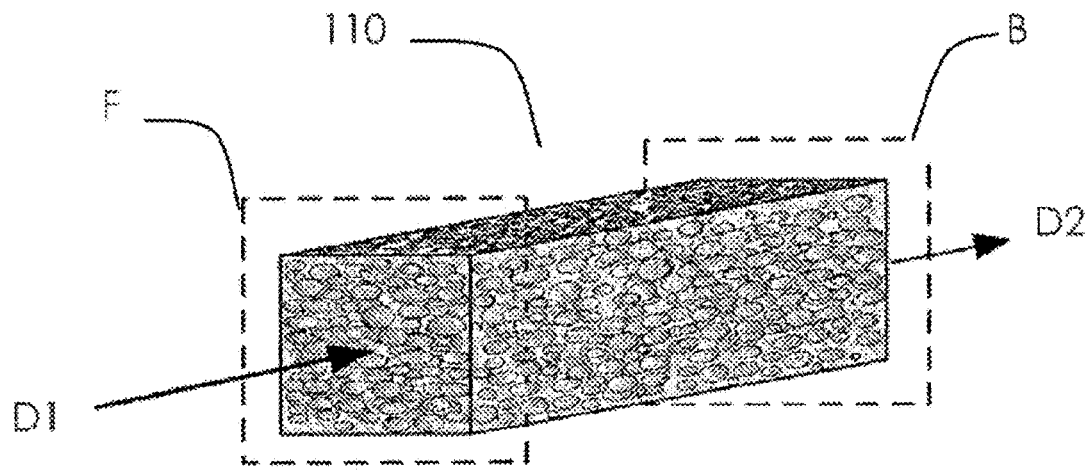
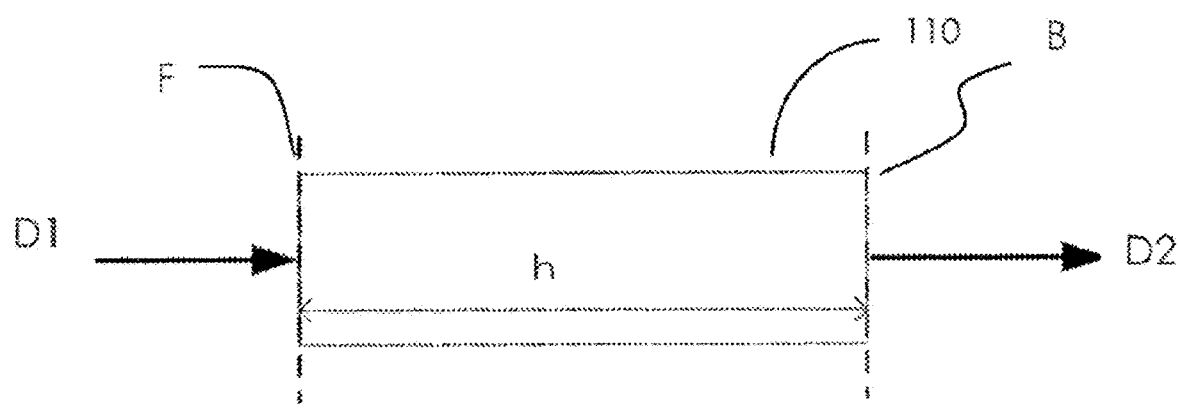
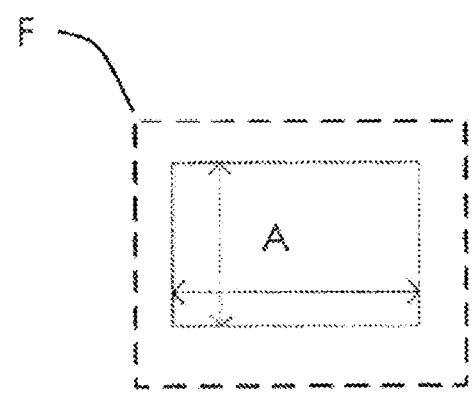

FIG. 7
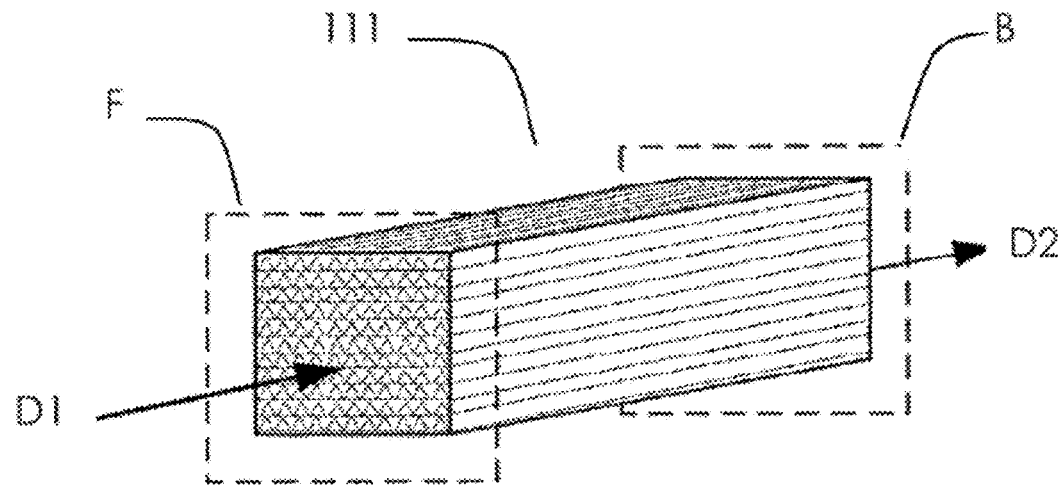
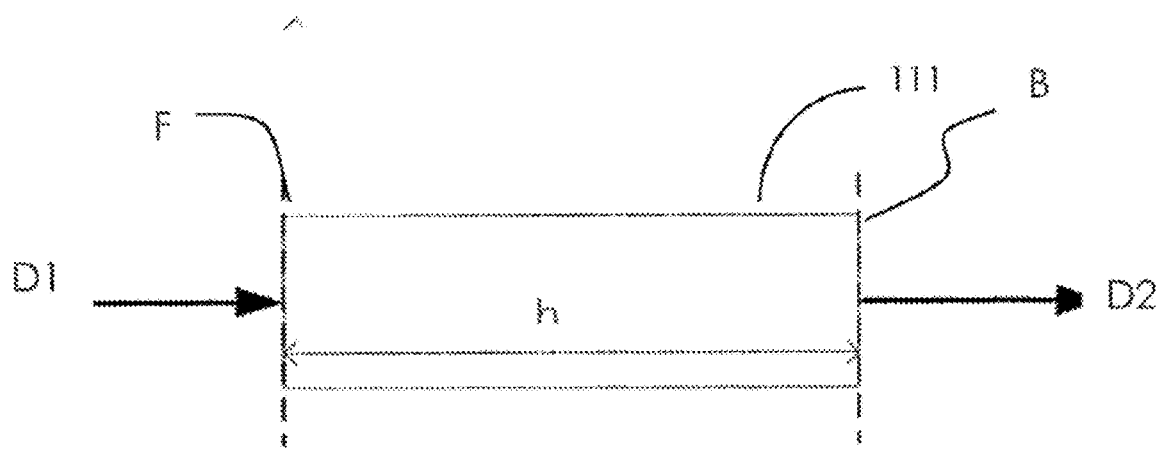
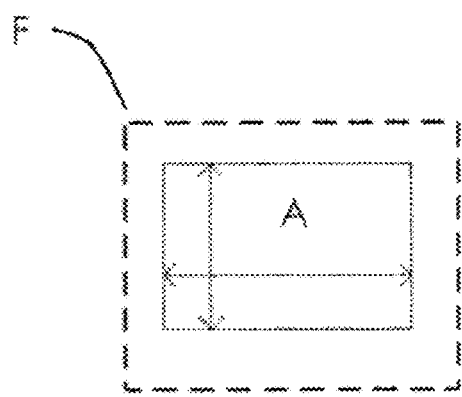

FIG. 8
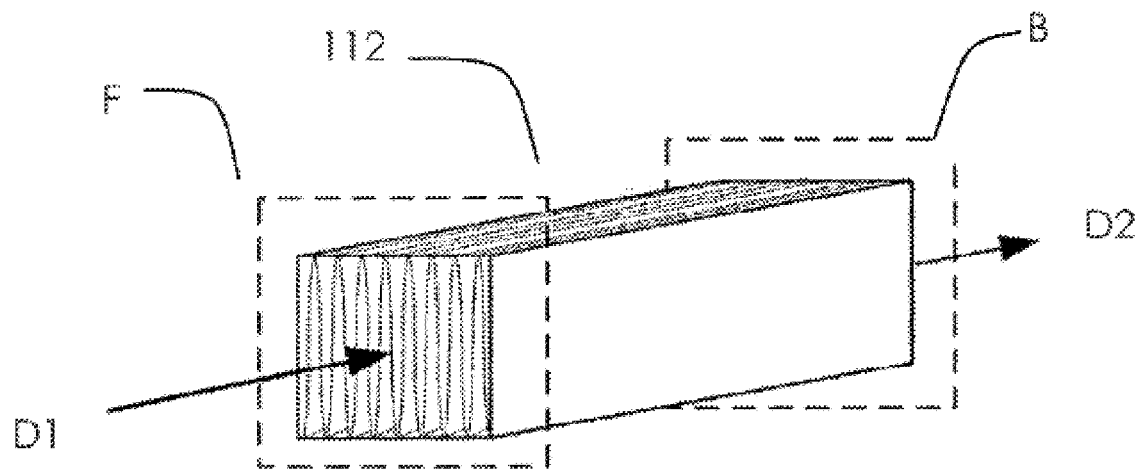
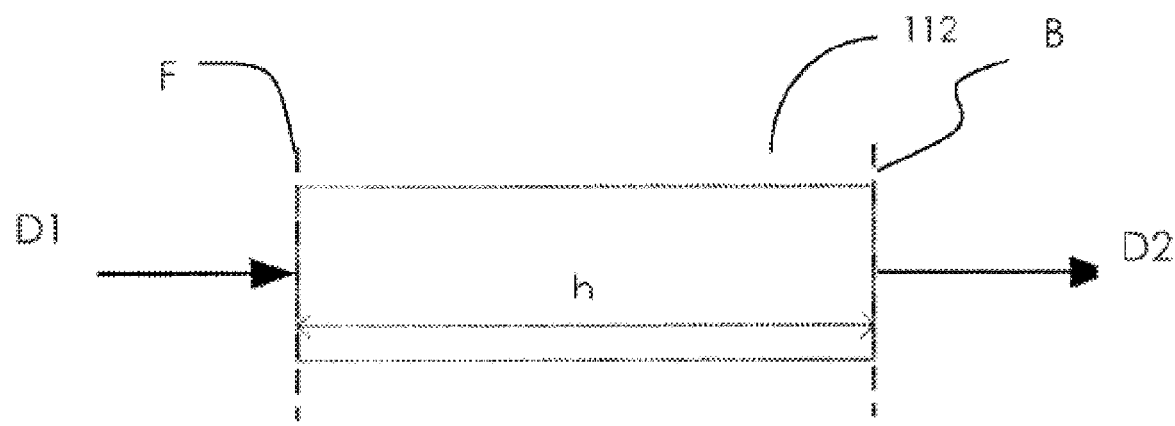
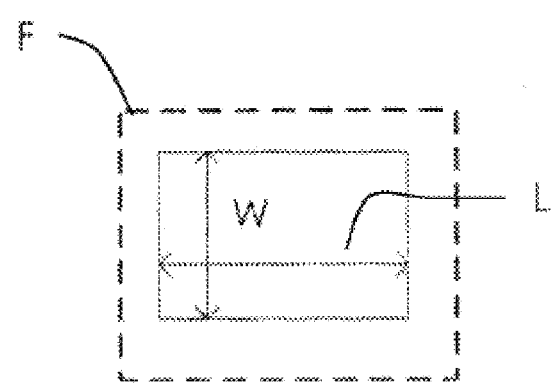

FIG. 11
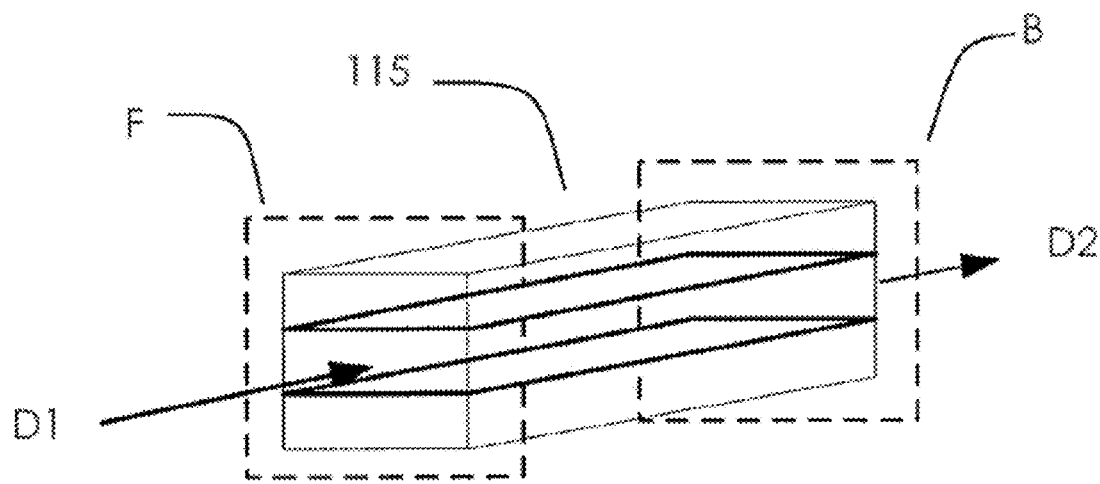
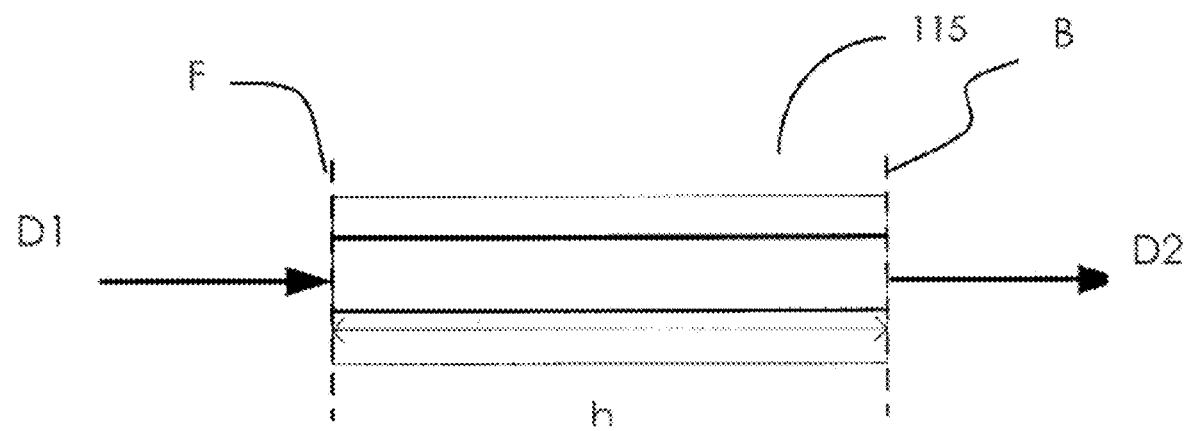
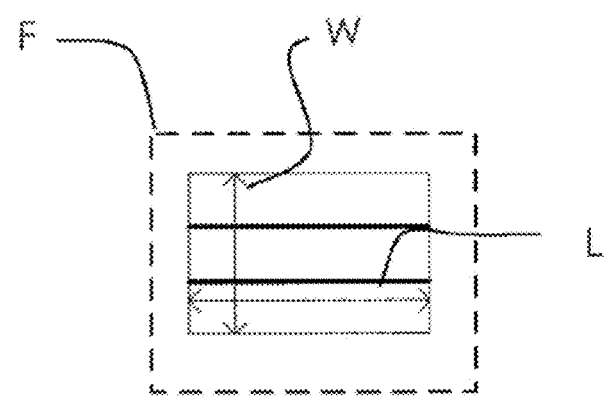

FIG. 12
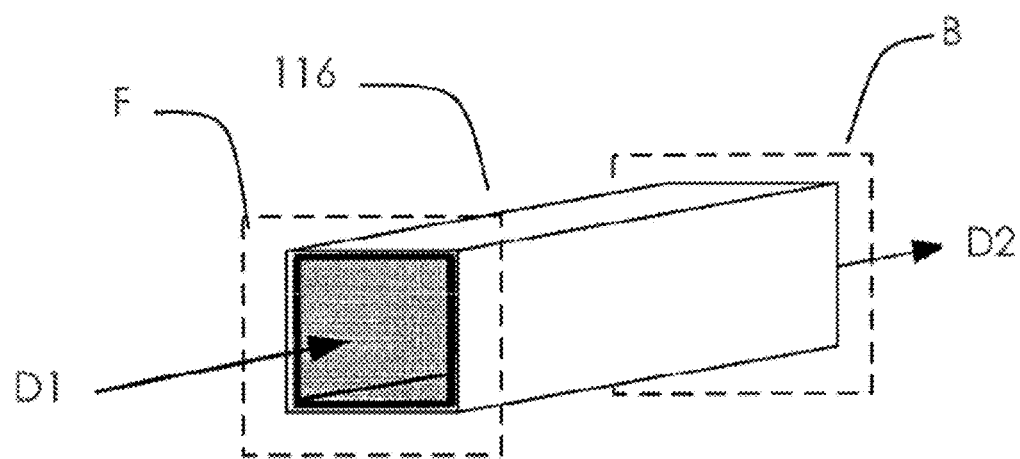
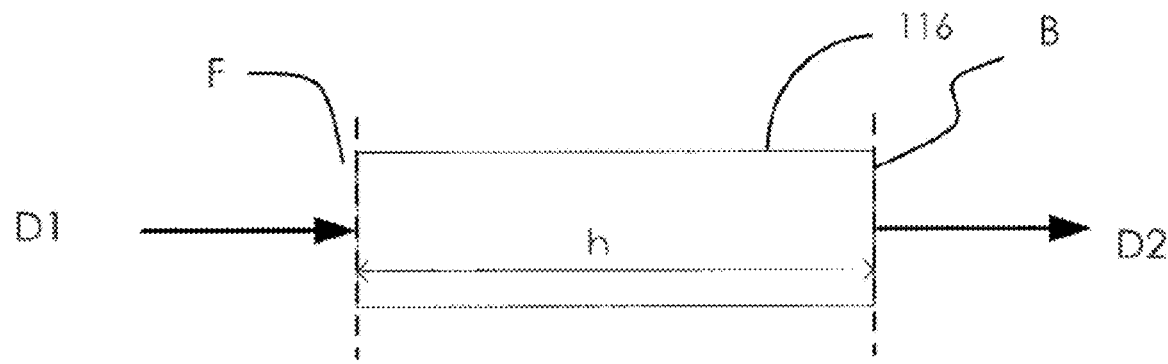
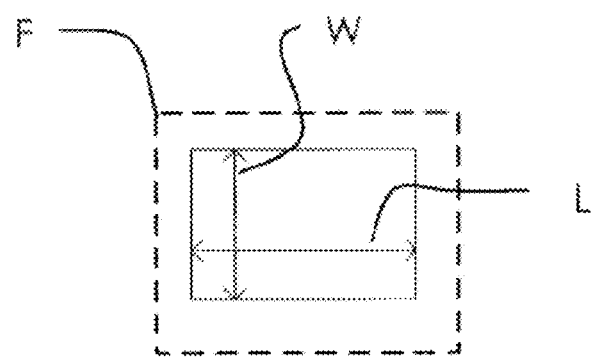

FIG. 14
Table 1. Main canister configurations

| Main Canister Type | 1 | 2 | 3 | 4 | 5 | 6 | 7 | 8 | 9 |
|---|---|---|---|---|---|---|---|---|---|
| Fuel Side Total Nominal Volume (L) | 2.1 | 1.8 | 1.8 | 2.1 | 2.1 | 2.7 | 1.8 | 1.8 | 1.8 |
| Adsorbent Type | Particulate | Particulate | Particulate | Particulate | Particulate | Particulate | Particulate | Particulate | Particulate |
| Nominal Incremental Adsorption Capacity (g/L) | 80 | 80 | 80 | 52 | 52 | 52 | 80 | 52 | 80 |
| Nominal Apparent Density (g/mL) | 0.284 | 0.284 | 0.284 | 0.358 | 0.320 | 0.320 | 0.284 | 0.320 | 0.284 |
| Second Chamber Nominal Volume (mL) | | | | | | | 500 | | |
| Adsorbent Type | | | | | | | Particulate | | |
| Nominal Incremental Adsorption Capacity (g/L) | | | | | | | 80 | | |
| Nominal Apparent Density (g/mL) | | | | | | | 0.284 | | |
| Third Chamber Nominal Volume (mL) | | 300 | 300 | | | 175 | 450 | | 300 |
| Adsorbent Type | | Particulate | Particulate | | | Particulate | Particulate | | Particulate |
| Nominal Incremental Adsorption Capacity (g/L) | | 24 | 36 | | | 52 | 52 | | 12.5 |
| Nominal Apparent Density (g/mL) | | 0.383 | 0.335 | | | 0.320 | 0.320 | | 0.406 |
| Fuel Tank Size (rated L) | 68 | 68 | 68 | 60 | 60 | 72.7 | 72 | 47 | 68 |
| Fuel Tank Approximate Vapor Generation (g/day) | 34 | 34 | 34 | 27 | 27 | 36 | 34 | 24 | 34 |
| Canister Approximate Total Vapor Load (g)* | 56 | 56 | 56 | 46 | 46 | 59 | 54 | 38 | 56 |

*Canister Approximate Total Vapor Load (g) = Total Canister Weight Gain = Day 1 Load (g) - Backpurge (g) + Day 2 Load (g)

FIG. 15

Table 2-A. Supplemental canister configuration

| | | | Adsorbent 1 (vent-side adsorbent volume) of Supplemental Canister | | | | | | | | | Emissions | | | | | |
|---|---|---|---|---|---|---|---|---|---|---|---|---|---|---|---|---|---|
| Ex # | Main Canister Type | Adsorbent Type | Pressure Drop (kPa at 40 LPM) | Pressure Drop (Pa/cm at 46 cm/s) | Adsorbent Dimensions (DxL, mm) | Nominal Volume (ml) | L/D | Retentivity (g/dL) | M/m* | Nominal IAC (g/L) | Nominal BWC (g/dL) | g-total BWC (g) | Day 2 (mg) | Day 1 (mg) | System Purge BV** | Purge (L) | Purge Time (min) | Base Canister Purge BV |
| 2 | 1 | P | 0.61 | 13.3 | 35x140 | 135 | 4.0 | 0.98 | 70% | 36 | 8 | 10.8 | 13 | 11 | 141 | 315 | 21 | 150 |
| 3 | 1 | P | 0.61 | 10.0 | 35x140 | 135 | 4.0 | 0.98 | 70% | 36 | 8 | 10.8 | 16 | 12 | 141 | 315 | 21 | 150 |
| 4 | 1 | P | 0.98 | 49.8 | 35x140 | 135 | 4.0 | 0.75 | 66% | 24 | 6.3 | 8.5 | 48 | 50 | 141 | 315 | 21 | 150 |
| 5 | 1 | P | 0.20 | 13.3 | 43x85 | 123 | 2.0 | 0.98 | 70% | 36 | 8 | 9.9 | 18 | 10 | 142 | 315 | 21 | 150 |
| 6 | 1 | P | 0.20 | 13.3 | 43x85 | 123 | 2.0 | 0.98 | 70% | 36 | 8 | 9.9 | 126 | 36 | 142 | 315 | 21 | 150 |
| 7 | 1 | P | 0.20 | 13.3 | 43x85 | 123 | 2.0 | 0.98 | 70% | 36 | 8 | 9.9 | 404 | 58 | 94 | 210 | 21 | 100 |
| 8 | 1 | P | 0.20 | 13.3 | 43x85 | 123 | 2.0 | 0.98 | 70% | 36 | 8 | 9.9 | 46 | 14 | 142 | 315 | 21 | 150 |
| 9 | 1 | P | 0.20 | 13.3 | 43x85 | 123 | 2.0 | 0.98 | 70% | 36 | 8 | 9.9 | 63 | 15 | 142 | 315 | 21 | 150 |
| 10 | 1 | P | 0.20 | 13.3 | 43x85 | 123 | 2.0 | 0.98 | 70% | 36 | 8 | 9.9 | 68 | 13 | 142 | 315 | 21 | 150 |
| 11 | 1 | P | 0.96 | 49.8 | 43x205 | 298 | 4.8 | 0.65 | 66% | 24 | 6.3 | 18.8 | 21 | 24 | 131 | 315 | 21 | 150 |
| 12 | 1 | P | 0.96 | 49.8 | 43x205 | 298 | 4.8 | 0.65 | 66% | 24 | 6.3 | 18.8 | 65 | 54 | 88 | 210 | 21 | 100 |

FIG. 15 (Continued)
Table 2-A (Continued). Supplemental canister configuration

| | | | 0.96 | 49.8 | 43x205 | 298 | 4.8 | 0.65 | 66% | 24 | 6.3 | 18.8 | 94 | 41 | 66 | 157.5 | 21 | 75 |
|---|---|---|---|---|---|---|---|---|---|---|---|---|---|---|---|---|---|---|
| 13 | 1 | P | | | | | | | | | | | | | | | | |
| 14 | 1 | | | | | | | | | | | | 143 | | 150 | 315 | 21 | 150 |
| 15 | 1 | | | | | | | | | | | | 360 | | 100 | 210 | 21 | 100 |
| 16 | 1 | | | | | | | | | | | | 457 | | 75 | 157.5 | 21 | 75 |
| 19 | 2 | P | 0.20 | 13.3 | 43x85 | 123 | 2.0 | 0.98 | 70% | 36 | 8 | 9.9 | 110 | 55 | 94 | 210 | 21 | 100 |
| 20 | 2 | | | | | | | | | | | | 31 | 28 | 150 | 315 | 21 | 150 |
| 21 | 2 | | | | | | | | | | | | 28 | 25 | 150 | 315 | 21 | 150 |
| 22 | 2 | | | | | | | | | | | | 44 | 33 | 150 | 315 | 21 | 150 |
| 23 | 2 | | | | | | | | | | | | 62 | 37 | 150 | 315 | 21 | 150 |
| 24 | 2 | | | | | | | | | | | | 215 | | 75 | 157.5 | 21 | 75 |
| 25 | 2 | M | 0.06 | 2.8 | 35x150 | 144 | 4.3 | 1.00 | 66% | 16 | 4.2 | 6.1 | 23 | 13 | 94 | 210 | 21 | 100 |
| 26 | 3 | | | | | | | | | | | | 64 | 8 | 150 | 315 | 21 | 150 |
| 27 | 3 | M | 0.06 | 2.8 | 35x150 | 144 | 4.3 | 1.00 | 66% | 16 | 4.2 | 6.1 | 37 | 13 | 94 | 210 | 21 | 100 |
| 28 | 4 | | | | | | | | | | | | 76 | 41 | 150 | 315 | 21 | 150 |
| 47 | 4 | P | 0.26 | 13.3 | 43x110 | 160 | 2.6 | 0.88 | 70% | 36 | 8.2 | 13.1 | 32 | 27 | 139 | 315 | 21 | 150 |
| 63 | 5 | | | | | | | | | | | | 93 | 67 | 150 | 315 | 21 | 150 |
| 64 | 5 | P | 0.40 | 13.3 | 30x52 | 37 | 1.7 | 0.88 | 70% | 36 | 8.2 | 3.0 | 47 | 20 | 147 | 315 | 21 | 150 |
| 65 | 5 | P | 0.40 | 13.3 | 30x52 | 37 | 1.7 | 0.88 | 70% | 36 | 8.2 | 3.0 | 31 | 13 | 147 | 315 | 21 | 150 |

FIG. 15 (Continued)
Table 2-A (Continued). Supplemental canister configuration

| | | | | | | | | | | | | | | |
|---|---|---|---|---|---|---|---|---|---|---|---|---|---|---|
| 66 | 5 | P | 0.40 | 13.3 | 30x52 | 37 | 1.7 | 0.88 | 70% | 36 | 8.2 | 3.0 | 64 | 19 | 147 | 315 | 21 | 150 |
| 67 | 5 | P | 0.57 | 13.3 | 30x75 | 53 | 2.5 | 0.88 | 70% | 36 | 8.2 | 4.3 | 24 | 17 | 146 | 315 | 21 | 150 |
| 68 | 5 | P | 0.35 | 13.3 | 35x80 | 77 | 2.3 | 0.88 | 70% | 36 | 8.2 | 6.3 | 31 | 22 | 145 | 315 | 21 | 150 |
| 69 | 5 | P | 0.33 | 49.8 | 43x70 | 102 | 1.6 | 0.75 | 66% | 24 | 6.3 | 6.4 | 49 | 37 | 143 | 315 | 21 | 150 |
| 71 | 5 | M | 0.04 | 2.2 | 29x100 | 66 | 3.4 | 1.10 | 66% | 16 | 4.4 | 2.9 | 15 | 9 | 145 | 315 | 21 | 150 |
| 72 | 5 | M | 0.06 | 2.8 | 35x150 | 144 | 4.3 | 1.00 | 66% | 16 | 4.2 | 6.1 | 21 | 14 | 140 | 315 | 21 | 150 |
| 75 | 5 | P | 0.15 | 13.3 | 43x65 | 94 | 1.5 | 0.88 | 70% | 36 | 8.2 | 7.7 | 13 | 9 | 191 | 420 | 31 | 200 |
| 76 | 5 | P | 0.47 | 13.3 | 35x108 | 104 | 3.1 | 0.88 | 70% | 36 | 8.2 | 8.5 | 24 | 18 | 143 | 315 | 31 | 150 |
| 77 | 5 | P | 0.47 | 13.3 | 35x108 | 104 | 3.1 | 0.88 | 70% | 36 | 8.2 | 8.5 | 45 | 27 | 95 | 210 | 31 | 100 |
| 78 | 5 | P | 0.72 | 13.3 | 35x165 | 159 | 4.7 | 0.88 | 70% | 36 | 8.2 | 13.0 | 51 | 33 | 93 | 210 | 31 | 100 |
| 89 | 5 | P | 0.40 | 58.1 | 35x37 | 36 | 1.1 | 2.82 | 19% | 92 | 17 | 6.1 | 58 | 10 | 147 | 315 | 21 | 150 |
| 90 | 5 | P | 0.40 | 58.1 | 35x37 | 36 | 1.1 | 1.70 | 39% | 52 | 11.5 | 4.1 | 90 | 50 | 147 | 315 | 21 | 150 |
| 91 | 5 | P | 0.40 | 49.8 | 35x37 | 36 | 1.1 | 1.70 | 39% | 52 | 11.5 | 4.1 | 68 | 48 | 147 | 315 | 21 | 150 |
| 92 | 5 | P | 0.40 | 58.1 | 35x37 | 36 | 1.1 | 2.20 | 18% | 80 | 15.4 | 5.5 | 18 | 7 | 147 | 315 | 21 | 150 |
| 93 | 6 | P | 0.13 | 49.8 | 45x27 | 43 | 0.6 | 1.64 | 40% | 52 | 11.5 | 4.9 | 102 | 31 | 118 | 324 | 21 | 120 |
| 95 | 7 | P | 0.11 | 13.3 | 47x46 | 80 | 1.0 | 1.04 | 79% | 36 | 8.2 | 6.5 | 28 | 16 | 164 | 383 | 21 | 170 |
| 112 | 1 | P | 1.05 | 41.5 | 35x140 | 135 | 4.0 | 0.59 | 164% | 28.7 | 7.36 | 9.9 | 13 | 12 | 141 | 315 | 21 | 150 |
| 113 | 5 | P | 0.30 | 41.5 | 43x70 | 102 | 1.6 | 0.59 | 164% | 28.7 | 7.36 | 7.5 | 12 | 9 | 143 | 315 | 21 | 150 |

*ratio of a volume of the macroscopic pores (pores having a diameter of about 100 nm – 100,000 nm) to a volume of the microscopic pores (pores with a diameter of less than about 100 nm); P = particulate; M = monolith.
**BV based on total adsorbent nominal volume of the canister system.

FIG. 15 (Continued)
Table 2-B. Supplemental canister configuration

| Ex # | Main Canister Type | Adsorbent Type | Pressure Drop (kPa at 40 LPM) | Pressure Drop (Pa/cm at 46 cm/s) | Adsorbent Dimensions (DxL, mm) | Nominal Volume (ml) | L/D | Retentivity (g/dL) | M/m* | Nominal IAC (g/L) | Nominal BWC (g/dL) | g-total BWC (g) | Day 2 (mg) | Day 1 (mg) | System Purge BV** | Purge (L) | Purge Time (min) | Base Canister Purge BV |
|---|---|---|---|---|---|---|---|---|---|---|---|---|---|---|---|---|---|---|
| 1 | 1 | P | 0.22 | 6.7 | 49x145 | 273 | 3.0 | 0.99 | 85% | 24 | 5.95 | 16.3 | 188 | 256 | 133 | 315 | 21 | 150 |
| 17 | 2 | P | 0.96 | 49.8 | 43x205 | 298 | 4.8 | 0.16 | 246% | 12 | 3.15 | 9.4 | 26 | 21 | 131 | 315 | 21 | 150 |
| 18 | 2 | P | 0.96 | 49.8 | 43x205 | 298 | 4.8 | 0.16 | 246% | 12 | 3.15 | 9.4 | 93 | 34 | 66 | 157.5 | 21 | 75 |
| 34 | 4 | P | 0.22 | 10.0 | 43x110 | 160 | 2.6 | 0.21 | 390% | 9 | 2.2 | 3.6 | 129 | 28 | 93 | 210 | 21 | 100 |
| 36 | 4 | P | 0.22 | 10.0 | 43x110 | 160 | 2.6 | 0.06 | 194% | 9 | 2.0 | 3.2 | 16 | 11 | 139 | 315 | 21 | 150 |
| 37 | 4 | P | 0.22 | 10.0 | 43x110 | 160 | 2.6 | 1.23 | 48% | | 5.0 | 8.0 | 22 | 19 | 139 | 315 | 21 | 150 |
| 38 | 4 | P | 0.22 | 10.0 | 43x110 | 160 | 2.6 | 0.39 | 58% | | 2.2 | 3.5 | 69 | 55 | 139 | 315 | 21 | 150 |
| 39 | 4 | P | 0.22 | 10.0 | 43x110 | 160 | 2.6 | 1.37 | 54% | | 5.0 | 8.0 | 42 | 45 | 139 | 315 | 21 | 150 |
| 40 | 4 | P | 0.22 | 10.0 | 43x110 | 160 | 2.6 | 1.37 | 54% | | 5.0 | 8.0 | 29 | 11 | 139 | 315 | 21 | 150 |
| 41 | 4 | P | 0.22 | 10.0 | 43x110 | 160 | 2.6 | 0.45 | 75% | | 3.8 | 6.1 | 27 | 29 | 139 | 315 | 21 | 150 |
| 42 | 4 | P | 0.22 | 10.0 | 43x110 | 160 | 2.6 | 0.45 | 75% | | 3.8 | 6.1 | 24 | 24 | 139 | 315 | 21 | 150 |
| 44 | 4 | P | 0.22 | 10.0 | 43x110 | 160 | 2.6 | 0.82 | 119% | | 3.9 | 6.2 | 58 | 16 | 139 | 315 | 21 | 150 |
| 45 | 4 | P | 0.22 | 10.0 | 43x110 | 160 | 2.6 | 0.82 | 119% | | 3.9 | 6.2 | 16 | 13 | 139 | 315 | 21 | 150 |
| 46 | 4 | P | 0.22 | 10.0 | 43x110 | 160 | 2.6 | 0.01 | 141% | | 1.1 | 1.8 | 112 | 26 | 139 | 315 | 21 | 150 |
| 49 | 4 | P | 0.22 | 10.0 | 43x110 | 160 | 2.6 | 1.27 | 85% | | 5.4 | 8.6 | 47 | 41 | 139 | 315 | 21 | 150 |

FIG. 15 (Continued)
Table 2-B (Continued). Supplemental canister configuration

| 55 | 4 | P | 0.22 | 10.0 | 43x110 | 160 | 2.6 | 0.32 | 339% | 12 | 2.4 | 3.8 | 23 | 16 | 139 | 315 | 21 | 150 |
|---|---|---|---|---|---|---|---|---|---|---|---|---|---|---|---|---|---|---|
| 56 | 4 | P | 0.22 | 10.0 | 43x110 | 160 | 2.6 | 0.32 | 339% | 12 | 2.4 | 3.8 | 18 | 12 | 139 | 315 | 21 | 150 |
| 70 | 5 | P | 0.15 | 6.7 | 43x70 | 102 | 1.6 | 0.99 | 85% | 24 | 5.95 | 6.0 | 544 | 266 | 143 | 315 | 21 | 150 |
| 97 | 9 |   |   |   |   |   |   |   |   |   |   |   | 77 | 16 | 150 | 315 | 21 | 150 |
| 98 | 9 | M | 0.06 | 2.8 | 35x150 | 144 | 4.3 | 1.00 | 66% | 16 | 4.4 | 6.3 | 60 | 15 | 94 | 210 | 21 | 100 |

*ratio of a volume of the macroscopic pores (pores having a diameter of about 100 nm ~ 100,000 nm) to a volume of the microscopic pores (pores with a diameter of less than about 100 nm); P = particulate; M = monolith.
**BV based on total adsorbent nominal volume of the canister system.

FIG. 15 (Continued)
Table 2-C. Supplemental canister configuration

| | | | | Adsorbent 1 (vent-side adsorbent volume) of Supplemental Canister | | | | | | | | Emissions | | | | | |
|---|---|---|---|---|---|---|---|---|---|---|---|---|---|---|---|---|---|
| Ex # | Main Canister Type | Adsorbent Type | Pressure Drop (kPa at 40 LPM) | Pressure Drop (Pa/cm at 46 cm/s) | Adsorbent Dimensions (DxL, mm) | Nominal Volume (ml) | L/D | Retentivity (g/dL) | M/m* | Nominal IAC (g/L) | Nominal BWC (g/dL) | g-total BWC (g) | Day 2 (mg) | Day 1 (mg) | System Purge BV** | Purge (L) | Purge Time (min) | Base Canister Purge BV |
| 35 | 4 | P | 0.22 | 10.0 | 43x110 | 160 | 2.6 | 0.44 | 164% | 14 | 3.4 | 5.5 | 145 | 19.7 | 93 | 210 | 21 | 100 |
| 43 | 4 | P | 0.22 | 10.0 | 43x110 | 160 | 2.6 | 0.48 | 191% |  | 3.2 | 5.1 | 14 | 10 | 139 | 315 | 21 | 150 |
| 48 | 4 | P | 0.22 | 10.0 | 43x110 | 160 | 2.6 | 0.01 | 1333% | 13 | 0.8 | 1.3 | 157 | 62 | 139 | 315 | 21 | 150 |
| 50 | 4 | P | 0.22 | 10.0 | 43x110 | 160 | 2.6 | 0.35 | 240% | 13 | 2.5 | 4.0 | 28 | 26 | 139 | 315 | 21 | 150 |
| 51 | 4 | P | 0.22 | 10.0 | 43x110 | 160 | 2.6 | 0.35 | 240% | 13 | 2.5 | 4.0 | 67 | 17 | 139 | 315 | 21 | 150 |
| 52 | 4 | P | 0.22 | 10.0 | 43x110 | 160 | 2.6 | 0.35 | 240% | 13 | 2.5 | 4.0 | 16 | 6 | 139 | 315 | 21 | 150 |
| 53 | 4 | P | 0.22 | 10.0 | 43x110 | 160 | 2.6 | 0.34 | 242% | 13 | 2.7 | 4.3 | 11 | 8 | 139 | 315 | 21 | 150 |
| 54 | 4 | P | 0.22 | 10.0 | 43x110 | 160 | 2.6 | 0.16 | 403% | 12 | 2.2 | 3.5 | 26 | 21 | 139 | 315 | 21 | 150 |
| 57 | 4 | P | 0.22 | 10.0 | 43x110 | 160 | 2.6 | 0.18 | 408% | 9 | 2.1 | 3.4 | 12 | 6 | 139 | 315 | 21 | 150 |
| 58 | 4 | P | 0.22 | 10.0 | 43x110 | 160 | 2.6 | 0.18 | 408% | 9 | 2.1 | 3.4 | 16 | 9 | 139 | 315 | 21 | 150 |
| 59 | 4 | P | 0.22 | 10.0 | 43x110 | 160 | 2.6 | 0.48 | 185% | 14 | 3.4 | 5.4 | 17 | 11 | 139 | 315 | 21 | 150 |
| 60 | 4 | P | 0.22 | 10.0 | 43x110 | 160 | 2.6 | 0.45 | 205% | 14 | 3.6 | 5.7 | 15 | 12 | 139 | 315 | 21 | 150 |
| 61 | 4 | P | 0.22 | 10.0 | 43x110 | 160 | 2.6 | 0.09 | 348% | 9 | 1.7 | 2.7 | 51 | 8 | 139 | 315 | 21 | 150 |
| 62 | 4 | P | 0.22 | 10.0 | 43x110 | 160 | 2.6 | 0.62 | 213% | 14 | 3.9 | 6.2 | 16 | 12 | 139 | 315 | 21 | 150 |
| 79 | 5 | P | 0.27 | 10.0 | 43x132 | 192 | 3.1 | 0.31 | 211% | 12.5 | 2.75 | 5.3 | 8 | 7 | 137 | 315 | 31 | 150 |
| 80 | 5 | P | 0.13 | 10.0 | 43x65 | 94 | 1.5 | 0.17 | 450% | 9 | 2 | 1.9 | 12 | 4 | 191 | 420 | 31 | 200 |
| 81 | 5 | P | 0.13 | 10.0 | 43x65 | 94 | 1.5 | 0.17 | 450% | 9 | 2 | 1.9 | 61 | 26 | 96 | 210 | 31 | 100 |

FIG. 15 (Continued)
Table 2-C (Continued). Supplemental canister configuration

| | | | | | | | | | | | | | | | |
|---|---|---|---|---|---|---|---|---|---|---|---|---|---|---|---|
| 82 | 5 | P | 0.41 | 10.0 | 43x200 | 291 | 4.7 | 0.25 | 167% | 14 | 3.5 | 10.2 | 150 | 17 | 88 | 210 | 31 | 100 |
| 83 | 5 | P | 0.41 | 10.0 | 43x200 | 291 | 4.7 | 0.17 | 450% | 9 | 2 | 5.8 | 328 | 23 | 88 | 210 | 31 | 100 |
| 84 | 5 | P | 0.13 | 10.0 | 43x65 | 94 | 1.5 | 0.25 | 167% | 14 | 3.5 | 3.3 | 67 | 9 | 96 | 210 | 31 | 100 |
| 85 | 5 | P | 0.13 | 10.0 | 43x65 | 94 | 1.5 | 0.25 | 167% | 14 | 3.5 | 3.3 | 10 | 6 | 191 | 420 | 31 | 200 |
| 86 | 5 | P | 0.41 | 10.0 | 43x200 | 291 | 4.7 | 0.25 | 167% | 14 | 3.5 | 10.2 | 9 | 7 | 176 | 420 | 31 | 200 |
| 87 | 5 | P | 0.41 | 10.0 | 43x200 | 291 | 4.7 | 0.17 | 450% | 9 | 2 | 5.8 | 4 | 2 | 176 | 420 | 31 | 200 |
| 88 | 5 | P | 0.27 | 10.0 | 43x132 | 192 | 3.1 | 0.31 | 211% | 12.5 | 2.75 | 5.3 | 9 | 8 | 137 | 315 | 31 | 150 |
| 99 | 2 | P | 0.49 | 11.9 | 35x115 | 111 | 3.3 | 0.24 | 260% | 12.5 | 3 | 3.3 | 7 | 5 | 142 | 315 | 21 | 150 |
| 100 | 2 | P | 0.49 | 11.9 | 35x115 | 111 | 3.3 | 0.24 | 260% | 12.5 | 3 | 3.3 | 64 | 10 | 95 | 210 | 21 | 100 |
| 101 | 4 | P | 0.49 | 11.9 | 35x115 | 111 | 2.8 | 0.40 | 298% | 12.5 | 3 | 3.3 | 9 | 4 | 142 | 315 | 21 | 150 |
| 102 | 4 | P | 0.49 | 11.9 | 35x115 | 111 | 3.3 | 0.24 | 260% | 12.5 | 3 | 3.3 | 8 | 6 | 128 | 283.5 | 21 | 135 |
| 103 | 4 | P | 0.49 | 11.9 | 35x115 | 111 | 3.3 | 0.24 | 260% | 12.5 | 3 | 3.3 | 14 | 6 | 119 | 262.5 | 21 | 125 |
| 104 | 4 | P | 0.49 | 11.9 | 35x115 | 111 | 3.3 | 0.24 | 260% | 12.5 | 3 | 3.3 | 13 | 8 | 104 | 231 | 21 | 110 |
| 105 | 4 | P | 0.49 | 11.9 | 35x115 | 111 | 3.3 | 0.24 | 260% | 12.5 | 3 | 3.3 | 24 | 6 | 95 | 210 | 21 | 100 |

*ratio of a volume of the macroscopic pores (pores having a diameter of about 100 nm – 100,000 nm) to a volume of the microscopic pores (pores with a diameter of less than about 100 nm); P = particulate; M = monolith.
**BV based on total adsorbent nominal volume of the canister system.

FIG. 16
Table 3-A. Supplemental canister configuration

| Ex # | Main Canister Type | Adsorbent 1 (vent-side adsorbent volume) of Supplemental Canister | | | | | | | | | | Emissions | | | | | Base Canister Purge BV |
|---|---|---|---|---|---|---|---|---|---|---|---|---|---|---|---|---|---|
| | | Adsorbent Type | Pressure Drop (kPa at 40 LPM) | Pressure Drop (Pa/cm at 46 cm/s) | Adsorbent Dimensions (DxL, mm) | Nominal Volume (ml) | L/D | Retentivity (g/dL) | M/m* | Nominal IAC (g/L) | Nominal BWC (g/dL) | g-total BWC (g) | Day 2 (mg) | Day 1 (mg) | System Purge BV** | Purge (L) | Purge Time (min) | |
| 30 | 4 | P | 0.27 | 13.3 | 35x62 | 60 | 1.8 | 0.98 | 70% | 36 | 8 | 4.8 | 17 | 8 | 123 | 273 | 21 | 130 |
| 32 | 4 | P | 0.27 | 13.3 | 35x62 | 60 | 1.8 | 0.98 | 70% | 36 | 8 | 4.8 | 51 | 16 | 94 | 210 | 21 | 100 |
| 94 | 6 | P | 0.13 | 49.8 | 45x27 | 43 | 0.6 | 1.64 | 40% | 52 | 11.5 | 4.9 | 29 | 13 | 117 | 324 | 21 | 120 |
| 96 | 8 | P | 0.27 | 13.3 | 35x62 | 60 | 1.8 | 0.98 | 70% | 36 | 8.2 | 4.9 | 15 | 13 | 126 | 246 | 21 | 130 |

*ratio of a volume of the macroscopic pores (pores having a diameter of about 100 nm – 100,000 nm) to a volume of the microscopic pores (pores with a diameter of less than about 100 nm); P = particulate; M = monolith.
**BV based on total adsorbent nominal volume of the canister system.

FIG. 16 (Continued)
Table 3-B. Supplemental canister configuration

| Ex # | Main Canister Type | Adsorbent 2 (vent-side adsorbent volume) of Supplemental Canister | | | | | | | | | | Emissions | | | | Base Canister Purge BV |
|---|---|---|---|---|---|---|---|---|---|---|---|---|---|---|---|---|
| | | Adsorbent Type | Pressure Drop (kPa at 40 LPM) | Pressure Drop (Pa/cm at 46 cm/s) | Adsorbent Dimensions (DxL, mm) | Nominal Volume (ml) | L/D | Retentivity (g/dL) | M/m* | Nominal IAC (g/L) | Nominal BWC (g/dL) | g-total BWC (g) | Day 1 (mg) | Day 2 (mg) | System Purge BV** | Purge (L) | Purge Time (min) | |
| 29 | 4 | P | 0.28 | 6.7 | 35x62 | 60 | 1.8 | 0.99 | 85% | 24 | 5.95 | 3.5 | 17 | 45 | 123 | 273 | 21 | 130 |
| 31 | 4 | P | 0.29 | 10.0 | 35x62 | 60 | 1.8 | 0.25 | 139% | 14 | 3.5 | 2.1 | 15 | 17 | 123 | 273 | 21 | 130 |
| 33 | 4 | P | 0.29 | 10.0 | 35x62 | 60 | 1.8 | 0.25 | 139% | 14 | 3.5 | 2.1 | 21 | 31 | 94 | 210 | 21 | 100 |

*ratio of a volume of the macroscopic pores (pores having a diameter of about 100 nm – 100,000 nm) to a volume of the microscopic pores (pores with a diameter of less than about 100 nm); P = particulate; M = monolith.
**BV based on total adsorbent nominal volume of the canister system.

FIG. 16 (Continued)
Table 3-C. Supplemental canister configuration

| Ex # | Main Canister Type | Adsorbent 1 (vent-side adsorbent volume) of Supplemental Canister ||||||||||| Emissions |||||
|---|---|---|---|---|---|---|---|---|---|---|---|---|---|---|---|---|
| | | Adsorbent Type | Pressure Drop (kPa at 40 LPM) | Pressure Drop (Pa/cm at 46 cm/s) | Adsorbent Dimensions (DxL, mm) | Nominal Volume (ml) | L/D | Retentivity (g/dL) | M/m* | Nominal IAC (g/L) | Nominal BWC (g/dL) | g-total BWC (g) | Day 2 (mg) | Day 1 (mg) | System Purge BV** | Purge (L) | Purge Time (min) | Base Canister Purge BV |
| 73 | 5 | P | 0.20 | 10.0 | 43x100 | 145 | 2.3 | 0.25 | 167% | 14 | 3.5 | 5.1 | 32 | 14 | 88 | 210 | 31 | 100 |
| 74 | 5 | P | 0.16 | 10.0 | 43x80 | 116 | 1.9 | 0.25 | 167% | 14 | 3.5 | 4.1 | 87 | 6 | 90 | 210 | 31 | 100 |
| 106 | 2 | P | 0.20 | 10 | 43x100 | 145 | 2.3 | 0.24 | 260% | 12.5 | 3 | 4.4 | 15 | 8 | 90 | 210 | 21 | 100 |
| 107 | 2 | M | 0.04 | 2.8 | 35x100 | 96 | 2.9 | 1.00 | 66% | 16 | 4.2 | 4.0 | 12 | 8 | 90 | 210 | 21 | 100 |
| 108 | 2 | M | 0.06 | 2.8 | 35x150 | 144 | 4.3 | 1.00 | 66% | 16 | 4.2 | 6.1 | 7 | 20 | 107 | 262.5 | 21 | 125 |
| 109 | 2 | M | 0.06 | 2.8 | 35x150 | 144 | 4.3 | 1.00 | 66% | 16 | 4.2 | 6.1 | 9 | 7 | 85 | 210 | 21 | 100 |
| 110 | 2 | M | 0.06 | 2.8 | 35x150 | 144 | 4.3 | 1.00 | 66% | 16 | 4.2 | 6.1 | 14 | 9 | 64 | 157.5 | 21 | 75 |
| 111 | 2 | P | 0.29 | 10.0 | 35x62 | 60 | 3.0 | 0.25 | 260% | 12.5 | 3 | 1.8 | 48 | 13 | 94 | 210 | 21 | 100 |

*ratio of a volume of the macroscopic pores (pores having a diameter of about 100 nm – 100,000 nm) to a volume of the microscopic pores (pores with a diameter of less than about 100 nm); P = particulate; M = monolith.
**BV based on total adsorbent nominal volume of the canister system.

EVAPORATIVE FUEL VAPOR EMISSION CONTROL SYSTEMS

CROSS REFERENCE TO RELATED APPLICATIONS

The present disclosure is a divisional of U.S. Non-Provisional application Ser. No. 16/888,323, filed 29 May 2020, which is a divisional of U.S. Non-Provisional application Ser. No. 16/012,637, filed 19 Jun. 2018, and issued on 7 Jul. 2020 as U.S. Pat. No. 10,704,501, titled EVAPORATIVE FUEL VAPOR EMISSION CONTROL SYSTEMS, which claims priority to U.S. Provisional Patent Application Ser. No. 62/521,912 filed 19 Jun. 2017, and U.S. Provisional Patent Application Ser. No. 62/685,174 filed 14 Jun. 2018, the contents of which are incorporated herein by reference in their entirety for all purposes.

BACKGROUND

1. Field of the Discovery

The present disclosure generally relates to a system comprising particulate adsorbent material and methods of using the same. More particularly, the present disclosure relates to a system comprising a low retentivity particulate adsorbent material and methods of using the same in evaporative fuel vapor emission control systems.

2. Background Information

Evaporation of gasoline fuel from motor vehicle fuel systems is a major source of hydrocarbon air pollution. Such emissions can be controlled by the canister systems that employ activated carbon to adsorb the fuel vapor generated by the fuel systems. Under certain modes of engine operation, the adsorbed fuel vapor is periodically removed from the activated carbon by purging the canister systems with ambient air to desorb the fuel vapor from the activated carbon. The regenerated carbon is then ready to adsorb additional fuel vapor.

An increase in environmental concerns has continued to drive strict regulations of the hydrocarbon emissions from motor vehicles even when the vehicles are not operating. The vapor pressure in a vehicle fuel tank will increase as the ambient temperature increases while the vehicle is parked. Normally, to prevent the leaking of the fuel vapor from the vehicle into the atmosphere, the fuel tank is vented through a conduit to a canister containing suitable fuel adsorbent materials that can temporarily adsorb the fuel vapor. A mixture of fuel vapor and air from the fuel tank enters the canister through a fuel vapor inlet of the canister and expands or diffuses into the adsorbent volume where the fuel vapor is adsorbed in temporary storage and the purified air is released to the atmosphere through a vent port of the canister. Once the engine is turned on, ambient air is drawn into the canister system via manifold vacuum through the vent port of the canister. The purge air flows through the adsorbent volume inside the canister and desorbs the fuel vapor adsorbed on the adsorbent volume before entering the internal combustion engine through a fuel vapor purge conduit. The purge air does not desorb the entire fuel vapor adsorbed on the adsorbent volume, resulting in a residue hydrocarbon ("heel") that may be emitted to the atmosphere. In addition, that heel in local equilibrium with the gas phase also permits fuel vapors from the fuel tank to migrate through the canister system as emissions. Such emissions typically occur when a vehicle has been parked and subjected to diurnal temperature changes over a period of several days, commonly called "diurnal breathing losses."

In the US, the California Low Emission Vehicle Regulations made it desirable for the diurnal breathing loss (DBL) emissions from the canister system to be below about 20 mg ("PZEV") for a number of vehicles beginning with the 2003 model year and below about 50 mg, ("LEV-II") for a larger number of vehicles beginning with the 2004 model year. Now the California Low Emission Vehicle Regulation (LEV-III) and EPAs Tier 3 Standard requires canister DBL emissions not to exceed 20 mg as per the Bleed Emissions Test Procedure (BETP) as written in the California Evaporative Emissions Standards and Test Procedures for 2001 and Subsequent Model Motor Vehicles, 22 Mar. 2012 and EPAs Control of Air Pollution From Motor Vehicles: Tier 3 Motor Vehicle Emission and Fuel Standards; Final Rule, 40 CFR Parts 79, 80, 85 et al. Globally, by contrast, evaporative emission regulations have been less stringent than in the US, but the trend is now for more stringent regulations, along the path that the US has taken. There is increased recognition of the benefits from tighter controls for better use of vehicle fuel and for cleaner air, especially in regions where light duty vehicle use is growing rapidly and air quality issues require urgent attention.

In order to meet the evaporative fuel emission regulatory standards in the vehicle design stage, vehicle manufacturers typically provide potential suppliers with target specifications on overall canister system performance, in terms of functional content, appearance, physical characteristics, and durability, hence leaving appropriate design flexibility for achieving those targets to the canister system manufacturers. For example, General Motors Corporation sets many design specifications for evaporative emission control canister systems (See GMW16494). A notable specification is the total allowable pressure drop of a carbon canister system. In this example, the maximum flow restriction for a canister system intended for on-board refueling vapor recovery (ORVR) "shall be 0.90±0.225 kPa at 60 liter/min (lpm) air flow . . . as measured at the tank tube while flowing air from the canister tank tube to the fresh air tube" (see Section 3.2.1.3.2.2 of GMW-16494). This specification and others in GMW-16494 offer examples of the degree that vehicle manufacturer allow for flow restriction.

As a result of such specifications, canister system designers appreciate a wide array of adsorbent options because, in addition to varied fuel emissions regulations around the world, the demands are quite varied across different vehicle platforms from different vehicle manufacturers per engine type, engine operational design, space availability, purge availability, and canister system control strategy. Certainly, "one size does not fit all" for canister system design and its adsorbent fills. Accordingly, new adsorbent options and approaches for balancing the tradeoffs in terms of cost, size, flow restriction, working capacity, diurnal breathing loss (DBL) performance, complexity, and placement flexibility, are in high demand.

For example, several approaches involving chamber design and adsorbent properties have been reported for reducing DBL emissions which is one of the specification aspects that the canister system must meet.

One approach for attaining low emissions is to significantly increase the volume of purge gas to enhance desorption of the residue hydrocarbon heel from the adsorbent volume. This approach, however, has the drawback of complicating management of the fuel/air mixture to the engine during the purge step and tends to adversely affect tailpipe emissions. See U.S. Pat. No. 4,894,072. For certain high performance and high fuel efficiency engine designs, including turbo-charged, gasoline direct injection, and hybrid electric vehicles, such high purge is not available or might greatly affect engine performance.

Another approach is to design the canister to have a relatively low cross-sectional area on the vent-side of the canister, either by the redesign of existing canister dimensions or by the installation of a supplemental vent-side canister chamber of appropriate dimensions. See U.S. Pat. No. 5,957,114. This approach reduces the residual hydrocarbon heel by increasing the intensity of purge air. One drawback of such approach is that the relatively low cross-sectional area imparts an excessive flow restriction to the canister for solid-shaped conventional particulate adsorbents of 1-3 mm diameter, except for the shortest bed length which then otherwise compromises the effectiveness of this vent-side chamber for DBL emission control. Therefore, though potentially effective for reducing bleed emissions of the system, the excessive flow restriction is not accommodated by conventional particulate adsorbent.

An additional approach for increasing the purge efficiency is to heat the purge air, or a portion of the adsorbent volume having adsorbed fuel vapor, or both. See U.S. Pat. Nos. 6,098,601 and 6,279,548. However, this approach increases the complexity of control system management and poses some safety concerns.

Still another approach is in the selection of multiple adsorbents in the canister system chambers, such as to route the fuel vapor through one or more fuel-side adsorbent volumes, which are located proximal to or near the fuel side port of the canister system (i.e., are upstream in the fluid or vapor path), and then to at least one vent-side or subsequent adsorbent volume, which is located downstream in the fluid or vapor path (or distal) relative to the fuel-side adsorbent, prior to venting to the atmosphere, wherein the initial adsorbent volume has a higher incremental adsorption capacity (greater slope in the butane adsorption isotherm between 5 and 50% concentrations) than the subsequent adsorbent volume. See U.S. Pat. No. RE38,844 and U.S. Pat. No. 9,732,649, which are incorporated herein by reference in their entirety.

One effective format for a subsequent adsorbent volume towards the vent-side of the canister system is an elongated, ceramic-bound activated carbon honeycomb, such as Nuchar® HCA (Ingevity®, North Charleston, S.C., USA), typically available in diameters of 29, 35 and 41 mm and certain lengths between 50 and 200 mm. While such an adsorbent structure provides the desired adsorptive properties with low flow restriction, these engineered parts are costly to make, requiring special skill and equipment to manufacture, and the immediate initial customer, the designer of canister systems, is limited to only those size honeycomb parts that are normally available for system design, testing and certification.

An alternative effective format for a vent-side volume that allows flexibility in chamber design is in 2-3 mm pellet form, e.g., Nuchar® BAX LBE grade activated carbon (Ingevity®, North Charleston, S.C., USA) or 2GK-C7 grade activated carbon (Kuraray Chemical Co., Ltd., Bizen-shi, Japan). While these pellets may have useful adsorptive properties for bleed emission control and, as a particulate material, allow great flexibility for the adsorbent chamber dimensions into which these pellets are filled, these pellets have high flow restriction properties relative to carbon honeycombs, which limits potentially useful low cross-sectional area geometries as taught by U.S. Pat. No. 5,957,114.

Along the concept of adsorbents-in-series, adsorbent volumes with a gradation in adsorption working capacity, e.g., butane working capacity (BWC), and gram-total butane working capacity on the vent-side of the system are taught to be particularly useful for emission control canister systems when operated under a low volume of purge, such as for "hybrid" vehicles, where the internal combustion engine is turned off nearly half of the time during vehicle operation and where the purge frequency is much less than normal. See WO 2014/059190 (PCT/US2013/064407). Other engine designs which pose challenges for canister system purging include features of gasoline direct injection and turbo-charge or turbo-assist. However, these approaches are typically limited to the carbon honeycomb format.

The challenge and desire described by the above approaches, and others (see, e.g., U.S. Pat. Nos. 7,186,291 and 7,305,974), is to diminish the detrimental effect of the residual adsorbed vapors on evaporative emission canister system performance, especially the DBL emissions performance, where the least amount of retained adsorbed vapors (lowest amount of heel) is highly sought. Furthermore, the deterioration of DBL emission performance, and working capacity performance of canister systems (also called "ageing") is also known to be due to accumulations of less purgeable components in this adsorbed vapor heel (see, e.g., SAE Technical Paper Series 2000-01-895). Therefore, the benefit of low retention of hydrocarbons after purge is twofold: a low level of DBL emissions for the new vehicle, and the maintenance of working capacity and emissions performance over the life of the vehicle as afforded by low vapor retention properties.

While highly desirable as an approach, the combination of low cost, low complexity of production, high material structural strength, low flow restriction, and lowest vapor retention as engendered by a particulate adsorbent for evaporative emissions control is taught to be a nearly insurmountable design challenge. For example, as taught by U.S. Pat. No. 9,174,195 ("the '195 patent"), the useful range for the ratio of macroscopic, "M", to microscopic, "m", pore volumes is limited to between 65% and 150% M/m, because of mechanical strength failing at higher ratio. Furthermore, within the claimed pore ratio range, the vapor retention (retentivity) is asymptotic, to greater than 1 g/dL measured as the residual amount of butane by a standard ASTM test, and greater than the noted 1.7 g/dL target when the pore ratio was beyond the claimed 150% limit (in addition to poor strength). It is important to note that the '195 patent teaches that at a typical 5 mm diameter pellet having an M/m pore ratio of over 150% is not robust enough for use (see FIG. 6). The tradeoff between pore ratio and pellet strength is underscored by the 2GK-C7 pellet adsorbent material (Kuraray Chemical Co., Ltd., Bizen-shi, Japan), which despite having an M/m of about 170% had a 2.6 mm mean diameter, which while improving its strength has the unwanted effect of increasing flow restriction. In other words, despite its functionality for controlling emissions, the '195 patent teaches that the relatively higher M/m ratio of 2GK-C7 is unsuitable for larger diameter pellets, which while providing for lower flow restriction would also have impaired strength, and relatively high retentivity.

Accordingly, there remains a need for additional adsorbent options for designers of evaporative emission control systems, particularly for the adsorbent volumes towards the vent-side that are robust but also demonstrate low vapor retention, and low flow restriction, which help achieve high working capacity and low DBL emissions performance by the system over the life of the vehicle.

SUMMARY

Presently described are evaporative emission control canister systems with surprising and unexpected characteristics, including two-day diurnal breathing loss (DBL) emissions of less than about 50 mg or less than about 20 mg, including in instances with relatively low volumes of purge (e.g., less about 175 BV or less than 100 BV). It was surprisingly and unexpectedly discovered that low purge and low DBL evaporative emission control canister systems are possible with particulate adsorbent volumes as described herein, which are cost effective to manufacture, possess desirable retentivity, have high material structural strength, and low flow restriction. For example, the particulate adsorbent materials, which provide low DBL canister systems as described herein have a macroporisity (M) to microporosity (m) ratio (i.e., M/m) of above 150%, butane retentivity below 1.0 g/dL while also being sufficiently large and robust enough to be utilized in the system without imposing excessive flow restriction.

Thus, in one aspect, the disclosure provides an evaporative emission control canister system comprising: one or more canisters having a plurality of chambers, each defining a volume, which are in fluid communication allowing a fluid (e.g., air, gas or fuel vapor) to flow directionally from one chamber to the next, wherein at least one chamber comprises at least one particulate adsorbent volume that includes a particulate adsorbent having microscopic pores with a diameter of less than about 100 nm, macroscopic pores having a diameter of about 100-100,000 nm, and a ratio of a volume of the macroscopic pores to a volume of the microscopic pores that is greater than about 150%, and wherein the particulate adsorbent volume has a flow restriction property of less than 40 Pa/cm under conditions of 46 cm/s apparent linear air flow velocity applied to a 43 mm diameter bed of the particulate adsorbent material or a flow restriction of less than 0.3 kPa under 40 lpm air flow or both. In certain embodiments, the particulate adsorbent volume has a length to diameter ratio of 2 or more, butane retentivity of <1.0 g/dL, or a combination thereof. In certain embodiments, the butane retentivity is <0.5 g/dL. In certain embodiments, the evaporative emission control canister system comprises at least one fuel-side adsorbent volume, at least one vent-side subsequent adsorbent volume or both. In certain embodiments, the adsorbent volumes are located within a single canister or within a plurality of canisters that are connected to permit sequential contact by the fuel vapor. In certain embodiments, the at least one particulate adsorbent volume, the at least one fuel-side adsorbent volume or both have a nominal butane working capacity (BWC) of at least 8 g/dL (e.g., at least 10 g/L), a nominal incremental adsorption capacity (IAC) at 25° C. of at least 35 g/L between vapor concentrations of 5 vol % and 50 vol % n-butane, or both. In certain embodiments, the at least one particulate adsorbent volume, the at least one vent-side subsequent adsorbent volume or both have a nominal BWC of less than 8 g/dL, a nominal IAC at 25° C. of less than 35 g/L between vapor concentrations of 5 vol % and 50 vol % n-butane, or both. In certain embodiments, the particulate volume has an M/m ratio that is greater than about 200%.

In an additional aspect, the description provides an evaporative emission control canister system including one or more canisters comprising at least one fuel-side adsorbent volume (i.e., adsorbent volume at or near the fuel tank vapor inlet), and at least one vent-side particulate adsorbent volume. In certain embodiments, the at least one vent-side particulate adsorbent volume is included as an alternative to or in combination with one or more vent-side subsequent adsorbent volumes. The at least one fuel-side adsorbent volume, the at least one vent-side particulate adsorbent volume, and/or the at least one vent-side subsequent adsorbent volume can be contained either in a single canister or in separate canisters that are connected to permit sequential contact by fuel vapor (and conversely, purge air). In certain embodiments, the at least one vent-side subsequent adsorbent volume includes a non-particulate adsorbent material, e.g., a foam, monolith, a polymer or paper sheet, or honeycomb (e.g., activated carbon honeycomb), wherein the at least one vent-side subsequent adsorbent volume imposes low vapor or fluid flow restriction.

In certain embodiments, the evaporative emission control canister system comprises: at least one vent-side subsequent adsorbent volume that is upstream of the at least one vent-side particulate adsorbent volume (i.e., located closer to the fuel-side adsorbent volume or fuel vapor inlet in the fluid path), at least one vent-side subsequent adsorbent volume that is downstream of the at least one vent-side particulate adsorbent volume (i.e., located closer to the vent port in the fluid path), or a combination thereof.

In certain embodiments, the evaporative emission control canister system comprises: at least one vent-side particulate adsorbent volume that is upstream of the at least one vent-side subsequent adsorbent volume (i.e., located closer to the fuel-side adsorbent volume or fuel vapor inlet in the fluid path), at least one vent-side particulate adsorbent volume that is downstream of the at least one vent-side subsequent adsorbent volume (i.e., located closer to the vent port in the fluid path), or a combination thereof.

In any of the aspects or embodiments described herein, the at least one vent-side subsequent adsorbent volume includes a non-particulate adsorbent material, e.g., a foam, monolith, honeycomb, polymer or paper sheet. In certain embodiments, the non-particulate adsorbent material imposes low vapor or fluid flow restriction. In certain embodiments, the non-particulate adsorbent material is a honeycomb with uniform cross-sectional area.

The adsorbents suitable for use in the adsorbent volumes may be derived from many different materials and in various forms. It may be a single component or a blend of different components. Furthermore, the adsorbent (either as a single component or a blend of different components) may include a volumetric diluent. Non-limiting examples of the volumetric diluents may include, but are not limited to, spacer, inert gap, foams, fibers, springs, or combinations thereof.

In any of the aspects or embodiments described herein, any known adsorbent materials may be used for the fuel-side adsorbent volume, vent-side particulate adsorbent volume, and vent-side subsequent adsorbent volume, including, but not limited to, activated carbon, carbon charcoal, zeolites, clays, porous polymers, porous alumina, porous silica, molecular sieves, kaolin, titania, ceria, or combinations thereof. Activated carbon may be derived from various carbon precursors. By way of non-limiting example, the carbon precursors may be wood, wood dust, wood flour, cotton linters, peat, coal, coconut, lignite, carbohydrates, petroleum pitch, petroleum coke, coal tar pitch, fruit pits, fruit stones, nut shells, nut pits, sawdust, palm, vegetables such as rice hull or straw, synthetic polymer, natural polymer, lignocellulosic material, or combinations thereof. Furthermore, activated carbon may be produced using a variety of processes including, but are not limited to, chemical activation, thermal activation, or combinations thereof.

In any of the aspects or embodiments described herein, any variety of adsorbent forms may be used for the fuel-side adsorbent volume, vent-side particulate adsorbent volume, and vent-side subsequent adsorbent volume. Non-limiting examples of the adsorbent forms may include granular, pellet, spherical, honeycomb, monolith, pelletized cylindrical, particulate media of uniform shape, particulate media of non-uniform shape, structured media of extruded form, structured media of wound form, structured media of folded form, structured media of pleated form, structured media of corrugated form, structured media of poured form, structured media of bonded form, non-wovens, wovens, sheet, paper, foam, or combinations thereof. The adsorbent (either as a single component or a blend of different components) may include a volumetric diluent. Non-limiting examples of the volumetric diluents may include, but are not limited to, spacer, inert gap, foams, fibers, springs, or combinations thereof. Furthermore, the adsorbents may be extruded into special thin-walled cross-sectional shapes, such as hollow-cylinder, star, twisted spiral, asterisk, configured ribbons, or other shapes within the technical capabilities of the art. In shaping, inorganic and/or organic binders may be used.

The honeycomb adsorbents may be in any geometrical shape including, but not limited to, round, cylindrical, or square. Furthermore, the cells of honeycomb adsorbents may be of any geometry. Honeycombs of uniform cross-sectional areas for the flow-through passages, such as square honeycombs with square cross-sectional cells or spiral wound honeycombs of corrugated form, may perform better than round honeycombs with square cross-sectional cells in a right angled matrix that provides adjacent passages with a range of cross-sectional areas and therefore passages that are not equivalently purged. Without being bound by any theory, it is believed that the more uniform cell cross-sectional areas across the honeycomb faces, the more uniform flow distribution within the part during both adsorption and purge cycles, and, therefore, lower DBL emissions from the canister system.

In some embodiments, the evaporative emission control system may further include one or more heat input unit(s) for heating one or more adsorbent volume(s) and/or one or more empty volume(s). The heat input units may include, but are not limited to, internal resistive elements, external resistive elements, or heat input units associated with the adsorbent. The heat input unit associated with the adsorbent may be an element separate from the adsorbent (i.e., non-contacted with adsorbents). Alternatively, the heat input unit associated with the adsorbent may be a substrate or layer on to which the adsorbent is attached, bonded, non-bonded, or in physical contact. The heat input unit associated with the adsorbent may be adsorbent directly heated electrically by having appropriate resistivity. The resistivity properties of the adsorbent may be modified by the addition of conductive or resistive additives and binders in the original preparation of the adsorbent and/or in the forming of the adsorbent into particulate or monolithic forms. The conductive component may be conductive adsorbents, conductive substrates, conductive additives and/or conductive binders. The conductive material may be added in adsorbent preparation, added in intermediate shaping process, and/or added in adsorbent shaping into final form. Any mode of heat input unit may be used. By way of non-limiting example, the heat input unit may include a heat transfer fluid, a heat exchanger, a heat conductive element, and positive temperature coefficient materials. The heat input unit may or may not be uniform along the heated fluid path length (i.e., provide different local intensities). Furthermore, the heat input unit may or may not be distributed for greater intensity and duration of heating at different points along the heated fluid path length.

In certain embodiments, the vent-side subsequent adsorbent volume is an activated carbon monolith or activated carbon honeycomb, and is located upstream in the fuel vapor path relative to the location of the vent-side particulate adsorbent volume, downstream in the fuel vapor path relative to the location of the vent-side particulate adsorbent volume or a combination thereof.

In certain embodiments, the at least one fuel-side adsorbent volume has at least one of a relatively high butane working capacity (BWC), an effective incremental adsorption capacity of above about 35 grams n-butane per liter (g/L) between vapor concentration of 5 vol % and 50 vol % n-butane, or both. For example, in certain embodiments, the system further comprises at least one additional high butane working capacity (BWC) adsorbent volume that is located upstream from or prior to a vent-side particulate adsorbent volume (i.e., the high butane working capacity adsorbent volumes come into contact with the fuel vapor before the vent-side particulate adsorbent volume while the vehicle is at rest). In certain embodiments, the fuel-side adsorbent volume has at least one of: i) a relatively high butane working capacity (BWC), e.g., greater than 8, 9, 10, 11, 12, 13, 14, 15 or more grams per deciliter (g/dL), ii) an incremental adsorbent capacity of greater than 35, 40, 45, 50, 55, 60, 65, 70, 75, 80, 85, 90 or more grams n-butane per liter (g/L) between vapor concentration of 5 vol % and 50 vol % n-butane, or both.

In certain embodiments, the evaporative emission control canister system comprises at least one vent-side particulate adsorbent volume (i.e., downstream relative to the at least one fuel-side adsorbent volume in the vapor path from the fuel tank to vent port). In certain embodiments, the at least one vent-side particulate adsorbent volume has a low butane retentivity, a relatively high ratio of macroscopic size pore volume to microscopic pore volume (M/m), and relatively low flow restriction properties. In certain embodiments, the particulate adsorbent with low butane retentivity and low flow restriction properties has microscopic pores with a diameter of less than about 100 nm, macroscopic pores having a diameter of about 100-100,000 nm and a ratio of a volume of the macroscopic pores to a volume of the microscopic pores (M/m) that is greater than about 150%, 160%, 170%, 180%, 190%, 200%, 210%, or 220% or more, wherein the particulate adsorbent material has a retentivity of about 1.0 g/dL or less and flow restriction of less than less than 40 Pa/cm pressure drop under 46 cm/s apparent linear gas flow velocity.

In any of the aspects or embodiments described herein, the vent-side particulate adsorbent volume has a flow restriction of less than about 0.3 kPa under 40 lpm air flow.

In any of the aspects or embodiments described herein the at least one vent-side particulate adsorbent volume has a length to diameter ratio of about 0.5, 1, 1.5, 2, 2.5, 3, 3.5, 4, 4.5, 5, 5.5, 6, 6.5 or greater. In certain embodiments, the vent-side particulate adsorbent volume is elongated, with a length to diameter ratio, L/D, of greater than 2.

In certain embodiments, the M/m for the at least one vent-side particulate adsorbent volume is greater than 150% with flow restriction properties of less than 40 Pa/cm pressure drop under 46 cm/s apparent linear air flow velocity. In certain embodiments, the M/m for the vent-side particulate adsorbent volume is greater than 200% and has butane retentivity less than 1 g/dL. In certain embodiments, the M/m for the vent-side particulate adsorbent volume is greater than 150% and the butane retentivity is less than 0.5 g/dL.

In certain embodiments, the evaporative emission control canister system comprises at least one vent-side particulate adsorbent volume as described herein, e.g., having relatively low butane retentivity and low flow restriction, wherein the canister system has a two-day DBL emissions of no more than about 50, 45, 40, 35, 30, 25, 20 mg or less at no more than about 175, 150, 125, 120, 115, 110, 100 or less bed volumes of purge or less than 315, 300, 275, 250, 225, 200, 175, 150 or less liters of purge as determined by the California Bleed Emissions Test Procedure (BETP). In certain embodiments, the evaporative emission control canister system comprises at least one adsorbent volume having low butane retentivity and low flow restriction particulate adsorbent and has no more than 50 mg, or no more than 20 mg day 2 DBL emissions under less than 100 bed volumes or less than 210 liters of purge in the BETP test.

In some embodiments, the system comprises a plurality of vent-side particulate adsorbent volumes that are configured to permit sequential contact by a fluid, e.g., a fuel vapor. In certain embodiments, for example, the adsorbents are connected in series defining a fluid flow path therethrough.

In certain embodiments, the system comprises a plurality of canisters that are connected to permit sequential contact by a fluid, e.g., a fuel vapor.

In other embodiments, the system further comprises a subsequent adsorbent volume that is downstream from or subsequent to the vent-side particulate adsorbent volume as described herein (i.e., the subsequent adsorbent volume comes into contact with the fuel vapor after it encounters the vent-side particulate adsorbent volume when the engine is at rest).

In certain embodiments, the at least one subsequent adsorbent volume has at least one of: i) a BWC of less than about 8 g/dL, ii) an IAC of less than about 35 grams n-butane/L between vapor concentrations of 5 vol % and 50 vol % n-butane, or iii) a combination thereof. In certain embodiments, the subsequent adsorbent volume is an activated honeycomb.

In another aspect, the description provides an evaporative emission control canister system including one or more canisters comprising: at least one fuel-side adsorbent volume comprising a particulate adsorbent having microscopic pores with a diameter of less than about 100 nm, macroscopic pores having a diameter of about 100-100,000 nm, a ratio of a volume of the macroscopic pores to a volume of the microscopic pores that is greater than about 150%, and a retentivity of less than about 1.0 g/dL; and at least one vent-side particulate adsorbent volume comprising a particulate adsorbent having microscopic pores with a diameter of less than about 100 nm, macroscopic pores having a diameter of about 100-100,000 nm, a ratio of a volume of the macroscopic pores to a volume of the microscopic pores that is greater than about 150%, wherein the at least one vent-side particulate adsorbent volume has a butane retentivity of less than 1.0 g/dL. In certain embodiments, the vent-side particulate adsorbent volume has a flow restriction property of less than 40 Pa/cm when a 46 cm/s apparent linear air flow velocity is applied to a 43 mm diameter bed of the vent-side particulate adsorbent volume. In additional embodiments, the at least one vent-side particulate adsorbent volume has a flow restriction of less than 0.3 kPa under 40 lpm air flow. In further embodiments, the vent-side particulate adsorbent volume has a length to diameter ratio of 2 or greater. In additional embodiments, the at least one fuel-side adsorbent volume has a nominal BWC of greater than 8 g/dL, a nominal IAC at 25 C of more than 35 g/L between vapor concentrations of 5 vol % and 50 vol % n-butane, or both.

In certain embodiments, the evaporative emission control canister system further comprises at least one vent-side subsequent adsorbent volume, wherein the at least one vent-side subsequent adsorbent volume has a nominal BWC of less than 8 g/dL, a nominal IAC at 25 C of less than 35 g/L between vapor concentrations of 5 vol % and 50 vol % n-butane, or both. In certain embodiments, the at least one fuel-side adsorbent volume, the at least one vent-side particulate volume or both has a ratio of a volume of the macroscopic pores to a volume of the microscopic pores that is greater than about 200%, wherein the at least one vent-side particulate adsorbent volume has a butane retentivity of less than 1.0 g/dL.

In any of the aspects or embodiments described herein, the system further comprises at least one of: a fuel vapor inlet conduit that connects the evaporative emission control canister system to a fuel tank; a fuel vapor purge conduit that connects the evaporative emission control canister system to an air induction system of the engine; a vent conduit for venting the evaporative emission control canister system and for admission of purge air to the evaporative emission control canister system; or a combination thereof.

In some embodiments, the system has at least one of: a fuel vapor flow path from the fuel vapor inlet conduit through each of the plurality of adsorbent volumes (i.e., at least one fuel-side adsorbent volume upstream of at least one vent-side particulate adsorbent volume upstream, and optionally at least one subsequent adsorbent volume) to the vent conduit; an air flow path from the vent conduit through each of the plurality of adsorbent volumes (i.e., the optional at least one subsequent adsorbent volume, the at least one vent-side particular adsorbent volume, and the at least one fuel-side adsorbent volume) to the fuel vapor purge outlet; or both.

In yet another embodiment, a packed bed of the at least one vent-side particulate adsorbent volume has a pressure drop that is <40 Pa/cm at 46 cm/s apparent linear air flow velocity.

In another aspect, the present disclosure provides an evaporative emission control system comprising: a fuel tank for storing fuel; an engine having an air induction system and adapted to consume the fuel; an evaporative emission control canister system; a fuel vapor purge conduit connecting the evaporative emission control canister system to the air induction system of the engine; and a vent conduit for venting the evaporative emission control canister system and for admission of purge air to the evaporative emission control canister system, wherein the evaporative emission control canister system is defined by: a fuel vapor inlet conduit connecting the evaporative emission control canister system to the fuel tank, a fuel vapor flow path from the fuel vapor inlet conduit through a plurality of adsorbent volumes to the vent conduit, and an air flow path from the vent conduit through the plurality of adsorbent volumes and the fuel vapor purge outlet.

In certain embodiments, the evaporative emission control system comprises one or more canisters comprising a plurality of adsorbent volumes including at least one vent-side particulate adsorbent volume comprising a particulate adsorbent volume, e.g., a low retentivity particulate adsorbent having at least one of (i) microscopic pores with a diameter of less than about 100 nm, macroscopic pores having a diameter of about 100-100,000 nm, a ratio of a volume of the macroscopic pores to a volume of the microscopic pores (M/m) that is greater than about 150%, (ii) a retentivity of from about 1-0.25 g/dL or less, (iii) a particle diameter of from about 210 mm or (iv) a combination thereof. In certain embodiments, the particle diameter is from about 3-10 mm, from about 3-9 mm, from about 3-8 mm, from about 3-7 mm, from about 3-6 mm, from about 3-5 mm, from about 2-9 mm, from about 2-8 mm, from about 2-7 mm, or from about 2-6 mm.

In certain embodiments, the at least one vent-side particulate adsorbent volume has a length/diameter (L/D) ratio of at least 0.5, 1, 1.5, 2 or more.

In other embodiments, the evaporative emission control system comprises a plurality of canisters that are connected to permit sequential contact by fuel vapor.

In a further aspect, the present disclosure provides a method for reducing fuel vapor emissions in an evaporative emission control system, the method comprising contacting the fuel vapor with at least one vent-side particulate adsorbent comprising at least one of microscopic pores with a diameter of less than about 100 nm; macroscopic pores having a diameter of about 100-100,000 nm; and a ratio of a volume of the macroscopic pores to a volume of the microscopic pores (M/m) that is greater than about 150%, a retentivity of from about 1-0.25 g/dL or less, a particle diameter of from 3-6 mm or a combination thereof.

In some embodiments, the method further comprises contacting the fuel vapor with at least one fuel-side adsorbent volume as described herein prior to contacting the at least one vent-side particulate adsorbent as described herein.

In any of the aspects or embodiments described herein, the adsorbents are located within a single canister. In particular embodiments, the adsorbents are located within a plurality of canisters that are connected to permit sequential contact by the fuel vapor.

The preceding general areas of utility are given by way of example only and are not intended to be limiting on the scope of the present disclosure and appended claims. Additional objects and advantages associated with the compositions, methods, and processes of the present disclosure will be appreciated by one of ordinary skill in the art in light of the instant claims, description, and examples. For example, the various aspects and embodiments of the present disclosure may be utilized in numerous combinations, all of which are expressly contemplated by the present disclosure. These additional advantages objects and embodiments are expressly included within the scope of the present disclosure. The publications and other materials used herein to illuminate the background of the invention, and in particular cases, to provide additional details respecting the practice, are incorporated by reference.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating an embodiment of the invention and are not to be construed as limiting the invention. Further objects, features and advantages of the invention will become apparent from the following detailed description taken in conjunction with the accompanying figures showing illustrative embodiments of the invention, in which:

FIGS. 3A, 3B, 3C, 3D, 3E, 3F, 3G, 3H1, 3H2, and 3I illustrate examples of alternative adsorbent morphologies of the low retentivity particulate adsorbent.

FIG. 4 is a cross-sectional view of an apparatus for measuring pressure drop produced by the particulate adsorbent.

FIGS. 5, 6, 7, 8, 9, 10, 11, and 12 help to illustrate how Nominal Volume Apparent Density is calculated.

FIG. 14 shows Table 1. Main canister configuration, including in certain embodiments, main canisters comprising multiple chambers and/or multiple adsorbent volumes.

FIG. 15 shows Table 2-A, Table 2-B, and Table 2-C. Supplemental canister configuration.

FIG. 16 shows Table 3-A, Table 3-B, and Table 3-C, which provides supplemental canister vent-side subsequent adsorbent volume information for Examples 29-33, 73, 74, 94, 96, and 106-111.

DETAILED DESCRIPTION

Figure 1:
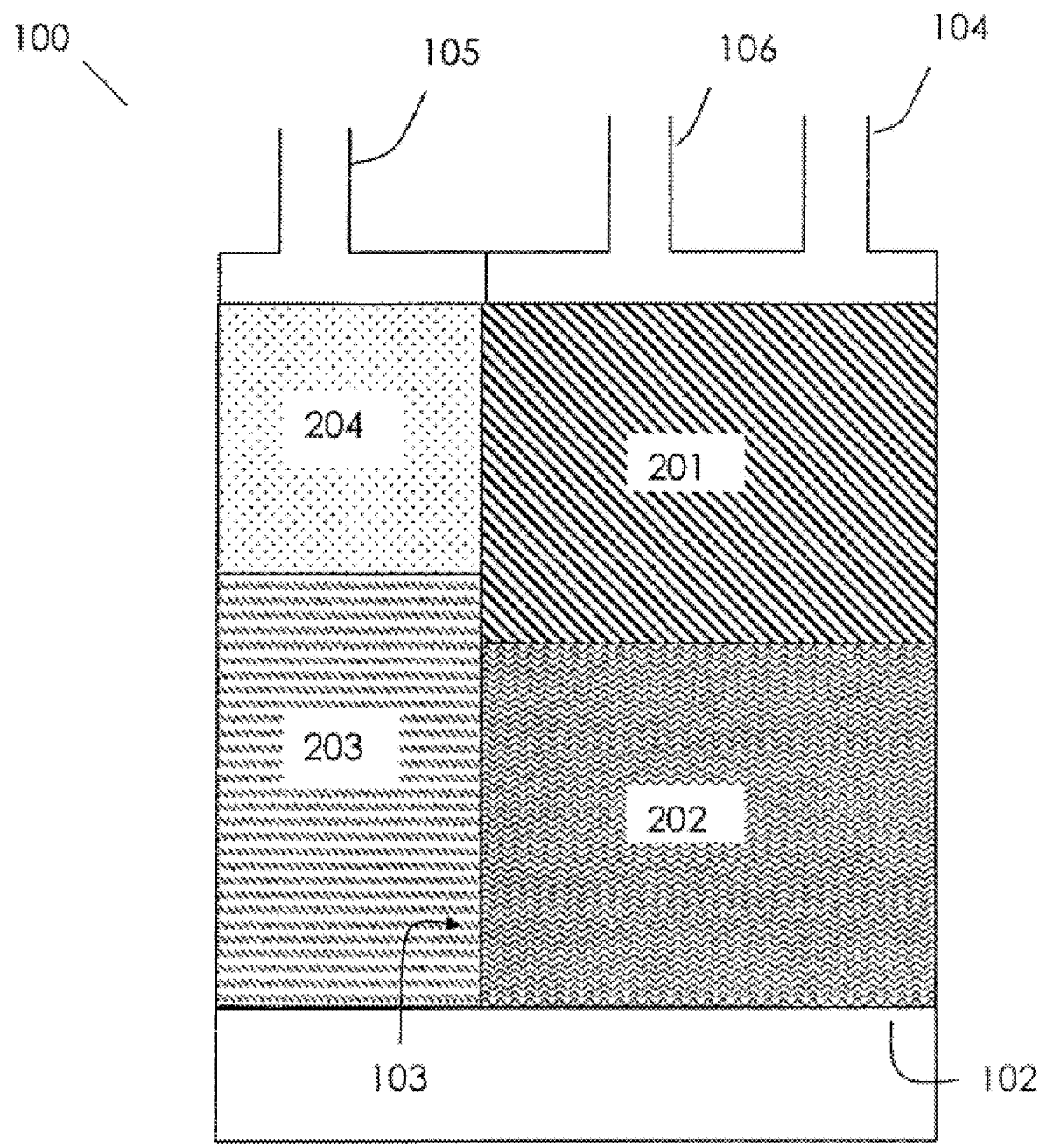
FIG. 1 illustrates a cross-sectional view of an evaporative emission control canister system according to the present disclosure.

The present disclosure will now be described more fully hereinafter, but not all embodiments of the disclosure are shown. While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular structure or material to the teachings of the disclosure without departing from the essential scope thereof.

The drawings accompanying the application are for illustrative purposes only. They are not intended to limit the embodiments of the present disclosure. Additionally, the drawings are not drawn to scale. Elements common between figures may retain the same numerical designation.

Where a range of values is provided, it is understood that each intervening value between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either both of those included limits are also included in the present disclosure.

The following terms are used to describe the present invention. In instances where a term is not specifically defined herein, that term is given an art-recognized meaning by those of ordinary skill applying that term in context to its use in describing the present invention.

The articles "a" and "an" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the 10 United States Patent Office Manual of Patent Examining Procedures, Section 2111.03.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a nonlimiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc. It should also be understood that, unless clearly indicated to the contrary, in any methods claimed herein that include more than one step or act, the order of the steps or acts of the method is not necessarily limited to the order in which the steps or acts of the method are recited.

As used herein, the terms "gaseous" and "vaporous" are used in a general sense and, unless the context indicates otherwise, are intended to be interchangeable.

The term "adsorbent component" or "adsorbent volume," as used herein, refers to an adsorbent material or adsorbent containing material along vapor flow path, and may consist of a bed of particulate material, a monolith, honeycomb, sheet or other material.

As described herein, the term "upstream" refers to a location/volume within the system that comes into contact with a fluid, e.g. fuel vapor, prior to or before another location/volume of the system. That is, an upstream location/volume is located toward the fuel vapor inlet relative to a location/volume.

As described herein, the term "downstream" refers to a location/volume within the system that comes into contact with a fluid, e.g. fuel vapor, after or subsequent to another location/volume of the system. That is, a downstream location/volume is located distal to the fuel vapor inlet relative to a location/volume.

The description provides an evaporative emission control canister systems including one or more canisters comprising at least one particulate adsorbent volume as described herein. The canisters can further comprise additional adsorbent volumes as described herein, e.g., at least one fuel-side adsorbent volume, and/or at least one vent-side subsequent adsorbent volume. In a preferred embodiment, the at least one particulate adsorbent volume is located downstream in the fluid path from the fuel-side adsorbent volume (i.e., vent-side particulate adsorbent volume). In additional embodiments, the vent-side particulate adsorbent volume is a low retentivity vent-side particulate adsorbent volume. As used herein, unless the context indicates otherwise, "low retentivity" or "low butane retentivity" refers to a butane retentivity of less than about 2 g/dL, and preferably less than about 1 g/dL.

Evaporative Emission Canister Systems

FIG. 1 illustrates a non-limiting example of some embodiments of the evaporative emission control canister system as described herein comprising a single canister having at least one adsorbent volume, such as a fuel-side adsorbent volume and at least one vent-side adsorbent volume (i.e., downstream from the initial adsorbent). Canister system 100 includes a support screen 102, a dividing wall 103, a fuel vapor inlet 104 from a fuel tank, a vent port 105 opening to an atmosphere, a purge outlet 106 to an engine, an fuel-side adsorbent volume 201, and at least one vent-side adsorbent volume 202, 203, 204. It should be noted, however, that any particular adsorbent volume could include one or more of 201, 202, 203, and 204. That is, a fuel-side adsorbent volume could include 201 and 202, and/or a vent-side adsorbent volume could include 203 and 204. The adsorbent volumes are connected (in fluid communication) to permit directional and sequential contact by a fluid (e.g., air, gas or fuel vapor).

When an engine is off, the fuel vapor from a fuel tank enters the canister system 100 through the fuel vapor inlet 104. In this example, the fuel vapor diffuses into the initial fuel-side adsorbent volume 201, and then the at least one vent-side (i.e., downstream) adsorbent volume before being released to the atmosphere through the vent port 105 of the canister system. Once the engine is turned on, ambient air is drawn into the canister system 100 through the vent port 105. The purge air flows through the at least one vent-side (i.e., downstream) adsorbent volume 204, 203, 202 and then the fuel-side adsorbent volume 201, and desorbs the fuel vapor adsorbed on the adsorbent volumes 204, 203, 202, 201 before entering an internal combustion engine through the purge outlet 106.

The evaporative emission control canister system may include an empty volume within the canister. As used herein, the term "empty volume" refers to a volume not including any adsorbent. Such volume may comprise any non-adsorbent including, but not limited to, air gap, foam spacer, screen, or combinations thereof. The empty volume can be located in any of the depicted volumes 201, 202, 203, 204 shown in FIG. 1 or found in between, before, or after any of the depicted volumes 201, 202, 203, 204.

Figure 2:
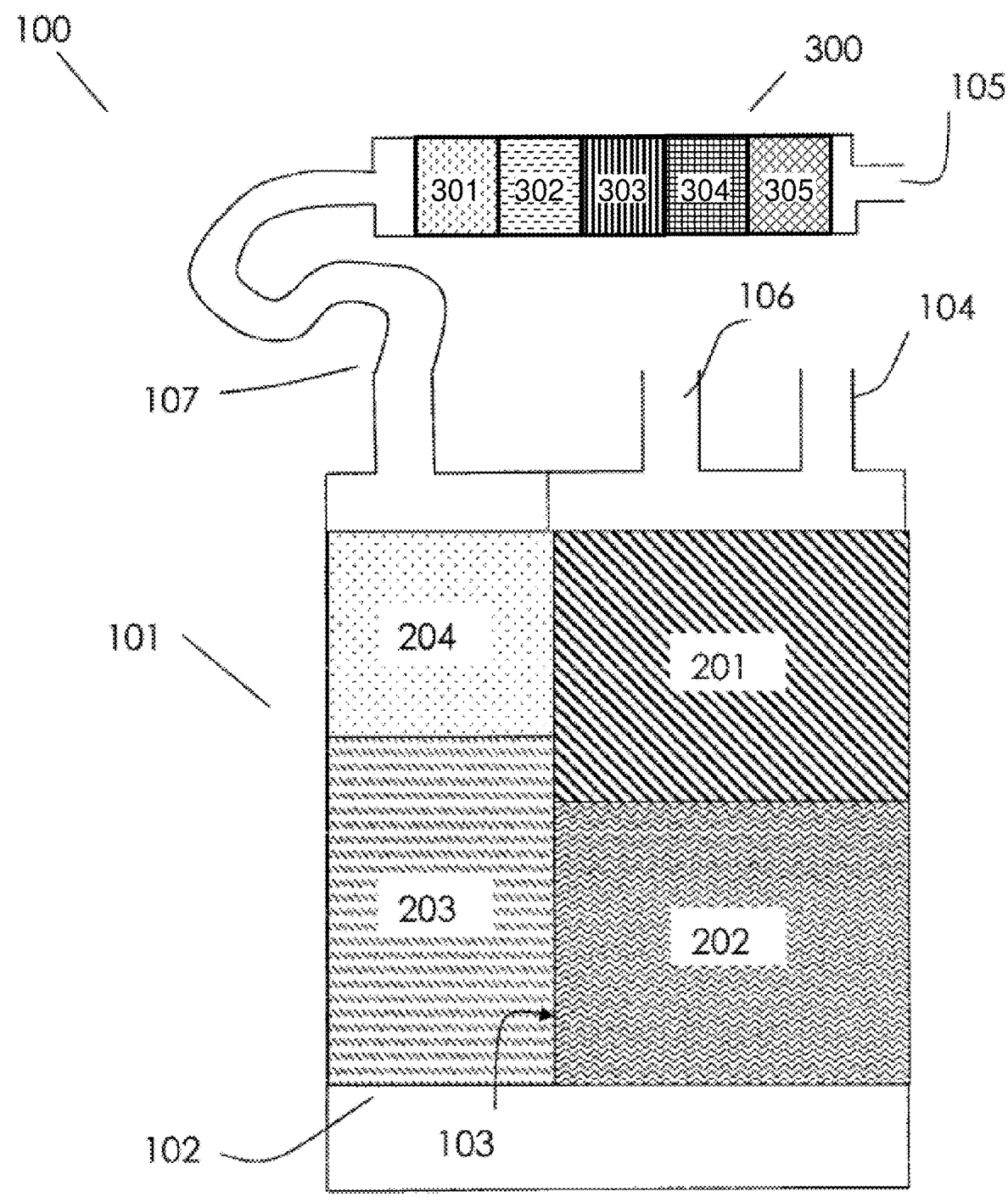
FIG. 2 illustrates a cross-sectional view of an evaporative emission control canister system according to the present disclosure.

FIG. 2 shows a non-limiting example of further embodiments of the evaporative emission control canister system that includes more than one canister comprising a plurality of adsorbent volumes. For example, a fuel-side adsorbent volume and at least one vent-side adsorbent volume are located in separate canisters, wherein the adsorbent volumes are connected (in fluid communication) to permit directional and sequential contact by fuel vapor from one volume (and canister) to the next. As illustrated in FIG. 2, the canister system 100 includes a main canister 101, a support screen 102, a dividing wall 103, a fuel vapor inlet 104 from a fuel tank, a vent port 105 opening to an atmosphere, a purge outlet 106 to an engine, an initial fuel-side adsorbent volume 201 in the main canister 101, vent-side adsorbent volumes 202, 203, 204 downstream from the initial fuel-side adsorbent volume 201 in the main canister 101, a supplemental canister 300 that includes at least one additional vent-side adsorbent volume 301, 302, 303, 304, 305, and a conduit 107 connecting the main canister 101 to the supplemental canister 300. Similar to that of the main canister, the additional vent-side adsorbent volume in the supplemental canister can comprise a single adsorbent located at multiple of the depicted volumes 301, 302, 303, 304, 305.

Furthermore, the supplemental canister of the evaporative emission control canister system may include an empty volume can be found at any of the depicted volumes 301, 302, 303, 304, 305 shown in FIG. 2 or found in between, before, or after any of the depicted volumes 301, 302, 303, 304, 305. For example, at least one of 302, 304, or both are empty volumes. As previously discussed, the term "empty volume" refers to a volume not including any adsorbent. Such volume may comprise any non-adsorbent including, but not limited to, air gap, foam spacer, screen, conduit, or combinations thereof.

When the engine is off, the fuel vapor from a fuel tank enters the canister system 100 through the fuel vapor inlet 104 into the main canister 101. The fuel vapor diffuses through the initial fuel-side adsorbent volume 201 and then the vent-side adsorbent volumes (202, 203, and 204) in the main canister 101 before entering the supplemental canister 300 via the conduit 107. The fuel vapor diffuses through the vent-side adsorbent volume or volumes 301, 302, 303, 304, 305 inside the supplemental canister 300 before being released to the atmosphere through the vent port 105 of the canister system. Once the engine is turned on, ambient air is drawn into the canister system 100 through the vent port 105. The purge air flows through the vent-side adsorbent volume or volumes 305, 304, 303, 302, 301 in the supplemental canister 300, the vent-side adsorbent volumes (204, 203, 202) in the main canister 101, and then the fuel-side adsorbent volume 201 in the main canister 101, to desorb the fuel vapor adsorbed on the adsorbent volumes (305, 304, 303, 302, 301, 204, 203, 202, 201) before entering the internal combustion engine through the purge outlet 106.

Furthermore, the evaporative emission control canister system may include an empty volume between the main canister and the supplemental canister.

When desired, the evaporative emission control canister system may include more than one supplemental canister, as describe herein. The evaporative emission control canister system may further include one or more empty volumes between the main canister and a first supplemental canister, between the supplement canisters, and/or at the end of the last supplemental canister. By way of non-limiting example, the evaporative emission control canister system may include a main canister, a first supplemental canister, a second supplemental canister, a third supplemental canister, an empty volume between the main canister and a first supplemental canister, an empty volume between the first and second supplemental canister, and an empty volume at the end of the third supplemental canister. Each of the supplemental canisters can further include one or more additional adsorbent volumes.

When desired, the total adsorbent volume (i.e., the sum of the adsorbent volumes) may be the same as the volume of the evaporative emission control canister system. Alternatively, the total adsorbent volume may be less than the volume of the evaporative emission control canister system.

Thus, one aspect, the disclosure provides an evaporative emission control canister system comprising one or more canisters having a plurality of chambers, each defining a volume, which are connected or in fluid communication permitting a fluid (e.g., air, gas or fuel vapor) to flow directionally and sequentially from one chamber to the next, wherein at least one chamber comprises at least one particulate adsorbent volume that includes a particulate adsorbent having microscopic pores with a diameter of less than about 100 nm, macroscopic pores having a diameter of about 100-100,000 nm, and a ratio of a volume of the macroscopic pores to a volume of the microscopic pores that is greater than about 150%, and wherein the at least one particulate adsorbent volume has at least one of: (i) a flow restriction property of less than 40 Pa/cm pressure drop under conditions of 46 cm/s apparent linear air flow velocity applied to a 43 mm diameter bed of the particulate adsorbent material, (ii) a flow restriction of less than 0.3 kPa under 40 lpm air flow, (iii) a butane retentivity of less than about 0.5 g/dL, (iv) a length to diameter (L/D) ratio of greater than about 2 or (v) a combination thereof.

In certain embodiments, canister system comprises at least one additional adsorbent volume. In certain embodiments, the adsorbent volumes are located within a single canister or within a plurality of canisters that are connected to permit sequential contact by the fuel vapor.

In certain embodiments, the canister system further comprises at least one fuel-side adsorbent volume, wherein the at least one fuel-side adsorbent volume has a nominal BWC of >8 g/dL, a nominal IAC at 25° C. of >35 g/L between vapor concentrations of 5 vol % and 50 vol % n-butane, or both.

In certain embodiments, the canister system further comprises at least one vent-side subsequent adsorbent volume, wherein the at least one vent-side subsequent adsorbent volume has a nominal BWC of less than 8 g/dL, a nominal IAC at 25° C. of less than 35 g/L between vapor concentrations of 5 vol % and 50 vol % n-butane, or both. In certain embodiments, the at least one particulate adsorbent volume, the at least one vent-side subsequent adsorbent volume or both have a BWC of less than 8 g/dL, an IAC at 25° C. of less than 35 g/L between vapor concentrations of 5 vol % and 50 vol % n-butane.

In certain embodiments, the evaporative emission control canister system comprises at least one fuel-side adsorbent volume having a nominal butane working capacity (BWC) of at least 8 g/dL (e.g., at least 10 g/L), a nominal incremental adsorption capacity (IAC) at 25° C. of at least 35 g/L between vapor concentrations of 5 vol % and 50 vol % n-butane, or both.

In certain embodiments, the adsorbent volumes are located within a single canister or within a plurality of canisters that are connected to permit sequential contact by the fuel vapor.

In certain embodiments, the particulate adsorbent volume has an M/m ratio that is greater than about 200%. In certain embodiments, the particulate adsorbent volume has a butane retentivity of less than about 2.0 g/dL or less than 1.0 g/dL or less than 0.5 g/dL.

In certain embodiments, the at least one particulate adsorbent is located on the vent-side of the canister system, the fuel-side of the canister system or both.

In certain embodiments, the evaporative emission control canister system comprises at least one fuel-side adsorbent volume, at least one vent-side subsequent adsorbent volume or both.

In certain embodiments, the adsorbent volumes are located within a single canister or within a plurality of canisters that are connected to permit sequential contact by the fuel vapor. In certain embodiments, the at least one particulate adsorbent volume, the at least one fuel-side adsorbent volume or both have a BWC of at least 8 g/dL (e.g., at least 10 g/L), an IAC at 25° C. of at least 35 g/L between vapor concentrations of 5 vol % and 50 vol % n-butane, or both. In certain embodiments, the at least one particulate adsorbent volume, the at least one vent-side subsequent adsorbent volume or both have a BWC of less than 8 g/dL, an IAC at 25° C. of less than 35 g/L between vapor concentrations of 5 vol % and 50 vol % n-butane, or both. In certain embodiments, the particulate volume has a ratio of a volume of the macroscopic pores to a volume of the microscopic pores that is greater than about 200%.

In another aspect, the description provides an evaporative emission control canister system including one or more canisters comprising at least one fuel-side adsorbent volume (i.e., adsorbent volume at or near the fuel tank vapor inlet 104), and at least one vent-side particulate adsorbent volume, e.g., a vent-side low retentivity particulate adsorbent volume. The term "vent-side" refers to a position that is downstream or closer to the vent port relative to the at least one fuel-side adsorbent volume. As such, while the vehicle is at rest, the at least one fuel-side adsorbent volume comes into contact with the fuel vapor from the gas tank prior to any other adsorbent volumes which are located downstream from the fuel-side adsorbent volume in the fluid path from fuel tank to vent port (i.e., downstream directionally from 104 to 105).

In some embodiments, the system comprises a plurality of vent-side particulate adsorbent volumes, e.g., vent-side low retentivity particulate adsorbent volumes, that are configured to permit sequential contact by a fluid, e.g., a fuel vapor. In certain embodiments, for example, the adsorbents are connected in series defining a fluid flow path therethrough. In certain embodiments, the system comprises a plurality of canisters that are connected to permit sequential contact by a fluid, e.g., a fuel vapor.

With reference to FIGS. 1 and 2, the adsorbents can be located within a single canister or within multiple canisters connected to permit sequential contact by a fluid, e.g. fuel vapor (e.g., 2, 3, 4, 5, 6, 7, or 8 canisters). In a particular embodiment, the adsorbents are located within a plurality of canisters that are connected to permit sequential contact by the fuel vapor. For example, in certain embodiments, the vent-side particulate adsorbent volume e.g., a vent-side low retentivity particulate adsorbent volume, is in at least one volume of the main canister, e.g., with reference to FIGS. 1 and 2, 202, 203, or 201; and/or at least one volume of a supplemental canister, e.g., 301, 302, 303, 304, or 305. As such, in certain embodiments, the low retentivity particulate adsorbent can be found in at least one volume of the main canister 201, 202, 203, and 204; at least on volume of a supplemental canister 301, 302, 303, 304, 305, or a combination thereof.

The disclosure also contemplates including additional adsorbent volumes in any number of combinations that would be readily understood from the disclosure. For example, an additional vent-side or low retentivity particulate adsorbent as described herein could be present after or downstream of a vent-side subsequent adsorbent volume. If a supplemental canister is present, the supplemental canister may comprise a vent-side or low retentivity adsorbent volume at the vent port side (e.g., volume 305) and the main canister side (e.g., volume 301) with downstream vent-side subsequent adsorbent volume(s) located therebetween (e.g., volumes 302, 303, 304). Similarly, a vent-side or low retentivity adsorbent can be present on the main canister side of the supplemental canister (e.g., volume 301) and the supplemental canister side of the main canister (e.g., volume 204), wherein the canister system comprises high butane working capacity adsorbent upstream from the vent-side or low retentivity adsorbent. The system could also be configured to include a vent-side subsequent adsorbent volume (e.g., volume 304) downstream from the vent-side or low retentivity adsorbent volume (e.g., volume 301), which could optionally include a further low retentivity adsorbent volume after the subsequent adsorbent volume (e.g., volume 305).

In any of the aspects or embodiments described herein, the vent-side particulate adsorbent has microscopic pores with a diameter of less than about 100 nm, macroscopic pores having a diameter of about 100-100,000 nm and a ratio of a volume of the macroscopic pores to a volume of the microscopic pores (M/m) that is greater than about 150%, 160%, 170%, 180%, 190%, 200%, 210%, 220%, 250%, 275%, 280%, 300% or more. In certain embodiments, the vent-side particulate adsorbent has an M/m ratio of from 150% to about 170%, from about 160% to about 180%, from about 170% to about 190%, from about 180% to about 200%, from 190% to about 210%, from 200% to about 220%, or greater than 220%. In other embodiments, the ratio of volumes is greater than about 150% to about 1000%, greater than about 150% to about 800%, greater than about 150% to about 600%, greater than about 150% to about 500%, greater than about 150% to about 400%, greater than about 150% to about 300%, greater than about 150% to about 200%, about 175% to about 1000%, about 175% to about 800%, about 175% to about 600%, about 175% to about 500%, about 175% to about 400%, about 175% to about 300%, about 175% to about 200%, about 200% to about 800%, about 200% to about 600%, about 200% to about 500%, about 200% to about 400%, about 200% to about 300%, about 300% to about 800%, about 300% to about 600%, about 300% to about 500%, about 300% to about 400%, about 400% to about 800%, about 400% to about 600%, about 400% to about 500%, about 500% to about 800%, about 500% to about 600%, or about 600% to about 800%.

In any of the aspects or embodiments described herein, the vent-side particulate adsorbent volume, e.g., vent-side low retentivity particulate adsorbent volume, has a flow restriction of less than about 0.3 kPa under 40 lpm air flow, flow restriction properties of less than 40 Pa/cm pressure drop under 46 cm/s apparent linear air flow velocity or both.

In any of the aspects or embodiments described herein the vent-side particulate adsorbent volume, e.g., vent-side low retentivity particulate adsorbent volume, has a length to diameter ratio (L/D) of about 0.5, 1, 1.5, 2, 2.5, 3, 3.5, 4, 4.5, 5, 5.5, 6, 6.5 or greater, including all values in between. In certain embodiments, the vent-side particulate adsorbent volume is elongated, with an L/D ratio of greater than about 2. In certain embodiments, the L/D ratio is from about 1.0 to about 6.0, from about 1.25 to about 5.75, from about 1.5 to about 5.5, from about 1.75 to about 5.0, or from about 2 to about 4.75.

Figure 21:
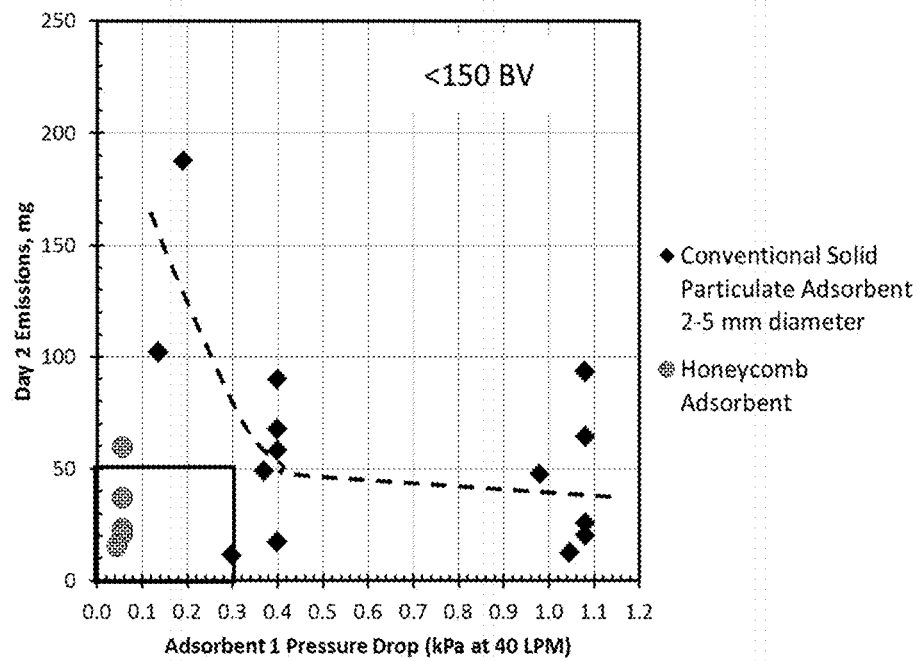
FIG. 21 illustrates the well-known performance tradeoff with conventional solid particulate adsorbents (cylindrically shaped pellets) with diameters of 2-5 mm in providing the target flexibility of reasonable flow restriction and DBL emissions performance. These examples are for main canisters with one or more vent-side adsorbent volumes with alternative adsorbent fills, as described in Tables 2 and 3.

In any of the aspects or embodiments described herein, the at least one vent-side particulate adsorbent volume, e.g., vent-side low retentivity particulate adsorbent volume, has a butane retentivity of < about 2 g/dL, < about 1.5 g/dL, < about 1 g/dL, < about 0.9 g/dL, < about 0.8 g/dL, < about 0.7 g/dL, < about 0.6 g/dL, < about 0.5 g/dL, < about 0.4 g/dL, < about 0.3 g/dL, < about 0.2 g/dL, or < about 0.1 g/dL. In certain embodiments, the at least one vent-side particulate adsorbent volume, e.g., vent-side low retentivity particulate adsorbent volume, has a butane retentivity of from about 0.01 g/dL to about 2.5 g/dL, from about 0.01 g/dL to about 2.0 g/dL, from about 0.01 g/dL to about 1.5 g/dL, from about 0.01 g/dL to about 1.0 g/dL, from about 0.01 g/dL to about 0.75 g/dL, from about 0.25 g/dL to about 1.00 g/dL, from about 0.25 g/dL to about 0.75 g/dL, from about 0.25 g/dL to about 0.50 g/dL, from about 0.50 g/dL to about 1.00 g/dL, from about 0.50 g/dL to about 0.75 g/dL, or from about 0.75 g/dL to about 1.00 g/dL An advantageous feature of the particulate adsorbent described herein, e.g., the low retentivity adsorbent as described herein, is that it has low flow restriction properties, sufficiently so, that it may be used as a replacement for, e.g., a foam, polymer or paper sheet, or a honeycomb monolith adsorbent. For example, FIG. 21 shows how prior art particulate adsorbent of 2-3 mm in diameter has many times the flow restriction of a commercially available carbon honeycomb employed on the vent-side of a canister system as an emissions "scrubber." Thus, in any of the aspects or embodiments, the vent-side particulate adsorbent, e.g., vent-side low retentivity adsorbent has particle diameter that is from about 3-10 mm, from about 3-9 mm, from about 3-8 mm, from about 3-7 mm, from about 3-6 mm, from about 3-5 mm, or from about 3-4 mm.

In certain embodiments, the main canister comprises a high butane working capacity adsorbent, the vent-side of the main canister and/or the main canister-side of a supplemental canister comprises low retentivity particulate adsorbent as described herein, and the vent portion of the supplemental canister comprises a vent-side subsequent adsorbent volume. In certain embodiments, the vent-side subsequent adsorbent volume is a material with low flow restriction, e.g., a foam, polymer or paper sheet, or honeycomb such as an activated carbon honeycomb.

In certain embodiments, the at least one fuel-side adsorbent volume has at least one of a high butane working capacity (BWC) relative to the vent-side adsorbent volume, an effective incremental adsorption capacity of greater than about 35 grams n-butane per liter (g/L) between vapor concentration of 5 vol % and 50 vol % n-butane, or both.

In any of the aspects or embodiments described herein, the canister system fuel-side adsorbent volume has at least one of: i) a nominal butane working capacity (BWC) greater than 8, 9, 10, 11, 12, 13, 14, 15, 16, 17, 18, 19, 20, 21, 22, 23, 24, 25 g/dL or more grams per deciliter (g/dL), ii) an incremental adsorbent capacity of greater than 35, 36, 37, 38, 39, 40, 41, 42, 43, 44, 45, 46, 47, 48, 49, 50, 51, 52, 53, 54, 55, 60, 65, 70, 75, 80, 85, 90 or more grams n-butane per liter (g/L) between vapor concentration of 5 vol % and 50 vol % n-butane, or both.

In certain embodiments, the high butane working capacity adsorbent includes a high working capacity activated carbon. Such are commercially available as NUCHAR® BAX 1100, NUCHAR® BAX 1100 LD, NUCHAR® BAX 1500, and NUCHAR® BAX 1700 (Ingevity®, North Charleston, S.C., USA). The high butane working capacity volume could include a plurality of volumes comprising high butane working capacity adsorbent. For example, the main canister could include two high butane working capacity volumes (e.g., a NUCHAR® BAX 1100 volume and a NUCHAR® BAX 1500 volume).

In any of the aspects or embodiments described herein, the evaporative emission control canister system further comprises at least one vent-side subsequent adsorbent volume, wherein the at least one vent-side subsequent adsorbent volume has a nominal BWC of less than 8, 7, 6, 5, 4, 3, 2, or 1 g/dL, a nominal IAC at 25° C. of less than 35, 34, 33, 32, 31, 30, 29, 28, 37, 36, 35, 34 23, 22, 21, 20, 19, 18, 17, 16, 15, 14, 13, 12, 11, 10, 9, 8, 77, 6, 5, 4, 3, 2, or 1 g/L between vapor concentrations of 5 vol % and 50 vol % n-butane, or both. In certain embodiments, the at least one vent-side subsequent adsorbent volumes as a BWC of from about 1 g/dL to about 8 g/dL, from about 1 g/dL to about 7 g/dL, from about 1 g/dL to about 6 g/dL, from about 1 to about 5 g/dL, from about 1 g/dL to about 4 g/dL, or from about 1 g/dL to about 3 g/dL. In certain embodiments, the at least one vent-side subsequent adsorbent volumes as an IAC (grams n-butane/L) of from about 1 g/L to about 35 g/L, from about 2 g/L to about 30 g/L, from about 3 g/L to about 25 g/L, from about 3 g/L to about 20 g/L, from about 3 g/L to about 15 g/L, or from about 3 g/L to about 10 g/L between vapor concentrations of 5 vol % and 50 vol % n-butane.

In certain embodiments, the at least one vent-side subsequent adsorbent volume has at least one of: i) a BWC of less than about 8, 7, 6, 5, 4, 3, 2, or 1 g/dL, ii) an IAC of less than about 35, 30, 25, 20, 15, 10, or 5 grams n-butane/L between vapor concentrations of 5 vol % and 50 vol % n-butane, or iii) a combination thereof. In certain embodiments, the subsequent adsorbent volume is an activated carbon honeycomb.

In certain embodiments, the subsequent adsorbent volume is upstream, downstream or both (i.e., a vent-side subsequent adsorbent volume) in the vapor pathway from the vent-side particulate adsorbent volume as described herein.

In any of the aspects or embodiments described herein, the vent-side subsequent/downstream adsorbent/volume is selected from the group consisting of a honeycomb adsorbent (e.g., HCA, HCA-LBE, or Square HCA available from Ingevity®, North Charleston, S.C., USA), a monolith adsorbent, or both.

The disclosed evaporative emission control systems provide low diurnal breathing loss (DBL) emissions even under a low purge condition. In certain embodiments, the evaporative emission performance of the disclosed evaporative emission control system may be no more than 50 mg, or within the regulation limits defined by the California Bleed Emissions Test Procedure (BETP), which is no more than 20. In any aspect or embodiment described herein, the evaporative emission canister system described herein has a two-day DBL of from about 5 to about 50 mg, from about 6 to about 50 mg, from about 7 to about 50 mg, from about 8 to about 50 mg, from about 9 to about 50 mg, from about 10 to about 50 mg, from about 5 to about 45 mg, from about 5 to about 40 mg, from about 5 to about 35 mg, from about 5 to about 30 mg, from about 5 to about 20 mg, from about 5 to about 15 mg, or from about 5 to about 10 mg at no more than about 175, 150, 125, 120, 115, 110, 100 or less bed volumes of purge, or less than 315, 300, 275, 250, 225, 200, 175, 150 or less liters of purge as determined by the California Bleed Emissions Test Procedure (BETP).

The evaporative emission control system may provide low diurnal breathing loss (DBL) emissions even when being purged at or below 210 liters applied after the 40 g/hr butane loading step. In some embodiments, the evaporative emission control system may be purged at or below 157.5 liters applied after the 40 g/hr butane loading step.

The evaporative emission control system may provide low diurnal breathing loss (DBL) emissions even when being purged at or below 150 BV applied after the 40 g/hr butane loading step. The evaporative emission control system may provide low diurnal breathing loss (DBL) emissions even when being purged at or below 100 BV applied after the 40 g/hr butane loading step. In some embodiments, the evaporative emission control system may be purged at or below 75 BV applied after the 40 g/hr butane loading step.

In certain embodiments, the evaporative emission control canister system comprises at least one vent-side particulate adsorbent volume, e.g., a vent-side low retentivity particulate adsorbent volume, wherein the at least one vent-side particulate adsorbent has an M/m ratio of greater than 150%, and at least one of relatively low flow restriction properties, butane retentivity of <1.0 g/dL or both. For example, in certain embodiments, the vent-side particulate adsorbent has an M/m of greater than 150%, and at least one of at least one of a butane retentivity of less than about 0.5 g/dL, a flow restriction of less than less than 40 Pa/cm pressure drop under 46 cm/s apparent linear gas flow velocity, a flow restriction of less than 0.3 kPa under 40 lpm air flow, a length to diameter ratio (L/D) of greater than 2 or a combination thereof. In further embodiments, the vent-side particulate adsorbent volume has an M/m of greater than 200%, and at least one of at least one of a butane retentivity of less than about 1 g/dL, a flow restriction of less than less than 40 Pa/cm pressure drop under 46 cm/s apparent linear gas flow velocity, a flow restriction of less than 0.3 kPa under 40 lpm air flow, a length to diameter ratio (L/D) of greater than 2 or a combination thereof.

In certain embodiments, the vent-side particulate adsorbent, e.g., vent-side low retentivity particulate adsorbent, as described herein has an M/m of is greater than 150% with flow restriction properties of less than 40 Pa/cm pressure drop under 46 cm/s apparent linear air flow velocity. In certain embodiments, the M/m for the vent-side particulate adsorbent, e.g., vent-side low retentivity particulate adsorbent, is greater than 200%, and the butane retentivity is less than 1 g/dL. In certain embodiments, the M/m for the vent-side particulate adsorbent is greater than 150% and the butane retentivity is less than 0.5 g/dL.

In certain embodiments, the evaporative emission control system comprises one or more canisters comprising a plurality of adsorbent volumes including at least one vent-side particulate adsorbent volume comprising, e.g., a low retentivity particulate adsorbent having at least one of (i) microscopic pores with a diameter of less than about 100 nm, macroscopic pores having a diameter of about 100-100,000 nm, a ratio of a volume of the macroscopic pores to a volume of the microscopic pores (M/m) that is greater than about 150%, (ii) a butane retentivity of from about 1 g/dL to about 0.25 g/dL or less, (iii) a particle diameter of from about 210 mm or (iv) a combination thereof.

In any of the aspects or embodiments described herein, the evaporative emission control canister system has a two-day DBL emissions of no more than about 50, 45, 40, 35, 30, 25, 20 mg at no more than about 175, 150, 125, 120, 115, 110, 100 or less bed volumes of purge or less than 315, 300, 275, 250, 225, 200, 175, 150 or less liters of purge as determined by the California Bleed Emissions Test Procedure (BETP).

In certain embodiments, the evaporative emission control canister system comprises at least one vent-side particulate adsorbent has an M/m>150%, wherein the vent-side particulate adsorbent volume, e.g., vent-side low retentivity particulate volume, has at least one of a flow restriction of less than less than 40 Pa/cm pressure drop under 46 cm/s apparent linear gas flow velocity, or a flow restriction of less than 0.3 kPa under 40 lpm air flow, and wherein the canister system and has no more than 50 mg, or no more than 20 mg day 2 DBL emissions under less than 100 bed volumes or less than 210 liters of purge in the BETP test.

In a further aspect, the present disclosure provides an evaporative emission control canister system comprising: one or more canisters comprising at least one vent-side particulate adsorbent volume having low retentivity, the low retentivity particulate adsorbent volume including one or more low retentivity particulate adsorbent materials. In certain embodiments, the low retentivity particulate adsorbent material has microscopic pores with a diameter of less than about 100 nm; macroscopic pores having a diameter of about 100-100,000 nm; and a ratio of a volume of the macroscopic pores to a volume of the microscopic pores that is greater than about 200%, wherein the particulate adsorbent material has a retentivity of about 1.0 g/dL or less.

For example, the system may comprise an upstream adsorbent volume comprising a high butane working capacity adsorbent that is located upstream from or prior to a low retentivity adsorbent volume (i.e., the high butane working capacity adsorbent volume comes into contact with the fluid, e.g. a fuel vapor, before the low retentivity adsorbent). The high butane working capacity adsorbent volume may have an adsorbent with at least one of: a nominal butane working capacity of at least 8 g/dL (e.g., at least 10 g/dL); a nominal incremental adsorption capacity (IAC) of at least 35 g/L (e.g., at least 45 g/L); or a combination thereof.

The system of the present disclosure may comprise an adsorbent volume that is located downstream from or subsequent to a low retentivity adsorbent volume (i.e., the upstream adsorbent volume comes into contact with the fuel vapor after the low retentivity adsorbent volume). The downstream adsorbent volume may comprise an adsorbent that has: microscopic pores with a diameter of less than about 100 nm; macroscopic pores having a diameter of about 100-100,000 nm; and a ratio of a volume of the macroscopic pores to a volume of the microscopic pores that is less than or equal to about 150%. For example, the downstream or subsequent adsorbent may have a ratio of a volume of the macroscopic pores to a volume of the microscopic pores that is equal to or less than about 150%, equal to or less than about 145%, equal to or less than about 140%, equal to or less than about 135%, or equal to or less than about 130%.

In certain embodiments, the at least one vent-side particulate adsorbent volume e.g., a vent-side low retentivity particulate adsorbent volume, is included as an alternative to or in combination with one or more vent-side subsequent adsorbent volumes. The at least one fuel-side adsorbent volume, the at least one vent-side particulate adsorbent volume, and/or the at least one vent-side subsequent adsorbent volume can be contained either in a single canister or in separate canisters that are connected to permit sequential contact by fuel vapor (and conversely, purge air). In certain embodiments, the at least one vent-side subsequent adsorbent volume includes a non-particulate adsorbent material, e.g., a foam, monolith, a polymer or paper sheet, or honeycomb (e.g., activated carbon honeycomb), wherein the at least one vent-side subsequent adsorbent volume imposes low vapor or fluid flow restriction.

In certain embodiments, the evaporative emission control canister system comprises: at least one vent-side subsequent adsorbent volume e.g., a vent-side low retentivity particulate adsorbent volume, that is upstream of the at least one vent-side particulate adsorbent volume (i.e., located closer to the fuel-side adsorbent volume or fuel vapor inlet in the fluid path), at least one vent-side subsequent adsorbent volume that is downstream of the at least one vent-side particulate adsorbent volume (i.e., located closer to the vent port in the fluid path), or a combination thereof.

In certain embodiments, the evaporative emission control canister system comprises: at least one vent-side particulate adsorbent volume, e.g., a vent-side low retentivity particulate adsorbent volume, that is upstream of the at least one vent-side subsequent adsorbent volume (i.e., located closer to the fuel-side adsorbent volume or fuel vapor inlet in the fluid path), at least one vent-side particulate adsorbent volume that is downstream of the at least one vent-side subsequent adsorbent volume (i.e., located closer to the vent port in the fluid path), or a combination thereof.

In some embodiments, the evaporative emission control system may further include one or more heat input unit(s) for heating one or more adsorbent volume(s) and/or one or more empty volume(s). The heat input units may include, but are not limited to, internal resistive elements, external resistive elements, or heat input units associated with the adsorbent. The heat input unit associated with the adsorbent may be an element separate from the adsorbent (i.e., non-contacted with adsorbents). Alternatively, the heat input unit associated with the adsorbent may be a substrate or layer on to which the adsorbent is attached, bonded, non-bonded, or in physical contact. The heat input unit associated with the adsorbent may be adsorbent directly heated electrically by having appropriate resistivity. The resistivity properties of the adsorbent may be modified by the addition of conductive or resistive additives and binders in the original preparation of the adsorbent and/or in the forming of the adsorbent into particulate or monolithic forms. The conductive component may be conductive adsorbents, conductive substrates, conductive additives and/or conductive binders. The conductive material may be added in adsorbent preparation, added in intermediate shaping process, and/or added in adsorbent shaping into final form. Any mode of heat input unit may be used. By way of non-limiting example, the heat input unit may include a heat transfer fluid, a heat exchanger, a heat conductive element, and positive temperature coefficient materials. The heat input unit may or may not be uniform along the heated fluid path length (i.e., provide different local intensities). Furthermore, the heat input unit may or may not be distributed for greater intensity and duration of heating at different points along the heated fluid path length.

In general, the low retentivity particulate adsorbent comprises: an adsorbent having microscopic pores with a diameter of less than about 100 nm; macroscopic pores having a diameter of about 100-100,000 nm; and a ratio of a volume of the macroscopic pores to a volume of the microscopic pores is greater than about 150%, wherein the particulate adsorbent material has a retentivity of about 1.0 g/dL or less.

Any suitable adsorbent materials may be used in preparing the adsorbent volumes as described including, but not limited to, activated carbon, carbon charcoal, zeolites, clays, porous polymers, porous alumina, porous silica, molecular sieves, kaolin, titania, ceria, or combinations thereof. Activated carbon may be derived from various carbon precursors. By way of non-limiting example, the carbon precursors may be wood, wood dust, wood flour, cotton linters, peat, coal, coconut, lignite, carbohydrates, petroleum pitch, petroleum coke, coal tar pitch, fruit pits, fruit stones, nut shells, nut pits, sawdust, palm, vegetables such as rice hull or straw, synthetic polymer, natural polymer, lignocellulosic material, or combinations thereof. Furthermore, activated carbon may be produced using a variety of processes including, but are not limited to, chemical activation, thermal activation, or combinations thereof.

The described low retentivity particulate adsorbent may be at least one of activated carbon (which may be derived from at least one material selected from the group consisting of wood, wood dust, wood flour, cotton linters, peat, coal, coconut, lignite, carbohydrates, petroleum pitch, petroleum coke, coal tar pitch, fruit pits, fruit stones, nut shells, nut pits, sawdust, palm, vegetables, synthetic polymer, natural polymer, lignocellulosic material, and combinations thereof), carbon charcoal, molecular sieves, porous polymers, porous alumina, clay, porous silica, kaolin, zeolites, metal organic frameworks, titania, ceria, or a combination thereof.

A variety of adsorbent forms may be used. Non-limiting examples of the adsorbent forms may include granular, pellet, spherical, honeycomb, monolith, pelletized cylindrical, particulate media of uniform shape, particulate media of non-uniform shape, structured media of extruded form, structured media of wound form, structured media of folded form, structured media of pleated form, structured media of corrugated form, structured media of poured form, structured media of bonded form, non-wovens, wovens, sheet, paper, foam, or combinations thereof. The adsorbent (either as a single component or a blend of different components) may include a volumetric diluent. Non-limiting examples of the volumetric diluents may include, but are not limited to, spacer, inert gap, foams, fibers, springs, or combinations thereof. Furthermore, the adsorbents may be extruded into special thin-walled cross-sectional shapes, such as hollow-cylinder, star, twisted spiral, asterisk, configured ribbons, or other shapes within the technical capabilities of the art. In shaping, inorganic and/or organic binders may be used.

The honeycomb adsorbents may be in any geometrical shape including, but are not limited to, round, cylindrical, or square. Furthermore, the cells of honeycomb adsorbents may be of any geometry. Honeycombs of uniform cross-sectional areas for the flow-through passages, such as square honeycombs with square cross-sectional cells or spiral wound honeycombs of corrugated form, may perform better than round honeycombs with square cross-sectional cells in a right angled matrix that provides adjacent passages with a range of cross-sectional areas and therefore passages that are not equivalently purged. Without being bound by any theory, it is believed that the more uniform cell cross-sectional areas across the honeycomb faces, the more uniform flow distribution within the part during both adsorption and purge cycles, and, therefore, lower DBL emissions from the canister system.

The system of the present disclosure may comprise at least one of: a fuel vapor inlet conduit that connects the evaporative emission control canister system to a fuel tank; a fuel vapor purge conduit that connects the evaporative emission control canister system to an air induction system of the engine; a vent conduit for venting the evaporative emission control canister system and for admission of purge air to the evaporative emission control canister system; or a combination thereof. The system may be have at least one of: a fuel vapor flow path from the fuel vapor inlet conduit through each of the plurality of adsorbent volumes (i.e., an initial adsorbent volume upstream of at least one subsequent adsorbent volume, wherein at least one adsorbent volume includes low retentivity particulate adsorbent) to the vent conduit; an air flow path from the vent conduit through each of the plurality of adsorbent volumes (i.e., a subsequent adsorbent volume followed by an initial adsorbent upstream of the subsequent adsorbent) to the fuel vapor purge outlet; or both.

In another aspect, the present disclosure provides an evaporative emission control system comprising: a fuel tank for storing fuel; an engine having an air induction system and adapted to consume the fuel; an evaporative emission control canister system; a fuel vapor purge conduit connecting the evaporative emission control canister system to the air induction system of the engine; and a vent conduit for venting the evaporative emission control canister system and for admission of purge air to the evaporative emission control canister system, wherein the evaporative emission control canister system is defined by: a fuel vapor inlet conduit connecting the evaporative emission control canister system to the fuel tank, a fuel vapor flow path from the fuel vapor inlet conduit through a plurality of adsorbent volumes to the vent conduit, and an air flow path from the vent conduit through the plurality of adsorbent volumes and the fuel vapor purge outlet. The evaporative emission control system comprising: one or more canisters comprising a plurality of adsorbent volumes including at least one low retentivity adsorbent volume comprising a low retentivity particulate adsorbent having: microscopic pores with a diameter of less than about 100 nm; macroscopic pores having a diameter of about 100-100,000 nm; a ratio of a volume of the macroscopic pores to a volume of the microscopic pores that is greater than about 150%; and a retentivity of about 1.0 g/dL or less. The evaporative emission control system comprises a plurality of canisters that are connected to permit sequential contact by fuel vapor.

In some embodiments, the evaporative emission control system may include a heat unit to further enhance the purge efficiency. By way of non-limiting example, the evaporative emission control system may include a heat unit for heating the purge air, at least one of the low retentivity adsorbent volume and/or the subsequent adsorbent volume, or both.

According to an aspect, the present disclosure provides a method for reducing fuel vapor emissions in an evaporative emission control canister system, the method comprising contacting the fuel vapor with a particulate adsorbent volume e.g., a vent-side low retentivity particulate adsorbent volume, having microscopic pores with a diameter of less than about 100 nm, macroscopic pores having a diameter of about 100-100,000 nm, and a ratio of a volume of the macroscopic pores to a volume of the microscopic pores that is greater than about 150%, wherein the particulate adsorbent material has a flow restriction property of less than about 40 Pa/cm under conditions of 46 cm/s apparent linear air flow velocity applied to a 43 mm diameter bed of the particulate adsorbent material.

Fuel-Side and Vent-Side

In another aspect, the description provides an evaporative emission control canister system including one or more canisters comprising: at least one fuel-side particulate adsorbent volume comprising having microscopic pores with a diameter of less than about 100 nm, macroscopic pores having a diameter of about 100-100,000 nm, a ratio of a volume of the macroscopic pores to a volume of the microscopic pores that is greater than about 150%, and a retentivity of less than about 0.5 g/dL or a ratio of a volume of the macroscopic pores to a volume of the microscopic pores that is greater than about 200%, and a retentivity of less than about 1 g/dL; and at least one vent-side particulate adsorbent volume comprising a particulate adsorbent having microscopic pores with a diameter of less than about 100 nm, macroscopic pores having a diameter of about 100-100,000 nm, a ratio of a volume of the macroscopic pores to a volume of the microscopic pores that is greater than about 150%, wherein the at least one vent-side particulate adsorbent volume has a butane retentivity of less than 0.5 g/dL or a ratio of a volume of the macroscopic pores to a volume of the microscopic pores that is greater than about 200%, and a retentivity of less than about 1 g/dL. In certain embodiments, the fuel-side particulate adsorbent volume, the vent-side particulate adsorbent volume or both have a flow restriction property of less than 40 Pa/cm when a 46 cm/s apparent linear air flow velocity is applied to a 43 mm diameter bed of the vent-side particulate adsorbent volume. In additional embodiments, the at least one fuel-side particulate adsorbent volume, the at least one vent-side particulate adsorbent volume or both have a flow restriction of less than 0.3 kPa under 40 lpm air flow. In further embodiments, the at least one vent-side particulate adsorbent volume has a length to diameter ratio of 2 or greater. In additional embodiments, the at least one fuel-side adsorbent volume has a nominal BWC of greater than 8 g/dL, a nominal IAC at 25° C. of more than 35 g/L between vapor concentrations of 5 vol % and 50 vol % n-butane, or both.

In a particular embodiment, the low retentivity particulate adsorbent has a micropore volume of about 225 cc/L or less (about 0.5 cc/g or less). For example, the micropore volume of the low retentivity particulate adsorbent may be less than or equal to about 200 cc/L, less than or equal to about 175 cc/L, less than or equal to about 150 cc/L, less than or equal to about 125 cc/L, less than or equal to about 100 cc/L, less than or equal to about 75 cc/L, less than or equal to about 50 cc/L, or less than or equal to about 25 cc/L. By way of further example, the micropore volume of the low retentivity particulate adsorbent may be about 1.0 cc/L to about 225 cc/L, about 1.0 cc/L to about 200 cc/L, about 1.0 cc/L to about 175 cc/L, about 1.0 cc/L to about 150 cc/L, about 1.0 cc/L to about 125 cc/L, about 1.0 cc/L to about 100 cc/L, about 1.0 cc/L to about 75 cc/L, about 1.0 cc/L to about 50 cc/L, about 1.0 cc/L to about 25 cc/L, about 25 cc/L to about 225 cc/L, about 25 cc/L to about 200 cc/L, about 25 cc/L to about 175 cc/L, about 25 cc/L to about 150 cc/L, about 25 cc/L to about 125 cc/L, about 25 cc/L to about 100 cc/L, about 25 cc/L to about 75 cc/L, about 25 cc/L to about 50 cc/L, about 50 cc/L to about 225 cc/L, about 50 cc/L to about 200 cc/L, about 50 cc/L to about 175 cc/L, about 50 cc/L to about 150 cc/L, about 50 cc/L to about 125 cc/L, about 50 cc/L to about 100 cc/L, about 50 cc/L to about 75 cc/L, about 75 cc/L to about 225 cc/L, about 75 cc/L to about 200 cc/L, about 75 cc/L to about 175 cc/L, about 75 cc/L to about 150 cc/L, about 75 cc/L to about 125 cc/L, about 75 cc/L to about 100 cc/L, about 100 cc/L to about 225 cc/L, about 100 cc/L to about 200 cc/L, about 100 cc/L to about 175 cc/L, about 100 cc/L to about 150 cc/L, about 100 cc/L to about 125 cc/L, about 125 cc/L to about 225 cc/L, about 125 cc/L to about 200 cc/L, about 125 cc/L to about 175 cc/L, about 125 cc/L to about 150 cc/L, about 150 cc/L to about 225 cc/L, about 150 cc/L to about 200 cc/L, about 150 cc/L to about 175 cc/L, about 175 cc/L to about 225 cc/L, about 175 cc/L to about 200 cc/L, or about 200 cc/L to about 225 cc/L.

In some other embodiments, the low retentivity particulate adsorbent comprises a body defining an exterior surface and a three-dimensional low flow resistance shape or morphology. The three-dimensional low flow resistance shape or morphology may be any shape or morphology that one skilled in the art would appreciate has low flow resistance. For example, the three-dimensional low flow resistance shape or morphology may be at least one of substantially a cylinder, substantially an oval prism, substantially a sphere, substantially a cube, substantially an elliptical prism, substantially a rectangular prism, a lobed prism, a three-dimensional helix or spiral, or a combination thereof. Other useful examples of the morphology include shapes known to those skilled in the art of absorption column packings, and include Rachig rings, cross partition rings, Pall® rings, Intalox® saddles, Berl saddles, Super Intalox® saddles, Conjugate rings, Cascade mini rings, and Lessing rings. Other useful examples of the morphology include shapes known to those skilled in the art of pasta making, and may include ribbon, solid, hollow, lobed, and lobed-hollow composite shapes of strips, springs, coils, corkscrews, shells, tubes, such as gemelli, fusilli, fusilli col buco, macaroni, rigatoni, cellentani, farfalle, gomiti rigatti, casarecci, cavatelli, creste di galli, gigli, lumaconi, quadrefiore, radiatore, ruote, conchiglie, or a combination thereof.

By way of non-limiting examples, FIGS. 3A through 3I show exemplary shape morphologies of the present disclosure, including a composite lobed shape (A), a square prism shape (B), a cylinder shape (C), a shape with a star cross-section (D), a cross cross-section (E), a triangular prism with interior walls that transverse the center axis (F), a triangular prism with interior walls that do not transverse the center axis (G), a helical or twisted ribbon shape (H1 with an on-end appearance of H2), and a hollow cylinder (I).

The low retentivity particulate adsorbent material may have a cross-sectional width of about 1 mm to about 20 mm (e.g., about 1 mm, about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm about 17 mm, about 18 mm, about 19 mm, or about 20 mm). In a particulate embodiment, the cross-sectional width of the low retentivity particulate adsorbent is about 1 mm to about 18 mm, about 1 mm to about 16 mm, about 1 mm to about 14 mm, about 1 mm to about 12 mm, about 1 mm to about 10 mm, about 1 mm to about 8 mm, about 1 mm to about 6 mm, about 1 mm to about 4 mm, about 1 mm to about 3 mm, about 2 mm to about 20 mm, about 2 mm to about 18 mm, about 2 mm to about 16 mm, about 2 mm to about 14 mm, about 2 mm to about 12 mm, about 2 mm to about 10 mm, about 2 mm to about 8 mm, about 2 mm to about 6 mm, about 2 mm to about 4 mm, about 4 mm to about 20 mm, about 4 mm to about 18 mm, about 4 mm to about 16 mm, about 4 mm to about 14 mm, about 4 mm to about 12 mm, about 4 mm to about 10 mm, about 4 mm to about 8 mm, about 4 mm to about 6 mm, about 6 mm to about 20 mm, about 6 mm to about 18 mm, about 6 mm to about 16 mm, about 6 mm to about 14 mm, about 6 mm to about 12 mm, about 6 mm to about 10 mm, about 6 mm to about 8 mm, about 8 mm to about 20 mm, about 8 mm to about 18 mm, about 8 mm to about 16 mm, about 8 mm to about 14 mm, about 8 mm to about 12 mm, about 8 mm to about 10 mm, about 10 mm to about 20 mm, about 10 mm to about 18 mm, about 10 mm to about 16 mm, about 10 mm to about 14 mm, about 10 mm to about 12 mm, about 12 mm to about 20 mm, about 12 mm to about 18 mm, about 12 mm to about 16 mm, about 12 mm to about 14 mm, about 14 to about 20 mm, about 14 mm to about 18 mm, about 14 mm to about 16 mm, about 16 mm to about 20 mm, about 16 mm to about 18 mm, or about 18 mm to about 20 mm.

The low retentivity particulate adsorbent may include at least one cavity in fluid communication with the exterior surface of the adsorbent.

The low retentivity particulate adsorbent may have a hollow shape in cross section.

The low retentivity particulate adsorbent may include at least one channel in fluid communication with at least one exterior surface.

In certain further embodiments, each part of the low retentivity particulate adsorbent has a thickness equal to or less than about 3.0 mm. For example, each part of the low retentivity particulate adsorbent may have a thickness equal to or less than 2.5 mm, equal to or less than 2.0 mm, equal to or less than 1.5 mm, equal to or less than 1.25 mm, equal to or less than 1.0 mm, equal to or less than 0.75 mm, equal to or less than 0.5 mm, or equal to or less than 0.25 mm. That is, each part of the adsorbent may have a thickness of about 0.1 mm to about 3 mm, about 0.1 mm to about 2.5 mm, about 0.1 mm to about 2.0 mm, about 0.1 mm to about 1.5 mm, about 0.1 mm to about 1.0 mm, about 0.1 mm to about 0.5 mm, about 0.2 mm to about 3 mm, about 0.2 mm to about 2.5 mm, about 0.2 mm to about 2.0 mm, about 0.2 mm to about 1.5 mm, about 0.2 mm to about 1.0 mm, about 0.2 mm to about 0.5 mm, about 0.4 mm to about 3 mm, about 0.4 mm to about 2.5 mm, about 0.4 mm to about 2.0 mm, about 0.4 mm to about 1.5 mm, about 0.4 mm to about 1.0 mm, about 0.4 mm to about 3 mm, about 0.4 mm to about 2.5 mm, about 0.4 mm to about 2.0 mm, about 0.4 mm to about 1.5 mm, about 0.4 mm to about 1.0 mm, about 0.75 mm to about 3 mm, about 0.75 mm to about 2.5 mm, about 0.75 mm to about 2.0 mm, about 0.75 mm to about 1.5 mm, about 0.75 mm to about 1.0 mm, about 1.25 mm to about 3 mm, about 1.25 mm to about 2.5 mm, about 1.25 mm to about 2.0 mm, about 2.0 mm to about 3 mm, about 2.0 mm to about 2.5 mm, or about 2.5 mm to about 3.0 mm.

In an embodiment, at least one exterior wall of the hollow shape of the low retentivity particulate adsorbent has a thickness equal to or less than about 1.0 mm (e.g., about 0.1 mm, about 0.2 mm, about 0.3 mm, about 0.4 mm, about 0.5 mm, about 0.6 mm, about 0.7 mm, about 0.8 mm, about 0.9 mm, or about 1.0 mm). For example, an exterior wall of the hollow shape of the low retentivity particulate adsorbent may have a thickness in a range of about 0.1 mm to about 1.0 mm, about 0.1 mm to about 0.9 mm, about 0.1 mm to about 0.8 mm, about 0.1 mm to about 0.7 mm, about 0.1 mm to about 0.6 mm, about 0.1 mm to about 0.5 mm, about 0.1 mm to about 0.4 mm, about 0.1 mm to about 0.3 mm, about 0.1 mm to about 0.2 mm, about 0.2 mm to about 1.0 mm, about 0.2 mm to about 0.9 mm, about 0.2 mm to about 0.8 mm, about 0.2 mm to about 0.7 mm, about 0.2 mm to about 0.6 mm, about 0.2 mm to about 0.5 mm, about 0.2 mm to about 0.4 mm, about 0.2 mm to about 0.3 mm, about 0.3 mm to about 1.0 mm, about 0.3 mm to about 0.9 mm, about 0.3 mm to about 0.8 mm, about 0.3 mm to about 0.7 mm, about 0.3 mm to about 0.6 mm, about 0.3 mm to about 0.5 mm, about 0.3 mm to about 0.4 mm, about 0.4 mm to about 1.0 mm, about 0.4 mm to about 0.9 mm, about 0.4 mm to about 0.8 mm, about 0.4 mm to about 0.7 mm, about 0.4 mm to about 0.6 mm, about 0.4 mm to about 0.5 mm, about 0.5 mm to about 1.0 mm, about 0.5 mm to about 0.9 mm, about 0.5 mm to about 0.8 mm, about 0.5 mm to about 0.7 mm, about 0.5 mm to about 0.6 mm, about 0.6 mm to about 1.0 mm, about 0.6 mm to about 0.9 mm, about 0.6 mm to about 0.8 mm, about 0.6 mm to about 0.7 mm, about 0.7 mm to about 1.0 mm, about 0.7 mm to about 0.9 mm, about 0.7 mm to about 0.8 mm, about 0.8 mm to about 1.0 mm, about 0.8 mm to about 0.9 mm, or about 0.9 mm to about 1.0 mm.

In yet other embodiments, the hollow shape of the low retentivity particulate adsorbent has at least one interior wall extending between the exterior walls and having a thickness equal to or less than about 1.0 mm (e.g., about 0.1 mm, about 0.2 mm, about 0.3 mm, about 0.4 mm, about 0.5 mm, about 0.6 mm, about 0.7 mm, about 0.8 mm, about 0.9 mm, or about 1.0 mm). For example, an interior wall may have a thickness in a range of about 0.1 mm to about 1.0 mm, about 0.1 mm to about 0.9 mm, about 0.1 mm to about 0.8 mm, about 0.1 mm to about 0.7 mm, about 0.1 mm to about 0.6 mm, about 0.1 mm to about 0.5 mm, about 0.1 mm to about 0.4 mm, about 0.1 mm to about 0.3 mm, about 0.1 mm to about 0.2 mm, about 0.2 mm to about 1.0 mm, about 0.2 mm to about 0.9 mm, about 0.2 mm to about 0.8 mm, about 0.2 mm to about 0.7 mm, about 0.2 mm to about 0.6 mm, about 0.2 mm to about 0.5 mm, about 0.2 mm to about 0.4 mm, about 0.2 mm to about 0.3 mm, about 0.3 mm to about 1.0 mm, about 0.3 mm to about 0.9 mm, about 0.3 mm to about 0.8 mm, about 0.3 mm to about 0.7 mm, about 0.3 mm to about 0.6 mm, about 0.3 mm to about 0.5 mm, about 0.3 mm to about 0.4 mm, about 0.4 mm to about 1.0 mm, about 0.4 mm to about 0.9 mm, about 0.4 mm to about 0.8 mm, about 0.4 mm to about 0.7 mm, about 0.4 mm to about 0.6 mm, about 0.4 mm to about 0.5 mm, about 0.5 mm to about 1.0 mm, about 0.5 mm to about 0.9 mm, about 0.5 mm to about 0.8 mm, about 0.5 mm to about 0.7 mm, about 0.5 mm to about 0.6 mm, about 0.6 mm to about 1.0 mm, about 0.6 mm to about 0.9 mm, about 0.6 mm to about 0.8 mm, about 0.6 mm to about 0.7 mm, about 0.7 mm to about 1.0 mm, about 0.7 mm to about 0.9 mm, about 0.7 mm to about 0.8 mm, about 0.8 mm to about 1.0 mm, about 0.8 mm to about 0.9 mm, or about 0.9 mm to about 1.0 mm.

In a particular embodiment, the thickness of at least one of the interior wall, the exterior wall, or a combination thereof, of the low retentivity particulate adsorbent is equal to or less than about 1.0 mm (e.g., about 0.1 mm, about 0.2 mm, about 0.3 mm, about 0.4 mm, about 0.5 mm, about 0.6 mm, about 0.7 mm, about 0.8 mm, about 0.9 mm, or about 1.0 mm). For example, the thickness of at least one of the interior wall, the exterior wall, or a combination thereof, of the low retentivity particulate adsorbent is equal to or less than about 1.0 mm, equal to or less than about 0.6 mm, or equal to or less than about 0.4 mm. In certain embodiments, at least one of the interior wall, the exterior wall, or a combination thereof, of the low retentivity particulate adsorbent has a thickness in a range of about 0.1 mm to about 1.0 mm, about 0.1 mm to about 0.9 mm, about 0.1 mm to about 0.8 mm, about 0.1 mm to about 0.7 mm, about 0.1 mm to about 0.6 mm, about 0.1 mm to about 0.5 mm, about 0.1 mm to about 0.4 mm, about 0.1 mm to about 0.3 mm, about 0.1 mm to about 0.2 mm, about 0.2 mm to about 1.0 mm, about 0.2 mm to about 0.9 mm, about 0.2 mm to about 0.8 mm, about 0.2 mm to about 0.7 mm, about 0.2 mm to about 0.6 mm, about 0.2 mm to about 0.5 mm, about 0.2 mm to about 0.4 mm, about 0.2 mm to about 0.3 mm, about 0.3 mm to about 1.0 mm, about 0.3 mm to about 0.9 mm, about 0.3 mm to about 0.8 mm, about 0.3 mm to about 0.7 mm, about 0.3 mm to about 0.6 mm, about 0.3 mm to about 0.5 mm, about 0.3 mm to about 0.4 mm, about 0.4 mm to about 1.0 mm, about 0.4 mm to about 0.9 mm, about 0.4 mm to about 0.8 mm, about 0.4 mm to about 0.7 mm, about 0.4 mm to about 0.6 mm, about 0.4 mm to about 0.5 mm, about 0.5 mm to about 1.0 mm, about 0.5 mm to about 0.9 mm, about 0.5 mm to about 0.8 mm, about 0.5 mm to about 0.7 mm, about 0.5 mm to about 0.6 mm, about 0.6 mm to about 1.0 mm, about 0.6 mm to about 0.9 mm, about 0.6 mm to about 0.8 mm, about 0.6 mm to about 0.7 mm, about 0.7 mm to about 1.0 mm, about 0.7 mm to about 0.9 mm, about 0.7 mm to about 0.8 mm, about 0.8 mm to about 1.0 mm, about 0.8 mm to about 0.9 mm, or about 0.9 mm to about 1.0 mm.

In some embodiments, the interior wall of the low retentivity particulate adsorbent extends outward to the exterior wall in at least two directions from a hollow portion of the particulate adsorbent material (such as, from a center of the particulate adsorbent material).

For example, the interior walls of the low retentivity particulate adsorbent may extend outward to the exterior wall in at least three directions from a hollow portion of the particulate adsorbent material (such as, from a center of the particulate adsorbent material) or at least four directions from a hollow portion of the particulate adsorbent material (such as, from a center of the particulate adsorbent material).

In certain embodiments, the low retentivity particulate adsorbent material may have a length of about 1 mm to about 20 mm (e.g., about 1 mm, about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm about 17 mm, about 18 mm, about 19 mm, or about 20 mm). In a particular embodiment, the length of the low retentivity particulate adsorbent is about 1 mm to about 18 mm, about 1 mm to about 16 mm, about 1 mm to about 14 mm, about 1 mm to about 12 mm, about 1 mm to about 10 mm, about 1 mm to about 8 mm, about 1 mm to about 6 mm, about 1 mm to about 4 mm, about 1 mm to about 3 mm, about 2 mm to about 20 mm, about 2 mm to about 18 mm, about 2 mm to about 16 mm, about 2 mm to about 14 mm, about 2 mm to about 12 mm, about 2 mm to about 10 mm, about 2 mm to about 8 mm, about 2 mm to about 6 mm, about 2 mm to about 4 mm, about 4 mm to about 20 mm, about 4 mm to about 18 mm, about 4 mm to about 16 mm, about 4 mm to about 14 mm, about 4 mm to about 12 mm, about 4 mm to about 10 mm, about 4 mm to about 8 mm, about 4 mm to about 6 mm, about 6 mm to about 20 mm, about 6 mm to about 18 mm, about 6 mm to about 16 mm, about 6 mm to about 14 mm, about 6 mm to about 12 mm, about 6 mm to about 10 mm, about 6 mm to about 8 mm, about 8 mm to about 20 mm, about 8 mm to about 18 mm, about 8 mm to about 16 mm, about 8 mm to about 14 mm, about 8 mm to about 12 mm, about 8 mm to about 10 mm, about 10 mm to about 20 mm, about 10 mm to about 18 mm, about 10 mm to about 16 mm, about 10 mm to about 14 mm, about 10 mm to about 12 mm, about 12 mm to about 20 mm, about 12 mm to about 18 mm, about 12 mm to about 16 mm, about 12 mm to about 14 mm, about 14 to about 20 mm, about 14 mm to about 18 mm, about 14 mm to about 16 mm, about 16 mm to about 20 mm, about 16 mm to about 18 mm, or about 18 mm to about 20 mm.

The low retentivity particulate adsorbent may further comprise at least one of: a pore forming material or processing aid that sublimates, vaporizes, chemically decomposes, solubilizes, or melts when heated to a temperature of 100° C. or more; a binder; a filler; or a combination thereof.

In a particular embodiment, the low retentivity particulate adsorbent comprises at least one of: about 5% to about 60% of adsorbent, about 60% or less of a filler, about 6% or less of the pore forming material (or processing aid), about 10% or less of silicate, about 5% to about 70% of clay, or a combination thereof. The low retentivity particulate adsorbent may be present in about 5% to about 60%, about 5% to about 50%, about 5% to about 40%, about 5% to about 30%, about 5% to about 20%, about 5% to about 10%, about 10% to about 60%, about 10% to about 50%, about 10% to about 40%, about 10% to about 30%, about 10% to about 20%, about 20% to about 60%, about 20% to about 50%, about 20% to about 40%, about 20% to about 30%, about 30% to about 60%, about 30% to about 50%, about 30% to about 40%, about 40% to about 60%, about 40% to about 50%, or about 50% to about 60% of the particulate adsorbent material.

The filler may be present in the low retentivity particulate adsorbent in less than or equal to about 60%, less than or equal to about 50%, less than or equal to about 40%, less than or equal to about 30%, less than or equal to about 20%, less than or equal to about 10%, about 5% to about 60%, about 5% to about 50%, about 5% to about 40%, about 5% to about 30%, about 5% to about 20%, about 5% to about 10%, about 10% to about 60%, about 10% to about 50%, about 10% to about 40%, about 10% to about 30%, about 10% to about 20%, about 20% to about 60%, about 20% to about 50%, about 20% to about 40%, about 20% to about 30%, about 30% to about 60%, about 30% to about 50%, about 30% to about 40%, about 40% to about 60%, about 40% to about 50%, or about 50% to about 60% of the particulate adsorbent material.

The pore forming material of the low retentivity particulate adsorbent may be present in about 6%, about 5%, about 4%, about 3%, about 2%, or about 1% of the particulate adsorbent material.

The silicate of the low retentivity particulate adsorbent may be present in about 10%, about 9%, about 8%, about 7%, about 6%, about 5%, about 4%, about 3%, about 2%, or about 1% of the particulate adsorbent material.

The clay of the low retentivity particulate adsorbent may be present in about 5% to about 70%, 5% to about 60%, about 5% to about 50%, about 5% to about 40%, about 5% to about 30%, about 5% to about 20%, about 5% to about 10%, about 10% to about 70%, about 10% to about 60%, about 10% to about 50%, about 10% to about 40%, about 10% to about 30%, about 10% to about 20%, about 20% to about 70%, about 20% to about 60%, about 20% to about 50%, about 20% to about 40%, about 20% to about 30%, about 30% to about 70%, about 30% to about 60%, about 30% to about 50%, about 30% to about 40%, about 40% to about 70%, about 40% to about 60%, about 40% to about 50%, about 50% to about 70%, about 50% to about 60%, or about 60% to about 70% of the particulate adsorbent material.

The pore forming material (or processing aid) of the low retentivity particulate adsorbent produces macroscopic pores when it is sublimated, vaporized, chemically decomposed, solubilized, or melted. This provides a spatial dilution of the low retentivity particulate adsorbent material. The pore forming material may be a cellulose derivative, such as methylcellulose, carboxymethyl cellulose, polyethylene glycol, phenol-formaldehyde resins (novolac, resole), polyethylene or polyester resins. The cellulose derivative may include copolymers with methyl groups and/or partial substitutions with hydroxypropyl and/or hydroxyethyl groups. The pore forming material or processing aid may sublimate, vaporize, chemically decompose, solubilize, or melt when heated to a temperature in a range of about 125° C. to about 640° C. For example, the processing aid of the low retentivity particulate adsorbent may sublimate, vaporize, chemically decompose, solubilize, or melt when heated to a temperature in a range of about 125° C. to about 600° C., about 125° C. to about 550° C., about 125° C. to about 500° C., about 125° C. to about 450° C., about 125° C. to about 400° C., about 125° C. to about 350° C., about 125° C. to about 300° C., about 125° C. to about 250° C., about 125° C. to about 200° C., about 125° C. to about 150° C., about 150° C. to about 640° C., 150° C. to about 600° C., about 150° C. to about 550° C., about 150° C. to about 500° C., about 150° C. to about 450° C., about 150° C. to about 400° C., about 150° C. to about 350° C., about 150° C. to about 300° C., about 150° C. to about 250° C., about 150° C. to about 200° C., about 200° C. to about 640° C., 200° C. to about 600° C., about 200° C. to about 550° C., about 200° C. to about 500° C., about 200° C. to about 450° C., about 200° C. to about 400° C., about 200° C. to about 350° C., about 200° C. to about 300° C., about 200° C. to about 250° C., about 250° C. to about 640° C., 250° C. to about 600° C., about 250° C. to about 550° C., about 250° C. to about 500° C., about 250° C. to about 450° C., about 250° C. to about 400° C., about 250° C. to about 350° C., about 250° C. to about 300° C., about 300° C. to about 640° C., 300° C. to about 600° C., about 300° C. to about 550° C., about 300° C. to about 500° C., about 300° C. to about 450° C., about 300° C. to about 400° C., about 300° C. to about 350° C., about 350° C. to about 640° C., 350° C. to about 600° C., about 350° C. to about 550° C., about 350° C. to about 500° C., about 350° C. to about 450° C., about 350° C. to about 400° C., about 400° C. to about 640° C., 400° C. to about 600° C., about 400° C. to about 550° C., about 400° C. to about 500° C., about 400° C. to about 450° C., about 450° C. to about 640° C., 450° C. to about 600° C., about 450° C. to about 550° C., about 450° C. to about 500° C., about 500° C. to about 640° C., 500° C. to about 600° C., about 500° C. to about 550° C., about 550° C. to about 640° C., 550° C. to about 600° C., or about 600° C. to about 640° C.

The binder of the low retentivity particulate adsorbent may be a clay or a silicate material. For example, the binder of the low retentivity particulate adsorbent may be at least one of Zeolite clay, Bentonite clay, Montmorillonite clay, Illite clay, French Green clay, Pascalite clay, Redmond clay, Terramin clay, Living clay, Fuller's Earth clay, Ormalite clay, Vitallite clay, Rectorite clay, Cordierite, ball clay, kaolin or a combination thereof.

The filler of the low retentivity particulate adsorbent may function in the particulate adsorbent structure for aiding and preserving shape formation and mechanical integrity, and for enhancing the amount of macropore volume in the final particulate product. In an embodiment, the filler of the low retentivity particulate adsorbent is solid or hollow microspheres, which may be of micron size or larger. In other embodiments, the filler of the low retentivity particulate adsorbent is an inorganic filler, such as a glass material and/or a ceramic material. The filler of the low retentivity particulate adsorbent may be any appropriate filler, which one skilled in the art would appreciate, that provides the above benefits.

The low retentivity particulate adsorbent material may be prepared by admixing an adsorbent with microscopic pores having a diameter less than about 100 nm and a pore forming material or processing aid that sublimates, vaporizes, chemically decomposes, solubilizes, or melts when heated to a temperature of 100° C. or more; and heating the mixture to a temperature in a range of about 100° C. to about 1200° C. for about 0.25 hours to about 24 hours forming macroscopic pores having a diameter of about 100-100,000 nm when the core material is sublimated, vaporized, chemically decomposed, solubilized, or melted, wherein a ratio of a volume of the macroscopic pore to a volume of the microscopic pore in the adsorbent is greater than 150%. The adsorbent may have any of the characteristics of the low retentivity particulate adsorbent material discussed throughout the present disclosure.

The mixture may be heated to about 100° C. to about 1200° C., about 100° C. to about 1000° C., about 100° C. to about 900° C., about 100° C. to about 800° C., about 100° C. to about 700° C., about 100° C. to about 600° C., about 100° C. to about 500° C., about 100° C. to about 400° C., about 100° C. to about 300° C., about 100° C. to about 200° C., about 200° C. to about 1200° C., about 200° C. to about 1100° C., about 200° C. to about 1000° C., about 200° C. to about 900° C., about 200° C. to about 800° C., about 200° C. to about 700° C., about 200° C. to about 600° C., about 200° C. to about 500° C., about 200° C. to about 400° C., about 200° C. to about 300° C., about 300° C. to about 1200° C., about 300° C. to about 1100° C., about 300° C. to about 1000° C., about 300° C. to about 900° C., about 300° C. to about 800° C., about 300° C. to about 700° C., about 300° C. to about 600° C., about 300° C. to about 500° C., about 300° C. to about 400° C., about 400° C. to about 1200° C., about 400° C. to about 1100° C., about 400° C. to about 1000° C., about 400° C. to about 900° C., about 400° C. to about 800° C., about 400° C. to about 700° C., about 400° C. to about 600° C., about 400° C. to about 500° C., about 500° C. to about 1200° C., about 500° C. to about 1100° C., about 500° C. to about 1000° C., about 500° C. to about 900° C., about 500° C. to about 800° C., about 500° C. to about 700° C., about 500° C. to about 600° C., about 600° C. to about 1200° C., about 600° C. to about 1100° C., about 600° C. to about 1000° C., about 600° C. to about 900° C., about 600° C. to about 800° C., about 600° C. to about 700° C., about 700° C. to about 1200° C., about 700° C. to about 1100° C., about 700° C. to about 1000° C., about 700° C. to about 900° C., about 700° C. to about 800° C., about 800° C. to about 1200° C., about 800° C. to about 1100° C., about 800° C. to about 1000° C., about 800° C. to about 900° C., about 900° C. to about 1200° C., about 900° C. to about 1100° C., about 900° C. to about 1000° C., about 1000° C. to about 1200° C., about 1000° C. to about 1100° C., or about 1100° C. to about 1200° C.

In some embodiments, heating the mixture may include a ramp rate of about 2.5° C./minute, about 1.0° C./minute, about 1.25° C./minute, about 1.5° C./minute, about 1.75° C./minute, about 2.0° C./minute, about 2.25° C./minute, about 2.75° C./minute, about 3.0° C./minute, about 3.25° C./minute, about 3.5° C./minute, about 3.75° C./minute, about 4.0° C./minute, or 4.25° C./minute. For example, the ramp rate may be about 0.5° C./minute to about 20° C./minute, about 0.5° C./minute to about 15° C./minute, about 0.5° C./minute to about 10° C./minute, about 0.5° C./minute to about 5.0° C./minute, about 0.5° C./minute to about 2.5° C./minute, about 1.0° C./minute to about 20° C./minute, about 1.0° C./minute to about 15° C./minute, about 1.0° C./minute to about 10° C./minute, about 1.0° C./minute to about 5.0° C./minute, about 1.0° C./minute to about 2.5° C./minute, about 2.0° C./minute to about 20° C./minute, about 2.0° C./minute to about 15° C./minute, about 2.0° C./minute to about 10° C./minute, about 2.0° C./minute to about 5.0° C./minute, about 2.0° C./minute to about 2.5° C./minute, about 5.0° C./minute to about 20° C./minute, about 5.0° C./minute to about 15° C./minute, about 5.0° C./minute to about 10° C./minute, about 10° C./minute to about 20° C./minute, about 10° C./minute to about 15° C./minute, or about 15° C./minute to about 20° C./minute. In certain embodiments, the heating ramp rate is from about 20° C./minute to about 100° C./minute, 30° C./minute to about 100° C./minute, 40° C./minute to about 100° C./minute, 50° C./minute to about 100° C./minute, 60° C./minute to about 100° C./minute, 70° C./minute to about 100° C./minute, 80° C./minute to about 100° C./minute, or 90° C./minute to about 100° C./minute.

For example, the ramp to the temperature may take about 5 minutes to about 2 hours, about 5 minutes to about 1.75 hours, about 5 minutes to about 1.5 hours, about 5 minutes to about 1.25 hours, about 5 minutes to about 1.0 hours, about 5 minutes to about 45 minutes, about 5 minutes to about 30 minutes, about 5 minutes to about 15 minutes, about 15 minutes to about 2 hours, about 15 minutes to about 1.75 hours, about 15 minutes to about 1.5 hours, about 15 minutes to about 1.25 hours, about 15 minutes to about 1.0 hours, about 15 minutes to about 45 minutes, about 15 minutes to about 30 minutes, about 30 minutes to about 2 hours, about 30 minutes to about 1.75 hours, about 30 minutes to about 1.5 hours, about 30 minutes to about 1.25 hours, about 30 minutes to about 1.0 hours, about 30 minutes to about 45 minutes, about 45 minutes to about 2 hours, about 45 minutes to about 1.75 hours, about 45 minutes to about 1.5 hours, about 45 minutes to about 1.25 hours, about 45 minutes to about 1.0 hours, about 1.0 hours to about 2 hours, about 1.0 hours to about 1.75 hours, about 1.0 hours to about 1.5 hours, about 1.0 to about 1.25 hours, about 1.25 to about 2 hours, about 1.25 to about 1.75 hours, about 1.25 to about 1.5 hours, about 1.5 to about 2 hours, about 1.5 to about 1.75 hours, or about 1.75 hours to about 2.0 hours.

In another embodiment, the mixture is held at the temperature (i.e., after the ramp) for about 0.25 hours to about 24 hours. For example, the mixture may be held at the temperature for about 0.25 hours to about 18 hours, about 0.25 hours to about 16 hours, about 0.25 hours to about 14 hours, about 0.25 hours to about 12 hours, about 0.25 hours to about 10 hours, about 0.25 hours to about 8 hours, about 0.25 hours to about 6 hours, about 0.25 hours to about 4 hours, about 0.25 hours to about 2 hours, about 1 hour to about 24 hours, about 0.25 hours to about 18 hours, about 1 hour to about 16 hours, about 1 hour to about 14 hours, about 1 hour to about 12 hours, about 1 hour to about 10 hours, about 1 hour to about 8 hours, about 1 hour to about 6 hours, about 1 hour to about 4 hours, about 1 hour to about 2 hours, about 2 hours to about 24 hours, about 2 hours to about 18 hours, about 2 hours to about 16 hours, about 2 hours to about 14 hours, about 2 hours to about 12 hours, about 2 hours to about 10 hours, about 2 hours to about 8 hours, about 2 hours to about 6 hours, about 2 hours to about 3 hours, about 3 hours to about 24 hours, about 3 hours to about 18 hours, about 3 hours to about 16 hours, about 3 hours to about 14 hours, about 3 hours to about 12 hours, about 3 hours to about 10 hours, about 3 hours to about 8 hours, about 3 hours to about 6 hours, about 3 hours to about 4 hours, about 4 hours to about 24 hours, about 4 hours to about 18 hours, about 4 hours to about 16 hours, about 4 hours to about 14 hours, about 4 hours to about 12 hours, about 4 hours to about 10 hours, about 4 hours to about 8 hours, about 4 hours to about 6 hours, about 6 hours to about 24 hours, about 6 hours to about 18 hours, about 6 hours to about 16 hours, about 6 hours to about 14 hours, about 6 hours to about 12 hours, about 6 hours to about 10 hours, about 6 hours to about 8 hours, about 8 hours to about 24 hours, about 8 hours to about 18 hours, about 8 hours to about 16 hours, about 8 hours to about 14 hours, about 8 hours to about 12 hours, about 8 hours to about 10 hours, about 10 hours to about 24 hours, about 10 hours to about 18 hours, about 10 hours to about 16 hours, about 10 hours to about 14 hours, about 10 hours to about 12 hours, about 12 hours to about 24 hours, about 12 hours to about 18 hours, about 12 hours to about 16 hours, about 12 hours to about 14 hours, about 14 hours to about 24 hours, about 14 hours to about 18 hours, about 14 hours to about 16 hours, about 16 hours to about 24 hours, about 16 hours to about 18 hours, about 18 hours to about 24 hours, about 18 hours to about 22 hours, about 18 hours to about 20 hours, about 20 hours to about 24 hours, about 20 hours to about 22 hours, or about 22 hours to about 24 hours.

The method of making the low retentivity particulate adsorbent may further comprise cooling the mixture (e.g., to about room temperature). In an embodiment, the mixture may be cooled over about 0.5 to about 10 hours. For example, the mixture may be cooled over about 0.5 hours to about 9 hours, about 0.5 hours to about 8 hours, about 0.5 hours to about 7 hours, about 0.5 hours to about 6 hours, about 0.5 hours to about 5 hours, about 0.5 hours to about 4 hours, about 0.5 hours to about 3 hours, about 0.5 hours to about 2 hours, about 0.5 hours to about 1 hour, about 5 hours to about 10 hours, about 5 hours to about 9 hours, about 5 hours to about 8 hours, about 5 hours to about 7 hours, about 5 hours to about 6 hours, about 6 hours to about 10 hours, about 6 hours to about 9 hours, about 6 hours to about 8 hours, about 6 hours to about 7 hours, about 7 hours to about 10 hours, about 7 hours to about 9 hours, about 7 hours to about 8 hours, about 8 hours to about 10 hours, about 8 hours to about 9 hours, or about 9 hours to about 10 hours.

Heating of the mixture for making the low retentivity particulate adsorbent may be performed in an inert atmosphere (e.g., nitrogen, argon, neon, krypton, xenon, radon, flue gas wherein the steam and oxygen content are controlled, or a combination thereof).

The low retentivity particulate adsorbent material may have a retentivity of about 1.0 g/dL or less, about 0.75 g/dL or less, about 0.50 g/dL or less, or about 0.25 g/dL or less. For example, the low retentivity adsorbent may have a retentivity of about 0.25 g/dL to about 1.00 g/dL, about 0.25 g/dL to about 0.75 g/dL, about 0.25 g/dL to about 0.50 g/dL, about 0.50 g/dL to about 1.00 g/dL, about 0.50 g/dL to about 0.75 g/dL, or about 0.75 g/dL to about 1.00 g/dL.

In any aspect or embodiment described herein, at least one of the diameter of the microscopic pores of the low retentivity adsorbent is less than about 100 nm, the diameter of the macroscopic pores is equal to or greater than 100 nm and less than 100,000 nm, or a combination thereof.

The method of making the low retentivity particulate adsorbent may further comprise extruding or compressing the admix into a shaped structure. For example, the extruded or compressed low retentivity particulate adsorbent material may comprise a body defining an exterior surface and a three-dimensional low flow resistant shape or morphology. The low flow resistant shape or morphology of the low retentivity particulate adsorbent can be, e.g., any shape or morphology described herein for the adsorbent material. For example, the three-dimensional low flow resistant shape or morphology of the low retentivity particulate adsorbent may be at least one of substantially a cylinder, substantially an oval prism, substantially a sphere, substantially a cube, substantially an elliptical prism, substantially a rectangular prism, a lobed prism, a three-dimensional spiral, the shape or morphology illustrated in FIGS. 3A through 3I, or a combination thereof.

The adsorbent of the low retentivity particulate adsorbent may be at least one of activated carbon, molecular sieves, porous alumina, clay, porous silica, zeolites, metal organic frameworks, or a combination thereof.

The mixture of the low retentivity particulate adsorbent may further comprise a binder (such as clay, silicate or a combination thereof), and/or a filler. The filler may be any filled known or that becomes known in the relevant art.

The low retentivity particulate adsorbent may have a cross-sectional width in a range of about 1 mm to about 20 mm.

The low retentivity particulate adsorbent material may include at least one cavity or channel in fluid communication with an exterior surface of the adsorbent. The low retentivity particulate adsorbent may have a hollow shape in cross section. Each part of the low retentivity particulate adsorbent may have a thickness of about 3.0 mm or less. An exterior wall of the hollow shape may have a thickness that is 3 mm or less (e.g., about 0.1 mm to about 1.0 mm). The hollow shape may have interior walls extending between the exterior walls, which may have, e.g., a thickness of about 3.0 mm or less (e.g., about 0.1 mm to about 1.0 mm).

The interior walls may extend outward to the exterior wall in at least two directions, at least three directs, or at least four directions from the interior volume (such as, from the hollow portion), such as a center.

In some embodiments, the low retentivity particulate adsorbent has a length of about 1 mm to about 20 mm (e.g., about 2 mm to about 7 mm).

Methods

In a further aspect, the present disclosure provides a method for reducing fuel vapor emissions in an evaporative emission control system, the method comprising contacting the fuel vapor with at least one volume of a vent-side particulate adsorbent comprising microscopic pores with a diameter of less than about 100 nm, macroscopic pores having a diameter of about 100-100,000 nm, and a ratio of a volume of the macroscopic pores to a volume of the microscopic pores (M/m) that is greater than about 150%, wherein the at least one vent-side particulate adsorbent volume has a butane retentivity of from about 1 g/dL to about 0.25 g/dL or less, a particle diameter of from 3-6 mm or both.

In some embodiments, the method further comprises contacting the fuel vapor with at least one fuel-side adsorbent volume, e.g., a high BWC, high IAC adsorbent volume as described herein, prior to contacting the at least one vent-side particulate adsorbent as described herein.

In any of the aspects or embodiments described herein, the adsorbents are located within a single canister. In particular embodiments, the adsorbents are located within a plurality of canisters that are connected to permit sequential contact by the fuel vapor.

In a further embodiment, the method may comprises contacting the fuel vapor with a high butane working capacity adsorbent volume as described herein, prior to a vent-side low retentivity particulate adsorbent volume. That is, the high butane working capacity adsorbent is located upstream in the fuel vapor flow path relative to the low retentivity particulate adsorbent. For example, if a vent-side low retentivity particulate adsorbent volume is present in volume 204 of the main canister, the high butane working capacity adsorbent can be present in at least one of the volumes 203, 202, 201, or a combination thereof of the main canister. Similarly, if the supplemental canister comprises a vent-side low retentivity particulate adsorbent volume, the high butane working capacity adsorbent can be located in at least one volume of the main canister 201-204 and/or at least one volume of the supplemental canister prior to or upstream of the supplemental canister vent-side low retentivity particulate adsorbent volume. For example, if the vent-side low retentivity particulate adsorbent volume is present in volume 304, then high butane working capacity adsorbent can be present in at least one volume selected from 201-204, 301-303, or combinations thereof. One skilled in the art will appreciate that there are numerous other configurations that meet this feature. For example, in an embodiment, the main canister comprises high butane working capacity adsorbent (such as, in at least one of the volumes 201-204, or combinations thereof), while the supplemental canister comprises high butane adsorbent (such as, in at least one of the volumes 301-305, or combinations thereof).

The method may further comprise contacting the fuel vapor with an additional vent-side particulate adsorbent volume, e.g., vent-side low retentivity particulate adsorbent volume that is downstream from or subsequent to another in the fluid or vapor path, wherein the vent-side subsequent adsorbent has microscopic pores with a diameter of less than about 100 nm, macroscopic pores having a diameter of about 100-100,000 nm, and a ratio of a volume of the macroscopic pores to a volume of the microscopic pores that is equal to or less than about 150%. For example, if volume 203 of the main canister comprises low retentivity particulate adsorbent, then the downstream vent-side subsequent adsorbent volume could be present in volume 204 of the main canister, at least one volume of a supplemental canister 301-305, or a combination thereof. For example, in a particular embodiment, low retentivity particulate adsorbent is present in the main canister side of the supplemental canister (e.g., 301-303) and the downstream/subsequent adsorbent volume is present on the vent port side of the supplemental canister (e.g., volumes 304 and 305).

As such, in certain embodiments, the method comprises contacting the high butane working capacity adsorbent/volume, the low retentivity adsorbent/volume, and the subsequent adsorbent/volume to fuel vapor from the fuel vapor inlet in that order.

As such, in certain embodiments, the method comprises contacting the high butane working capacity adsorbent/volume, the low retentivity adsorbent/volume, and the subsequent adsorbent/volume to fuel vapor from the fuel vapor inlet in that order.

The adsorbents suitable for use in the adsorbent volumes may be derived from many different materials and in various forms. It may be a single component or a blend of different components. Furthermore, the adsorbent (either as a single component or a blend of different components) may include a volumetric diluent. Non-limiting examples of the volumetric diluents may include, but are not limited to, spacer, inert gap, foams, fibers, springs, or combinations thereof.

EXAMPLES

Determination of Apparent Density

The standard method ASTM D 2854-09(2014) (hereinafter "the Standard Method") may be used to determine the apparent density of particulate adsorbents, taking into account the prescribed minimum ratio of 10 for the measuring cylinder diameter to mean particle diameter of the particulate material, with mean particle diameter measured according to the prescribed standard screening method.

Determination of Macroscopic Pore Volume

Macroscopic pore volume is measured by mercury intrusion porosimetry method ISO 15901-1:2016. The equipment used for the examples was a Micromeritics Autopore V (Norcross, Ga.). Samples used were around 0.4 g in size and pre-treated for at least 1 hour in an oven at 105° C. The surface tension of mercury and contact angle used for the Washburn equation were 485 dynes/cm and 130°, respectively. Macropores as referred to herein, are those that have a diameter of from about 100 nm to about 100,000 nm.

Determination of Microscopic Pore Volume

Microscopic pore volume is measured by nitrogen adsorption porosimetry by the nitrogen gas adsorption method ISO 15901-2:2006 using a Micromeritics ASAP 2420 (Norcross, Ga.). Micropores as referred to herein, are pores with a diameter of less than about 100 nm. The sample preparation procedure was to degas to a pressure of less than 10 μmHg. The determination of pore volumes for the microscopic pore sizes was from the desorption branch of the 77 K isotherm for a 0.1 g sample. The nitrogen adsorption isotherm data was analyzed by the Kelvin and Halsey equations to determine the distribution of pore volume with pore size of cylindrical pores according to the model of Barrett, Joyner, and Halenda ("BJH"). The non-ideality factor was 0.0000620. The density conversion factor was 0.0015468. The thermal transpiration hard-sphere diameter was 3.860 Å. The molecular cross-sectional area was 0.162 nm². The condensed layer thickness (Å) related to pore diameter (D, Å) used for the calculations was $0.4977\,[\ln(D)]^2 - 0.6981\,\ln(D) + 2.5074$. Target relative pressures for the isotherm were the following: 0.04, 0.05, 0.085, 0.125, 0.15, 0.18, 0.2, 0.355, 0.5, 0.63, 0.77, 0.9, 0.95, 0.995, 0.95, 0.9, 0.8, 0.7, 0.6, 0.5, 0.45, 0.4, 0.35, 0.3, 0.25, 0.2, 0.15, 0.12, 0.1, 0.07, 0.05, 0.03, 0.01. Actual points were recorded within an absolute or relative pressure tolerance of 5 mmHg or 5%, respectively, whichever was more stringent. Time between successive pressure readings during equilibration was 10 seconds.

Determination of the Diameter of an Adsorbent Volume

The diameter of an adsorbent volume, D, is a "circle equivalent diameter" and is derived from the volume, V, and the vapor path length, L, of the adsorbent volume. The diameter, D, is a circle-equivalent dimension, calculated as $(4V/\pi L)^{1/2}$. For example, as a generic illustration of the calculation, an adsorbent volume of 200 cc has a vapor path length of 10 cm. The diameter is $[(4\times200)/(10 7\pi)]^{1/2} = 5.0$ cm. The L/D is, therefore, 10 cm/5 cm=2.0.

Determination of Flow Restriction

The flow restriction was measured as pressure drop (Pa/cm) for different shaped adsorbent particles across a 30 mm length of dense-packed bed at a given standard liter per minute (slpm) with the device shown in FIG. 4. In particular, the pressure drop (Pa/cm) was measured across a 30 mm depth at the center of a pellet bed with 43 mm diameter for an air flow range of 10-70 slpm (11.5-80.3 cm/s). Adsorbent was loaded according to ASTM procedure D2854 into a 43 mm inner diameter tube with ports drilled +/−15 mm as measured from the midpoint along the bed length. Open cell foam was used to contain the carbon bed. For the pressure purge, compressed air was loaded through port 1 to atmosphere on port 2; the pressure drop across ports 3 and 4 was measured. For the vacuum purge, a vacuum was pulled through port 1; the pressure drop was measured across ports 3 and 4. The flow was adjusted from 10-70 slpm (11.5-80.3 cm/s) and pressure drop measured at each adjustment. For monoliths, the pressure drop (Pa/cm) was measured from 10-70 slpm across the entire monolith. For the 35 mm diameter monolith, the pressure drop at 46 cm/s was approximated from the measurement at 30 lpm flow and, for the 29 mm diameter monolith, the pressure drop at 46 cm/s was approximated from the measurement at 20 lpm flow.

The part flow restriction (such as between ports 1 and 2 in FIG. 4) was measured as pressure drop (kPa) for the part in the housing used for canister testing. The flow restriction of the part housing was also measured with no adsorbent. The flow was adjusted from 10-70 SLPM (11.5-80.3 cm/s) and pressure drop measured at each adjustment. The pressure drop in kPa of the adsorbent bed or monolith part was recorded with correction for the pressure drop of the housing at the same flow rate.

For an adsorbent bed within a canister, the pressure drop of that volume was calculated by first determining the fundamental Pa/cm vs. cm/s plot for a 110 mm long bed in a 43 mm internal diameter (ID) auxiliary tube as described above and illustrated in FIG. 25 and FIG. 30. Then, the cm/s air velocity for 40 lpm was determined from the cross-sectional area of the adsorbent volume defined as the ratio of the adsorbent volume divided by the vapor path length of the adsorbent volume. Finally, the pressure drop in Pa at that cm/s velocity for 40 lpm was calculated by multiplying the Pa/cm flow restriction property by the vapor path length of the adsorbent volume.

The term "total nominal volume," as used herein, refers to a sum of the volumes of the adsorbent components, and does not include the volumes of gaps, voids, ducts, conduits, tubing, plenum spaces or other volumes along lengths of the vapor flow path that are devoid of adsorbent material across the plane perpendicular to vapor flow path. For example, in FIG. 1 the total nominal volume of the canister system is the sum of the volumes of adsorbent volumes 201, 202, 203, and

204, minus any volume that is an empty volume. In FIG. 2, the total nominal volume of the canister system is the sum of the volumes of adsorbent volumes 201, 202, 203, 204, 301, 302, 303, 304, and 305, minus any volume that is an empty volume.

Determination of Nominal Volume Apparent Density

The term "nominal volume apparent density," as used herein, is the mass of the representative adsorbent in the adsorbent volume divided by the nominal volume of adsorbent, where the length of the volume is defined as the in situ distance within the canister system between the perpendicular plane of the vapor flow path initially in contact with the adsorbent component and the perpendicular plan of the vapor flow path exiting the adsorbent component.

Non-limiting examples of how to calculate the nominal volume apparent density for various forms of adsorbents are described herein.

(A) Granular, Pelletized, or Spherical Adsorbents of Uniform Adsorptive Capacity Across the Length of the Adsorbent Component Flow Path The standard method ASTM D 2854 (hereinafter "the Standard Method") may be used to determine the nominal volume apparent density of particulate adsorbents, such as granular and pelletized adsorbents of the size and shape typically used for evaporative emission control for fuel systems. The Standard Method may be used to determine the apparent density of adsorbent volume, when it provides the same apparent density value as the ratio of the mass and the nominal volume of the adsorbent bed found in the canister system. The mass of the adsorbent by the Standard Method is of the representative adsorbent used in the incremental adsorption analysis, i.e., equivalently including or excluding inert binders, fillers, and structural components within the adsorbent volume depending on what representative material is analyzed as the adsorbent sample.

Furthermore, the nominal volume apparent density of adsorbent volume may be determined using an alternative apparent density method, as defined below. The alternative method may be applied to nominal adsorbent volumes that have apparent densities that are not comparably or suitably measured by the Standard Method. Additionally, the alternative apparent density method may be applied to particulate adsorbents in lieu of the Standard Method, due to its universal applicability. The alternative method may be applied to the adsorbent volume that may contain particulate adsorbents, non-particulate adsorbents, and adsorbents of any form augmented by spacers, voids, voidage additives within a volume or sequential similar adsorbent volumes for the effect of net reduced incremental volumetric capacity.

In the alternative apparent density method, the apparent density of adsorbent volume is obtained by dividing the mass of adsorbent by the volume of adsorbent, wherein:

(1) the dry mass basis of the representative adsorbent in the adsorbent volume is measured. For example, a 0.200 g representative sample of the 25.0 g total adsorbent mass in an adsorbent volume is measured for adsorptive capacity by the McBain method. Whereas the McBain method yields an adsorption value of g-butane per g-adsorbent, the applicable mass is 25.0 g for the numerator in the apparent density of the adsorbent volume that then allows conversion of the McBain analytical value to the volumetric property of the adsorbent volume; and (2) the volume of the adsorbent component in the denominator of the apparent density is defined as the in situ geometric volume under which the superficial vapor flow path occurs within the canister system. The length of the volume is bounded by a plane perpendicular to the superficial vapor flow entrance of the adsorbent volume in question (i.e., the point at which there is adsorbent present on the perpendicular plane) and a plane perpendicular to the superficial flow at the vapor flow exit of the adsorbent volume in question (i.e., the point at which there is no adsorbent across the plane perpendicular to vapor flow).

(B) Honeycombs, Monolith, or Foam Adsorbents (1) Cylindrical Honeycomb Adsorbents The apparent density of cylindrical honeycomb adsorbents may be determined according to the procedure of Purification Cellutions, LLC (Waynesboro, Ga.) SOP 500-115. The volume of adsorbent is a multiple of the cross-sectional area (A) and the length (h) of the adsorbent. The length (h) of the adsorbent is defined as the distance between the front plane of the adsorbent perpendicular to vapor or gas flow entering the adsorbent and the back plane of the adsorbent where the vapor or gas exits the adsorbent. The volume measurement is that of the nominal volume, which is also used for defining bed volume ratios for purge. In the case of a cylindrical honeycomb adsorbent of circular cross-section, the adsorbent cross-sectional area is determined by $\pi d^2/4$, where d is the average diameter measured at four points on each end of the honeycomb. The nominal adsorbent volume and the nominal volume apparent density are calculated as follows:

$$\text{Nominal Adsorbent Volume} = h \times A$$

$$\text{Nominal Volume Apparent Density} = \text{Part Mass}/(h \times A)$$

wherein "Part Mass" is the mass of the adsorbent for which a representative adsorbent sample was tested for adsorptive properties, including representative proportions of inert or adsorptive binders and fillers.

By way of non-limiting examples, FIG. 5 shows the boundary definitions for the nominal volume of a honeycomb adsorbent 109 having a cross-sectional area A. The vapor or gas flows through the honeycomb adsorbent 109 in the direction of D1 to D2. The vapor or gas enters the front plane (F) of the adsorbent 109, flows through the length (h) of the adsorbent 109, and exits back plane (B) of the adsorbent 109. The nominal volume of a honeycomb adsorbent 109 equals to the cross-sectional area A×the length h. Similarly, FIG. 6 shows the boundary definitions for the nominal volume of foam adsorbent 110.

(2) Pleated, Corrugated and Sheet Adsorbents

For pleated and corrugated adsorbents, the nominal adsorbent volume includes all the void space created by the pleats and corrugations. The volume measurement is that of the nominal volume, which is also used for defining bed volume ratios for purge. The nominal volume and the apparent density of adsorbent are calculated as follows:

$$\text{Nominal Adsorbent Volume} = h \times A$$

$$\text{Nominal Volume Apparent Density} = \text{Part Mass}/(h \times A)$$

wherein

"Part Mass" is the mass of the adsorbent for which a representative adsorbent sample was tested for adsorptive properties, including representative proportions of inert or adsorptive binders and fillers, h is the length of adsorbent, defined as the distance between the front plane of the adsorbent perpendicular to vapor or gas flow entering the filter and the back plane of the adsorbent where the vapor or gas exits the filter, and A is the cross-sectional area of adsorbent.

By way of non-limiting example, FIG. 7 shows the boundary definitions for the volume of a stacked corrugated sheet adsorbent monolith 111. It is also within those skilled in the art to form such a monolith as an extruded honeycomb.

In the case of a pleated adsorbent, the adsorbent cross-sectional area is determined by L×W, where L is the distance from one edge of the adsorbent to the opposite edge of the adsorbent in direction X, and W is the distance from one edge of the adsorbent to the opposite edge of the adsorbent in direction Y.

Figure 9:
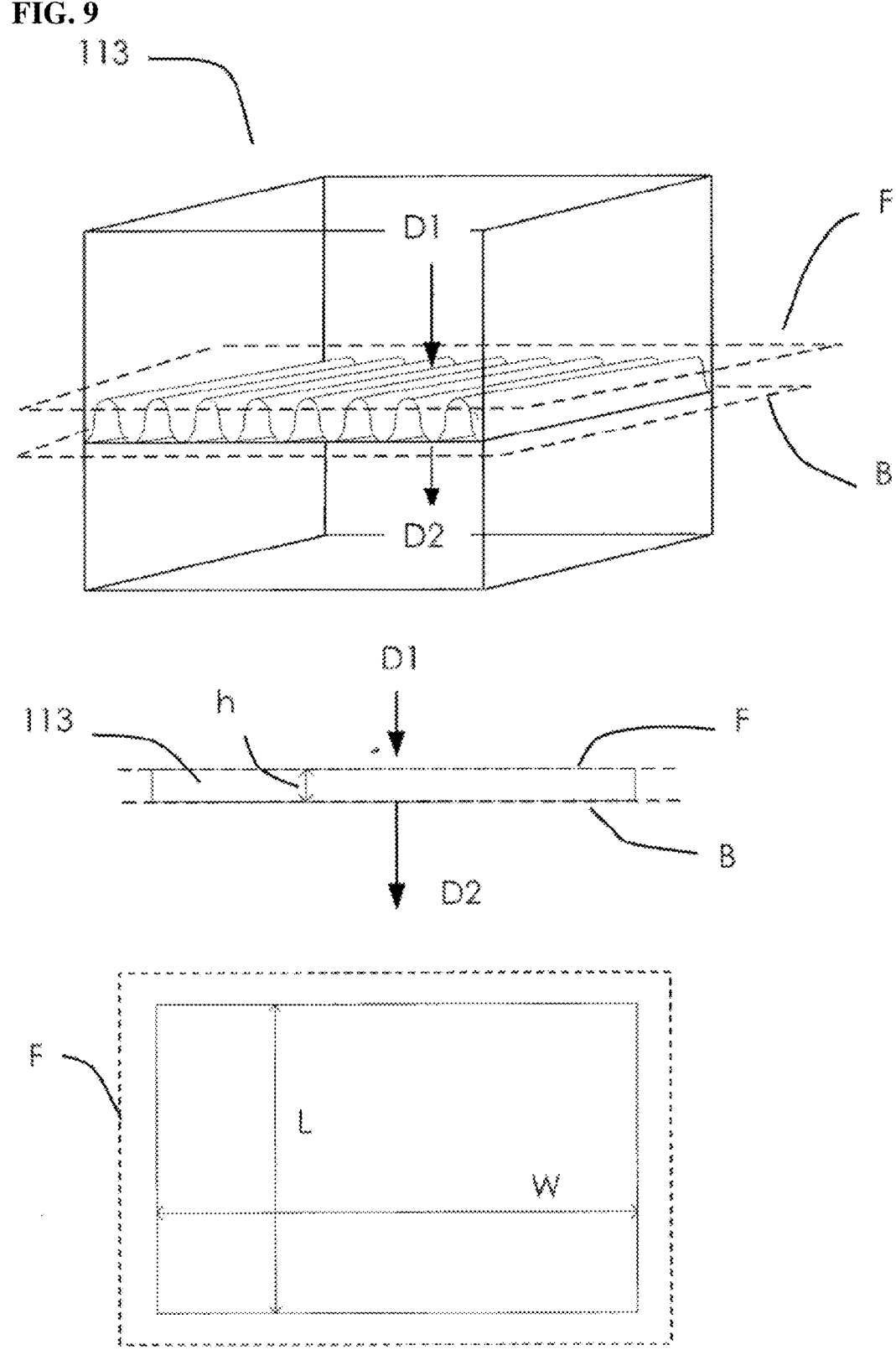
Figure 10:
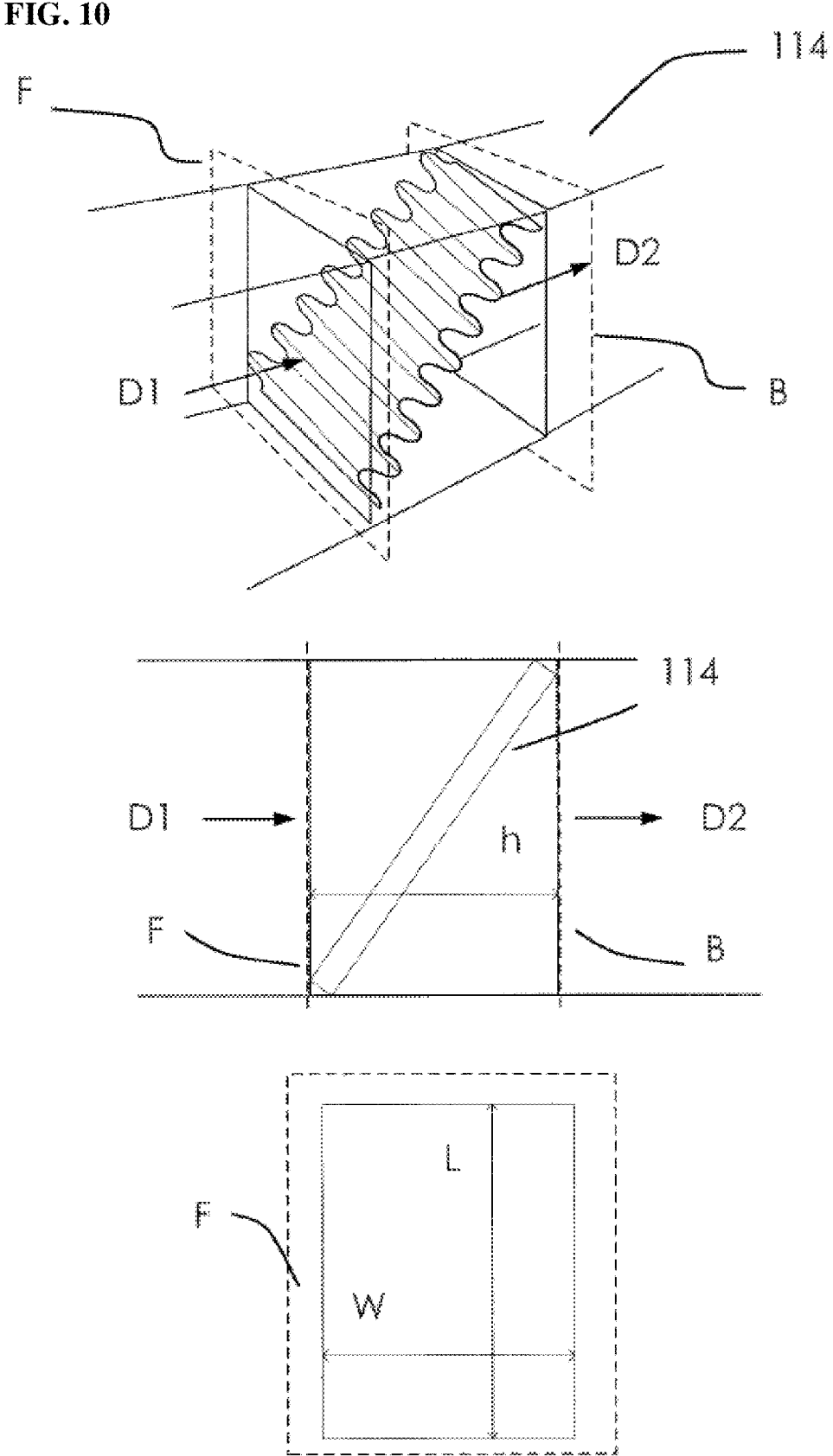

By way of non-limiting examples, FIG. 8 shows the boundary definitions for the volume of a single pleat or corrugation 112. FIG. 9 shows the boundary definitions for the volume of a pleated or corrugated sheet 113 with vapor flow path provided through the sheet by some form of permeability to gas flow. The face of the sheet is perpendicular to the vapor flow. In contrast, FIG. 10 shows the boundary definitions for the volume of a pleated or corrugated sheet 114 where its face is angled to gas flow. FIG. 11 shows the boundary definitions for the volume of an adsorbent volume 115 of parallel adsorbent sheets. FIG. 12 shows the boundary definitions for the volume of an adsorbent sleeve 116.

Determination of Incremental Adsorption Capacity

Figure 13:
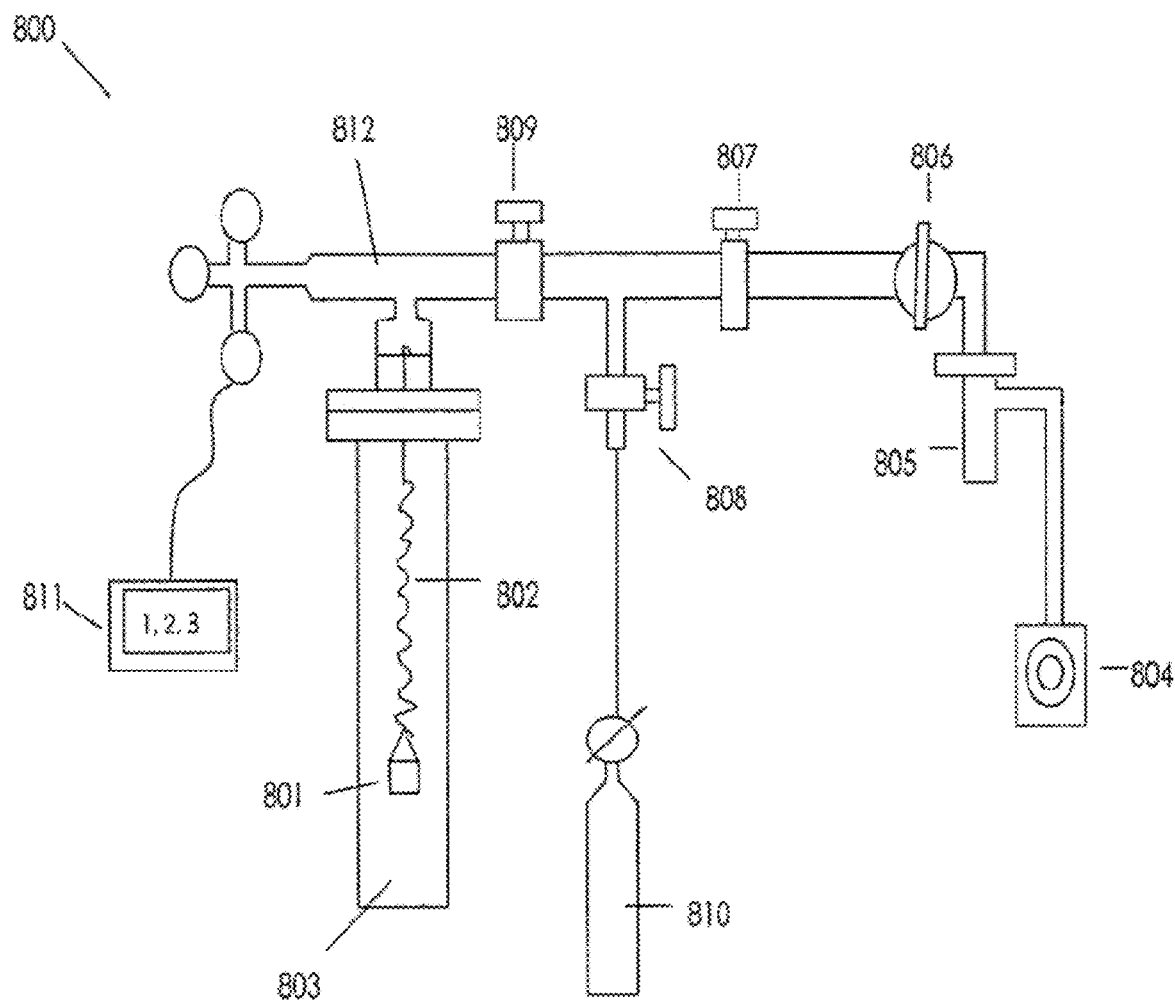
FIG. 13 is a simplified schematic drawing of the apparatus used for the determination of the butane adsorption capacity.
Figure 17:
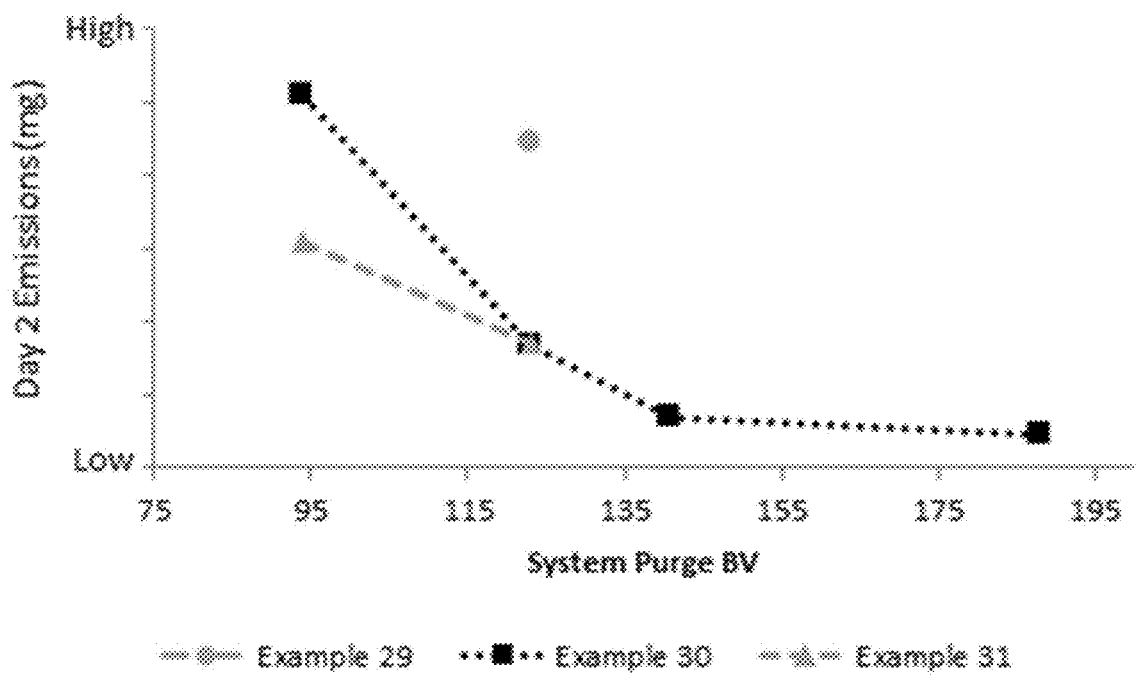
FIG. 17 is a graph of the Day 2 emissions for Examples 29-31 relative to system purge BV.
Figure 18:
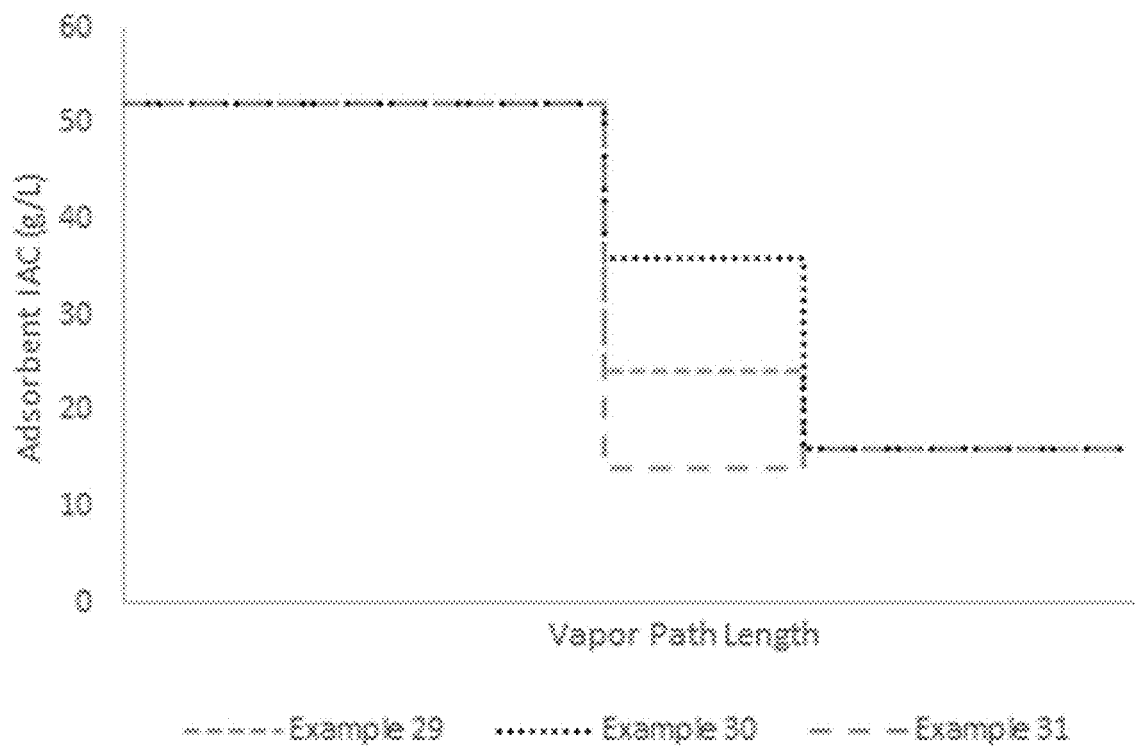
FIG. 18 is a graph of the adsorbent incremental adsorption capacity vs. vapor path length.
Figure 19:
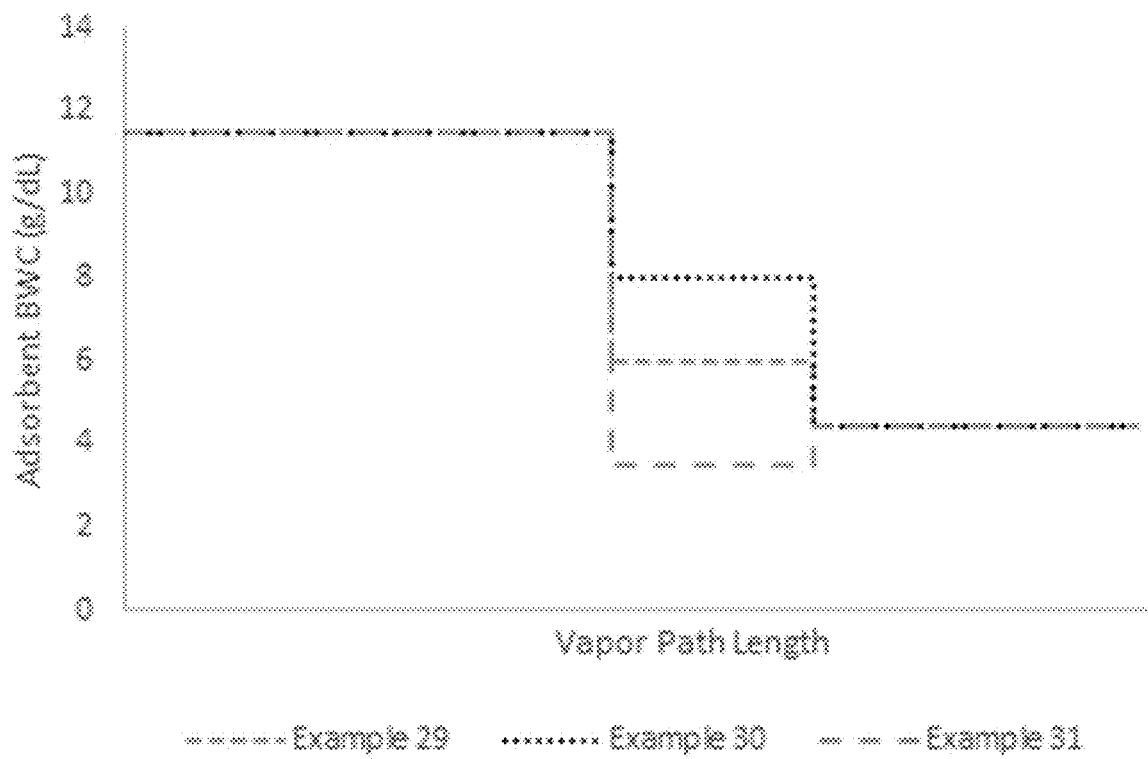
FIG. 19 is a graph of the adsorbent butane working capacity vs. vapor path length.
Figure 20:
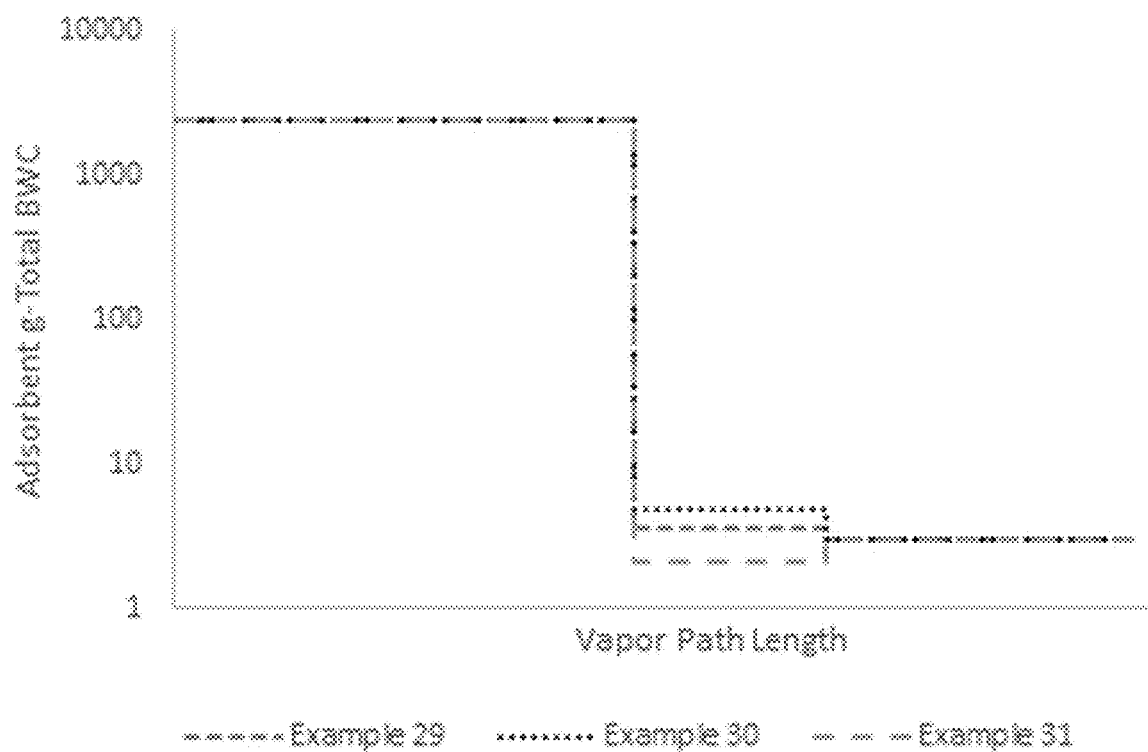
FIG. 20 is a graph of the adsorbent g-Total butane working capacity vs. vapor path length.

FIG. 13 shows a simplified schematic drawing of the apparatus used for the determination of the butane adsorption capacity. This is known in the field as the McBain method. The apparatus 800 includes a sample pan 801 and a spring 802 inside a sample tube 803, a rough vacuum pump 804, a diffusion pump 805, a stopcock 806, metal/O-ring vacuum valves 807-809, a butane cylinder 810, a pressure readout unit 811, and at least one conduit 812 connecting the components of the apparatus 800.

The representative adsorbent component sample ("adsorbent sample") was oven-dried for more than 3 hours at 110° C. before loading onto the sample pan 801 attached to the spring 802 inside the sample tube 803. Then, the sample tube 803 was installed into the apparatus 800. The adsorbent sample shall include representative amounts of any inert binders, fillers and structural components present in the nominal volume of the adsorbent component when the Apparent Density value determination equivalently includes the mass of the inert binders, fillers, and structural components in its mass numerator. Conversely, the adsorbent sample shall exclude these inert binders, fillers, and structural components when the Apparent Density value equivalently excludes the mass of the inert binders, fillers, and structural components in its numerator. The universal concept is to accurately define the adsorptive properties for butane on a volume basis within the nominal volume.

A vacuum of less than 1 torr was applied to the sample tube, and the adsorbent sample was heated at 105° C. for 1 hour. The mass of the adsorbent sample was then determined by the extension amount of the spring using a cathetometer. After that, the sample tube was immersed in a temperature-controlled water bath at 25° C. Air was pumped out of the sample tube until the pressure inside the sample tube was $10^{-4}$ torr. n-Butane was introduced into the sample tube until equilibrium was reached at a selected pressure. The tests were performed for two data sets of four selected equilibrium pressures each, taken about 38 torr and taken about 380 torr. The concentration of n-butane was based on the equilibrium pressure inside the sample tube. After each test at the selected equilibrium pressure, the mass of the adsorbent sample was measured based on the extension amount of the spring using cathetometer. The increased mass of the adsorbent sample was the amount of n-butane adsorbed by the adsorbent sample. The mass of n-butane absorbed (in gram) per the mass of the adsorbent sample (in gram) was determined for each test at different n-butane equilibrium pressures and plotted in a graph as a function of the concentration of n-butane (in % volume). A 5 vol % n-butane concentration (in volume) at one atmosphere is provided by the equilibrium pressure inside the sample tube of 38 torr. A 50 vol % n-butane concentration at one atmosphere is provided by the equilibrium pressure inside the sample tube of 380 torr. Because equilibration at precisely 38 torr and 380 torr may not be readily obtained, the mass of adsorbed n-butane per mass of the adsorbent sample at 5 vol % n-butane concentration and at 50 vol % n-butane concentration were interpolated from the graph using the data points collected about the target 38 and 380 torr pressures.

Alternatively, Micromeritics (such as Micromeritics ASAP 2020) may be used for determining the incremental butane adsorption capacity instead of the McBain method.

Determination of Nominal Incremental Adsorption Capacity

The term "nominal incremental adsorption capacity," as used herein, refers to an adsorption capacity according to the following equation:

Nominal Incremental Adsorption Capacity=[Adsorbed Butane at 50 vol %-Adsorbed Butane at 5 vol %]×Nominal Volume Apparent Density×1000 wherein

"Adsorbed Butane at 50 vol %" is the gram mass of absorbed n-butane per gram mass of adsorbent sample at 50 vol % butane concentration;

"Adsorbed Butane at 5 vol %" is the gram mass of absorbed n-butane per gram mass of adsorbent sample at 5 vol % butane concentration; and "Nominal Volume Apparent Density" is as defined herein.

Determination of Butane Working Capacity

The standard method ASTM D5228-16 may be used to determine the butane working capacity (BWC) of the adsorbent volumes containing particulate granular and/or pelletized adsorbents. The retentivity (g/dL) is calculated as the difference between the volumetric butane activity (g/dL) [i.e., the weight-basis saturation butane activity (g/100 g) multiplied by the apparent density (g/cc)] and the BWC (g/dL).

Determination of the Nominal Volume Butane Working Capacity (BWC)

The standard method ASTM D5228 may be used to determine the nominal volume butane working capacity (BWC) of the adsorbent volumes containing particulate granular and/or pelletized adsorbents.

A modified version of ASTM D5228 method may be used to determine the nominal volume butane working capacity (BWC) of the particulate, honeycomb, monolith, and/or sheet adsorbent volumes. The modified method may also be used for particulate adsorbents, where the particulate adsorbents include fillers, voids, structural components, or additives. Furthermore, the modified method may be used where the particulate adsorbents are not compatible with the standard method ASTM D5228, e.g., a representative adsorbent sample may not be readily placed as the 16.7 mL fill in the sample tube of the test.

The modified version of ASTM D5228 method is as follows. The adsorbent sample is oven-dried for a minimum of eight hours at 110±5° C., and then placed in desiccators to cool down. The dry mass of the adsorbent sample is recorded. The mass of the empty testing assembly is determined before the adsorbent sample is assembled into a testing assembly. Then, the test assembly is installed into the a flow apparatus and loaded with n-butane gas for a minimum of 25 minutes (±0.2 min) at a butane flow rate of 500 ml/min at 25° C. and 1 atm pressure. The test assembly is then removed from the BWC test apparatus. The mass of the test assembly is measured and recorded to the nearest 0.001 grams. This n-butane loading step is repeated for successive 5 minutes flow intervals until constant mass is achieved. For example, the total butane load time for a 35 mm diameter× 150 mm long honeycomb (Example 27 Supplemental Canister Adsorbent) was 66 minutes. The test assembly may be a holder for a honeycomb or monolith part, for the cases where the nominal volume may be removed and tested intact. Alternatively, the nominal volume may need to be a section of the canister system, or a suitable reconstruction of the nominal volume with the contents appropriately oriented to the gas flows, as otherwise encountered in the canister system.

The test assembly is reinstalled to the test apparatus and purged with 2.00 liter/min air at 25° C. and 1 atm pressure for a set selected purge time (±0.2 min) according to the formula: Purge Time (min)=(719×Nominal Volume (cc))/(2000 (cc/min)).

The direction of the air purge flow in the BWC test is in the same direction as the purge flow to be applied in the canister system. After the purge step, the test assembly is removed from the BWC test apparatus. The mass of the test assembly is measured and recorded to the nearest 0.001 grams within 15 minutes of test completion.

The nominal volume butane working capacity (BWC) of the adsorbent sample was determined using the following equation:

Nominal Volume BWC (g/dL)=Amount of Butane Purged (g)/Nominal Adsorbent Volume (dL).

wherein

Amount of Butane Purged=Mass of the test assembly after loading-Mass of the test assembly after purge.

The term "g-total BWC," as used herein, refers to g-amount of butane purged.

The term "canister approximate total vapor load," as used herein, refers the total weight gain of the canister during 2 day diurnal testing. It is equal to Day 1 load (g)+Day 2 load (g)−Backpurge (g).

The term "backpurge," as used herein, refers to the canister weight loss due to air flow caused by fuel tank vacuum during the Day 1 cool down in diurnal testing.

Determination of Diurnal Breathing Loss (DBL) Emissions

The evaporative emission control systems of Examples 1-118 were assembled with the selected amounts and types of adsorbents as shown in Tables 1-3 (see FIGS. 14-16).

Each example was uniformly preconditioned (aged) by repetitive cycling of gasoline vapor adsorption using certified TF-1 fuel (9 RVP, 10 vol % ethanol) or EPA certified Tier-3 fuel (9 RVP, 10 vol % ethanol) and 300 nominal bed volumes of dry air purge at 22.7 lpm based on the main canister (e.g., 630 liters for a 2.1 L main canister). The gasoline vapor load rate was 40 g/hr and the hydrocarbon composition was 50 vol %, generated by heating two liters of gasoline to about 36° C. and bubbling air through at 200 mL/min. The two-liter aliquot of fuel was replaced automatically with fresh gasoline every two hours until 5000 ppm breakthrough was detected by a FID (flame ionization detector). A minimum of 25 aging cycles were used on a virgin canister. The aging cycles were followed by a single butane adsorption/air purge step. This step was to load butane at 40 g/hour at a 50 vol % concentration in air at one atmosphere to 5000 ppm breakthrough, soak for one hour, then purge with dry air for 21 minutes with a total purge volume attained by selecting the appropriate constant air purge rate for that period. During the previous butane load and purge steps occurred within a chamber with an atmosphere temperature of approximately 20-25 C. The canister was then soaked with the ports sealed for 24 hour at 20° C.

The DBL emissions were subsequently generated by attaching the tank port of the example to a fuel tank filled 40 vol % (based on its rated volume) with CARB LEV III fuel (7 RVP, 10 vol. % ethanol) or Phase II (7 RVP, 0 vol % ethanol). Prior to attachment, the filled fuel tank had been stabilized at 18.3° C. for 24 hours while venting. The tank and the example were then temperature-cycled per CARB's two-day temperature profile, each day from 18.3° C. to 40.6° C. over 11 hours, then back down to 18.3° C. over 13 hours. During those two-day cycles for the 68 L tank and 2.1 L canister described in the current invention, gasoline vapor generation averaged about 34 g for Day 1, back purge averaged about 8.2 g, and Day 2 vapor generation averaged about 34.3 g for a net vapor challenge of about 61.7 g. In all cases, vapor generation and back purge were measured by the example canister weight changes during the Day 1 heat-up (Day 1 vapor generation), Day 1 cool-down (back purge), and Day 2 heat-up (Day 2 vapor generation). For fuel systems other than the systems described in the current invention, vapor generation and back purge are measured as stated above using the specific or commercial vehicle system fuel tank and canister. Emission samples were collected from the example vent at 6 hours and 12 hours during the heat-up stage into Kynar bags. The Kynar bags were filled with nitrogen to a known total volume based on pressure and then evacuated into a FID to determine hydrocarbon concentration. The FID was calibrated with a 5000 ppm butane standard. From the Kynar bag volume, the emissions concentration, and assuming an ideal gas, the mass of emissions (as butane) was calculated. For each day, the mass of emissions at 6 hours and 12 hours were added. Following CARB's protocol the day with the highest total emissions was reported as "2-day emissions." In all cases, the highest emissions were on Day 2. This procedure is generally described in SAE Technical Paper 2001-01-0733, titled "Impact and Control of Canister Bleed Emissions," by R. S. Williams and C. R. Clontz, and in CARB's LEV III BETP procedure (section D.12 in California Evaporative Emissions Standards and Test Procedures for 2001 and Subsequent Model Motor Vehicles, Mar. 22, 2012).

For Examples 1-16, a 68 liter fuel tank and a 2.1 liter main canister (Tables 1 and 2, Main Canister Type #1) was used as a main canister filled with 2.1 liters of a commercially available activated carbon adsorbent pellet (NUCHAR® BAX 1500 from Ingevity, North Charleston, S.C.). The main canister activated carbon adsorbent pellets are typically about 2-2.8 mm in length, and have high BWC, low flow restriction, and low M/m as compared to the vent-side particulate adsorbent materials described herein. The NUCHAR® BAX 1500 activated carbon adsorbent was present in two connected volumes of 1.4 and 0.7 liters. For Examples 17-25 and 99-100, a 68 liter fuel tank and a 2.1 liter main canister (Tables 1 and 2, Main Canister Type #2) was used as a main canister filled with 1.8 liters of NUCHAR® BAX 1500, in two connect volumes of 1.4 and 0.4 liters, and 0.3 liters of another commercially available activated carbon adsorbent pellet (NUCHAR® BAX LBE from Ingevity, North Charleston, S.C.), as shown in Table 1. Similar to NUCHAR® BAX 1500, NUCHAR® BAX LBE activated carbon adsorbent pellets are typically about 2-2.8 mm in length, and have high BWC, low flow restriction, and low M/m as compared to the vent-side particulate adsorbent materials described herein. For Examples 26 and 27, a 68 liter fuel tank and a 2.1 liter main canister (Tables 1 and 2, Main Canister Type #3) was used as a main canister filled with 1.8 liter of NUCHAR® BAX 1500, in two connect volumes of 1.4 and 0.4 liters, and 0.3 liters of a commercially available activated carbon adsorbent pellet (MPAC I™ from Mahle Corporation) activated carbon adsorbent, as shown in Table 1. For Examples 29-62 and 101-111, a 60 liter fuel tank and a 2.1 liter main canister (Tables 1 and 2, Main Canister Type #4) was used as a main canister filled with 2.1 liters of a commercially available activated carbon adsorbent pellet (NUCHAR® BAX 1100 from Ingevity, North Charleston, S.C.) in two connected volumes of 1.4 and 0.7 liters. NUCHAR® BAX 1100 activated carbon adsorbent pellets are typically about 2-2.8 mm in length, and have high BWC, low flow restriction, and low M/m as compared to the vent-side particulate adsorbent materials described herein.

For Examples 63-92, a 60 liter fuel tank and a 2.1 liter main canister (Tables 1 and 2, Main Canister Type #5) was used as a main canister filled with 2.1 liters of NUCHAR® BAX 1100 LD (low density) activated carbon adsorbent, in two connected volumes of 1.4 and 0.7 liters. For Examples 93 and 94, a 72.7 liter fuel tank and a 2.875 liter main canister (Tables 1 and 2, Main Canister Type #6) was used as a main canister filled with NUCHAR® BAX 1100 activated carbon adsorbent, in volumes of 2.7, 0.135, and 0.04 liters. For Example 95, a 72 L fuel tank and a 2.75 liter main canister (Tables 1 and 2, Main Canister Type #7) was used as a main canister filled with 2.3 liters of NUCHAR® BAX 1500, in volumes of 1.8 and 0.5 liters, and 0.45 liters of NUCHAR® BAX 1100 activated carbon adsorbent, as shown in Table 1. For Example 96, a 47 L fuel tank and a 1.8 L main canister (Tables 1 and 2, Main Canister Type #8) was used as a main canister filled with NUCHAR® BAX 1100 activated carbon adsorbent. For Example 97-98, a 68 L fuel tank and a 2.1 L main canister (Tables 1 and 2, Main Canister Type #9) was used as a main canister filled with 1.8 L NUCHAR® BAX 1500, in two connect volumes of 1.4 and 0.4 liters, and 0.3 L of the low retentivity particulate activated carbon adsorbent material as described herein.

The characteristics of each adsorbent are provided in Tables 1-3 (see FIGS. 14-16). Where present, the adsorbent volume of a supplemental canister is described in Table 2. Furthermore, Examples 29-33, 73, 74, 94, 96, and 106-111 included an additional adsorbent (described in Table 3, see FIG. 15) in the supplement canister that is downstream of the first adsorbent of the supplemental canister described in Table 1.

The adsorbent volume fills and dimensions for several of the exemplary main canisters described in Table 1 are provided below. The adsorbent volumes 201, 202, 203, and 204 refer to the volumes shown in FIG. 1. The designation "201+202" refers to a single adsorbent volume encompassing the right side of the canister in the FIG. 1 illustration. The designation "203+204" refers to a single adsorbent volume encompassing the left side of the canister in the FIG. 1 illustration.

For canister Type #1

The 201+202 volume is 1400 cc of NUCHAR® BAX 1500 and vapor flow path length of 201+202 volume is 16.7 cm. The average cross-sectional area is 84 cm2, the circle equivalent diameter is 10.3 cm, and the L/D is 1.6.

The 203+204 volume is 700 cc of NUCHAR® BAX 1500 and the vapor flow path length of 203+204 is 16.6 cm. The average cross-sectional area is 45 cm2, the circle equivalent diameter is 7.6 cm, and the L/D is 2.1.

For canister Type #2

The 201+202 volume is 1400 cc of NUCHAR® BAX 1500 and vapor flow path length of 201+202 volume is 16.7 cm. The average cross-sectional area is 84 cm2, the circle equivalent diameter is 10.3 cm, and the L/D is 1.6.

The 203 volume is 400 cc of NUCHAR® BAX 1500 and the vapor flow path length of 203 volume is 7.8 cm. The average cross-sectional area is 51 cm2, the circle equivalent diameter is 8.1 cm, and the L/D is 1.0.

The 204 volume is 300 cc of NUCHAR® BAX LBE and the vapor flow path length is 7.8 cm. The average cross-sectional area is 38 cm2, the circle equivalent diameter is 7.0 cm, and the L/D is 1.1.

For canister Type #3

The 201+202 volume is 1400 cc of NUCHAR® BAX 1500 and vapor flow path length of 201+202 volume is 16.7 cm. The average cross-sectional area is 84 cm2, the circle equivalent diameter is 10.3 cm, and the L/D is 1.6.

The 203 volume is 400 cc of NUCHAR® BAX 1500 and the vapor flow path length of 203 volume is 7.8 cm. The average cross-sectional area is 51 cm2, the circle equivalent diameter is 8.1 cm, and the L/D is 1.0.

The 204 volume is 300 cc MPAC 1™ and the vapor flow path length is 7.8 cm. The average cross-sectional area is 38 cm2, the circle equivalent diameter is 7.0 cm, and the L/D is 1.1.

For canister Type #4

The 201+202 volume is 1400 cc of NUCHAR® BAX 1100 and vapor flow path length of 201+202 volume is 16.7 cm. The average cross-sectional area is 84 cm2, the circle equivalent diameter is 10.3 cm, and the L/D is 1.6.

The 203+204 volume is 700 cc of NUCHAR® BAX 1100 and the vapor flow path length of 203+204 is 16.6 cm. The average cross-sectional area is 45 cm2, the circle equivalent diameter is 7.6 cm, and the L/D is 2.1.

For canister Type #5

The 201+202 volume is 1400 cc of NUCHAR® BAX 1100 LD and vapor flow path length of 201+202 volume is 16.7 cm. The average cross-sectional area is 84 cm2, the circle equivalent diameter is 10.3 cm, and the L/D is 1.6.

The 203+204 volume is 700 cc of NUCHAR® BAX 1100 LD and the vapor flow path length of 203+204 is 16.6 cm. The average cross-sectional area is 45 cm2, the circle equivalent diameter is 7.6 cm, and the L/D is 2.1.

For canister Type #9

The 201+202 volume is 1400 cc of NUCHAR® BAX 1500 and vapor flow path length of 201+202 volume is 16.7 cm. The average cross-sectional area is 84 cm2, the circle equivalent diameter is 10.3 cm, and the L/D is 1.6.

The 203 volume is 400 cc of NUCHAR® BAX 1500 and the vapor flow path length of 203 volume is 7.8 cm. The average cross-sectional area is 51 cm2, the circle equivalent diameter is 8.1 cm, and the L/D is 1.0.

The 204 volume is 300 cc of the inventive low flow restriction pellets also found in example 101, and the vapor flow path length is 7.8 cm. The average cross-sectional area is 38 cm2, the circle equivalent diameter is 7.0 cm, and the L/D is 1.1.

Tables 1-3 summarize the conditions of the canister systems of Examples 1-111 and their measured 2-day DBL emissions. As discussed above, the California Bleed Emissions Test Procedure (BETP) requires that a 2-day DBL emissions of less than 20 mg. As will be described in the following paragraphs, the requirement not to exceed 20 mg for BETP under purge at or below 150 BV was met by the evaporative emission control canister systems of the present disclosure.

As can be seen in the data provided in Table 2, and as will be discussed below, evaporative emission control canister systems of the present disclosure have low two-day DBL, e.g., below about 50 mg or below about 20 mg. The adsorbent volumes in the examples are described via the fuel vapor flow path, i.e., in order from the fuel vapor inlet to the vent port. It should be understood that the illustrations and description of adsorbent volumes as "fuel-side" and "vent-side" are provided for certain aspects and embodiments and, as would be appreciated by the skilled artisan, are not limiting on the scope of the present disclosure. It is expressly contemplated that the described low retentivity particulate adsorbent volume(s), can be located at any number of positions in the flow path from fuel inlet (104 in FIG. 2) to vent port (105 in FIG. 2). Indeed, one or more of the described low retentivity particulate adsorbent volume(s) can be placed upstream and/or downstream of (i) one or more high working capacity adsorbent volumes, (ii) one or more of another low capacity adsorbent volume, e.g., a monolith, honeycomb, polymer or paper sheet, or (iii) any combination thereof.

For example, with reference to FIG. 2, in certain examples the fuel-side adsorbent volume 201 is the first adsorbent volume in the flow path from fuel vapor inlet 104 to the vent port 105. In such an instance, each additional adsorbent volume in the vapor flow path (i.e., 202, 203, 204, 301, 302, 303, 304, and 305) can be considered a vent-side adsorbent volume. In certain embodiments, the first adsorbent volume comprises a high working capacity adsorbent material, such as a particulate. However, the system is not so limited. For example, also contemplated are canister systems in which the high working capacity adsorbent material is downstream of a first volume or is comprised in a plurality of adsorbent volumes along the flow path. In certain embodiments, the high working capacity adsorbent volume is upstream, downstream or both of a lower working capacity adsorbent volume such as the particulate adsorbent volume as described herein, a monolith, a honeycomb, a polymer or paper sheet or combination thereof. Moreover, as will be recognized by the skilled artisan, the respective adsorbent volumes as described herein can be located in the same canister or separate canisters or both, and the particular configuration of FIG. 2 is not limiting on the described canister systems. Furthermore, any number of the adsorbent volumes can include a voidage between them.

Example systems 32 and 33 utilize main canister 4, which includes NUCHAR® BAX 1100 LD at the fuel vapor side of the system. The supplemental canister of Example 32 includes MPAC I followed by 29×100 activated carbon honeycomb (HCA) (Ingevity®, Charleston, S.C., USA), while the supplemental canister of Example 33 includes a low retentivity particulate adsorbent as described herein followed by 29×100 HCA. As can be seen from Table 2, Example 33 has a substantially lower two-day DBL (31.1 mg), as compared to comparative Example 32 (50.9 mg). Similarly, Example 31 (NUCHAR® BAX1100, low retentivity particulate adsorbent, 29×100 HCA) had a substantial decrease (17.1 mg) relative to Example 29 (44.6 mg; NUCHAR® BAX 1100, 5 mm NUCHAR® BAX LBE, 29×100 HCA).

Furthermore, low retentivity particulate adsorbent containing Examples 43, 52, 53, 57, 58, 59, 60, and 62 also demonstrated a two-day DBL below 20 mg. Similar to Example 35, NUCHAR® BAX 1100 is located on the fuel vapor side in the main canister and low retentivity particulate adsorbent is present downstream (i.e., toward the vent port). As compared to comparative examples (e.g. Examples 64, 65, 66, 67, 89, 90, 91, and 68) that received similar purge treatment (i.e., purge BV of 150 and a purge of 315 L), these examples have substantially lower two-day DBL, which are below the California BETP required 20 mg. Examples that include main canister 5 (NUCHAR® BAX 1100 LD fuel vapor side) and a supplemental canister having a low retentivity particulate adsorbent (e.g., Examples 80, 85, 79, 88, 86, and 87) also had a two-day DBL below 20 mg.

FIGS. 17-20 demonstrate that the capacity vs. path length function of the first adsorbent of the supplemental canister in Example 31 (i.e., a low retentivity adsorbent as described herein) is non-monotonic. That is, it is surprising and unexpectedly observed that at a certain path length, the adsorbent has an unexpected increase in capacity.

Figure 22:
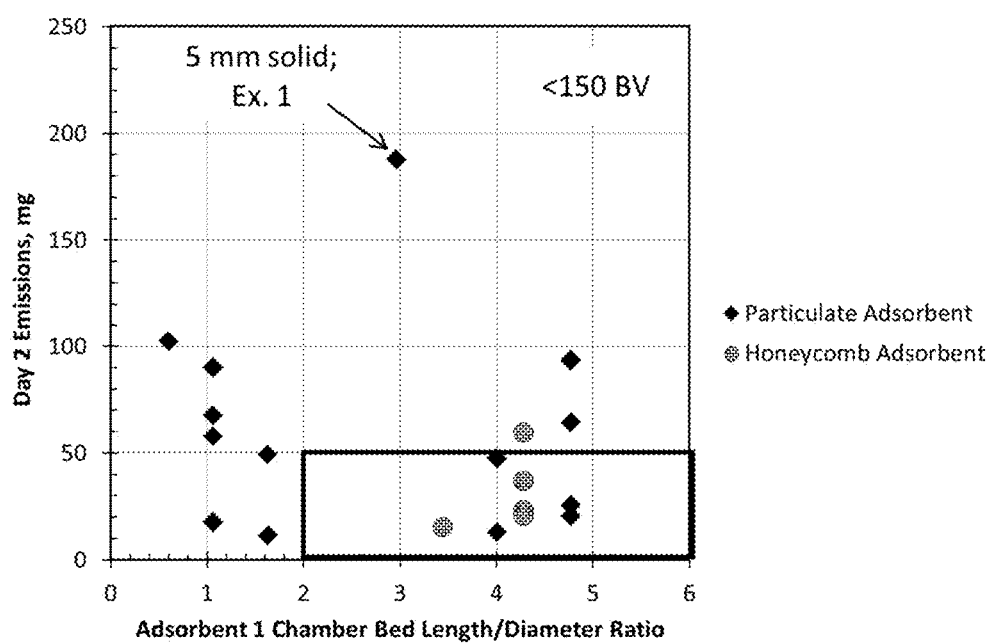
FIG. 22 illustrates the effects of the length/diameter ratio on two-day DBL for an evaporative emission control system having a canister with one or more vent-side adsorbent volumes with alternative adsorbent fills, as described in Tables 2 and 3.
Figure 23:
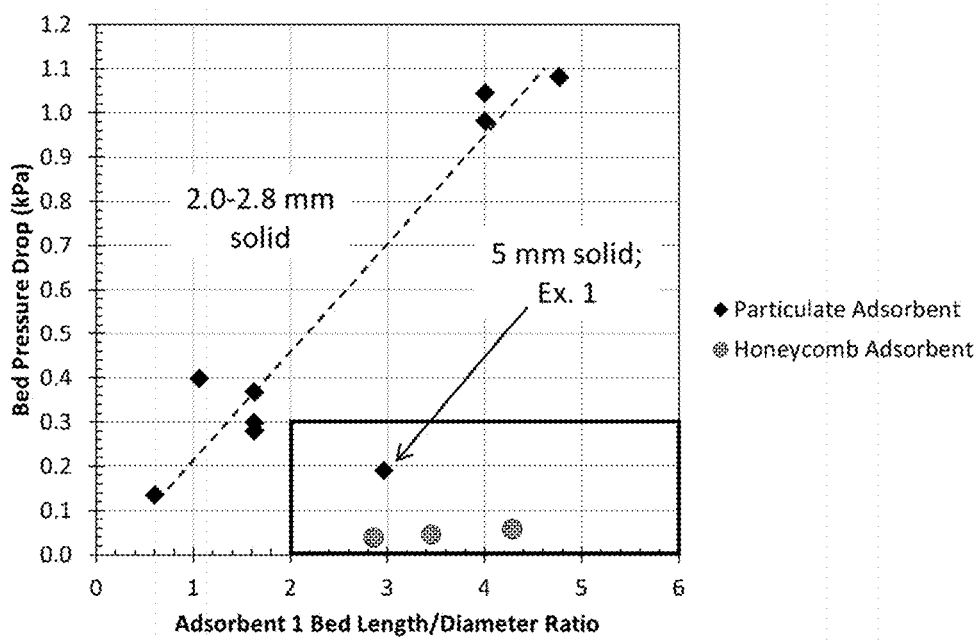
FIG. 23 illustrates the effects of the length/diameter ratio on pressure drop for an evaporative emission control system having a canister with one or more vent-side adsorbent volumes with alternative adsorbent fills, as described in Tables 2 and 3. Note that the particulate adsorbents as described herein provide reduced bed pressure drop as compared to currently available particulate adsorbents.

FIG. 21 illustrates with examples the well-known performance tradeoff with conventional solid particulate adsorbents (cylindrically shaped pellets, "filled diamonds") with diameters of 2-5 mm in providing the target flexibility of reasonable flow restriction and DBL emissions performance. These examples are for main canisters with one or more vent-side adsorbent volumes with alternative adsorbent fills, as described in Tables 2 and 3. When tested under a BETP protocol employing a purge applied after the 40 g/hr butane loading step of less than 150 bed volumes (BV) based on the total nominal volume of adsorbents in the system (see conventional examples in Tables 1-3 for the system descriptions), only the carbon honeycomb examples populate the space of a reasonable flow restriction for a vent-side volume of <0.3 kPa at 40 standard liter per minute (slpm) for the chamber (i.e., the chamber containing the adsorbent volume, less the empty holder) and with a BETP test result of less than 50 mg for day 2 DBL emissions. In contrast, the conventional pellets smaller than 3 mm, though a low cost solution, have an unfortunate tradeoff between flow restriction and emissions performance. These pellets might match the emissions performance but requires geometric proportions of the adsorbent bed (e.g., low bed length relative to diameter, that imposes excessive flow restriction, or a reasonable flow restriction is provided by a more favorable bed proportions but the DBL emissions are excessive. As noted in above for applying low cross sectional area to adsorbent volume or chamber dimensions according to the teaching of U.S. Pat. No. 5,957,114, the elongated chamber with a length to diameter ratio, L/D, of greater than 2 favor the low DBL emissions response (FIG. 22) for the conventional particulate adsorbents in comparison with the carbon honeycomb adsorbents of similar dimensions, but those conventional adsorbents have excessive flow restriction (FIG. 23). Notably, the large diameter solid pellet (Example 1) overcomes the flow restriction barrier for the favorable chamber geometry of an L/D greater than 2, but the DBL emissions performance of the system is severely impaired, attributed to the poor purgeability of the large diameter solid pellets.

Figure 24:
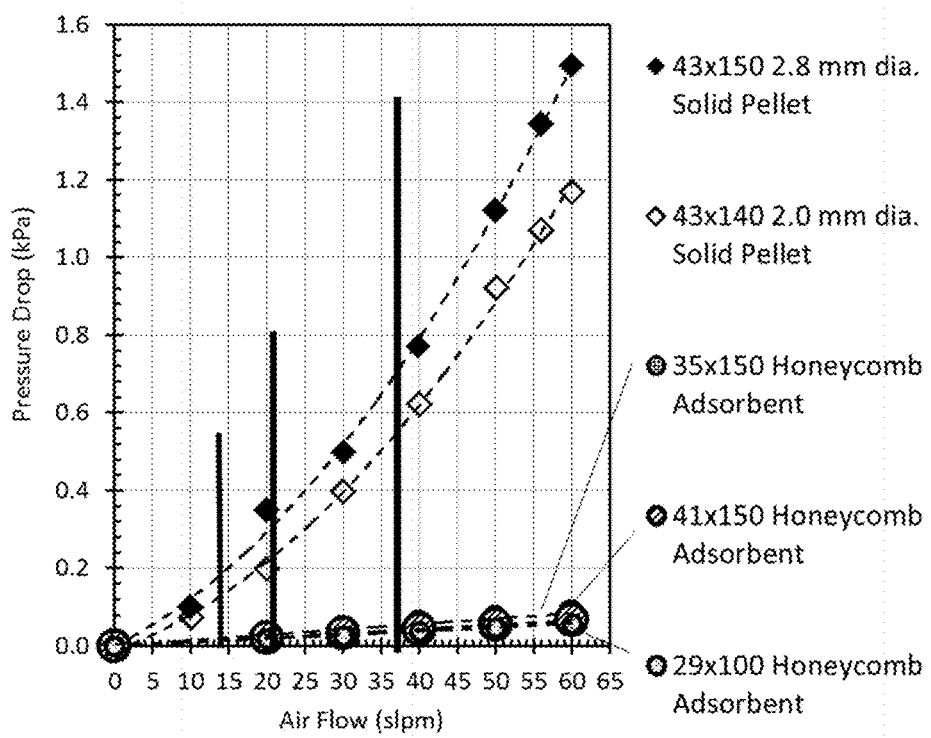
FIG. 24 illustrates the flow restriction of conventional particulate adsorbents and carbon honeycombs for typical flow rates (slpm or lpm).
Figure 25:
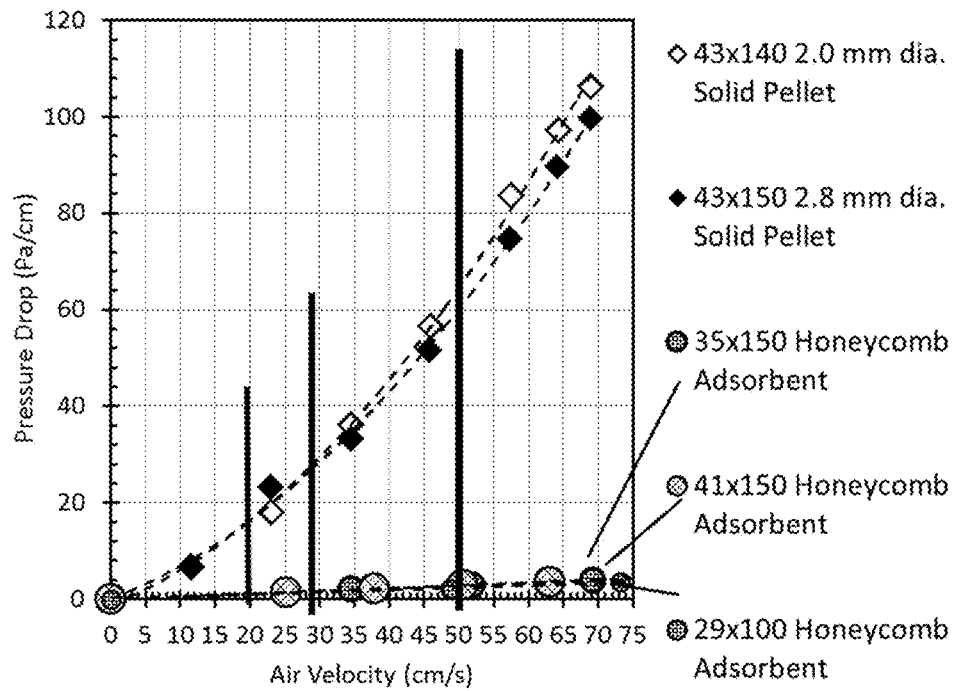
FIG. 25 shows those typical flow rates in terms of the gas velocities for the vent-side volumes in FIGS. 21 through 23.

FIGS. 24 and 25 illustrate the flow restriction of the conventional pellets and carbon honeycombs for the flow rates often cited for evaporative emission control canister systems. As described above, a canister system manufacturer might initially design an overall adsorbent chamber strategy, and then go about comparing available products, in comparing and balancing the factors of cost, flow restriction, working capacity performance and bleed control, among others. For the comparisons in FIGS. 24 and 25, the 43 mm diameter×150 mm long ("43×150") particulate adsorbent bed is a representative example of the volume fill of a chamber with particulate adsorbent that would otherwise contain a 35 mm diameter×150 mm long carbon honeycomb ("35×150"), that is the 35 mm diameter carbon honeycomb plus a 4 mm thick o-ring. An o-ring, or other sealant material, both keeps the honeycomb in-place and seals between the honeycomb exterior skin and the chamber interior wall, causing air and vapor flows to go through the honeycomb cells and not bypass in the peripheral gap around the monolith. In FIG. 24, typically familiar flows encountered in canister system testing and qualification are highlighted. The 15 slpm is the purge flow employed in a 150 BV DBL prep for a 2.1 liter canister system. A purge rate of 22.7 slpm is typically used in EPA GWC and GWC measurements. The maximum fuel flow for ORVR in the US is about 10 gallons per minute, meaning a displaced air-vapor flow to the canister system of about 40 slpm. A canister system specification by GM for maximum flow restriction under ORVR, as cited in the Background, is at 60 slpm. FIG. 25 shows those important flows in terms of the gas velocities for the vent-side volumes in FIG. 21 through 23, and the flow restriction, not in terms of chamber restriction, but in terms of the flow restriction per length of bed or part for a 43 mm diameter bed for the particulate examples, as a means for comparing flow restriction properties of materials. Clearly, the conventional solid pellets of the typical 2-2.8 mm diameter as found within main canister chambers are not competitive with carbon honeycombs, making their potentially low emissions performance impractical for the required chamber geometries of an L/D greater than 2.

To address the limitations exhibited by conventional pellet media for vent-side fills the description provides a particulate adsorbent in at least one volume within the canister system that: 1) employs particulate shapes of sufficiently large size, e.g., nominal diameter, so as to obtain low flow restriction properties (Pa/cm pressure drop) and thereby temper the flow restriction of chambers with favorably elongated geometries, 2) avoids solid forms such as solid cylinders so as to enhance DBL emissions performance, and 3) employs adsorbent materials prepared with appropriate choice of fillers, binders, and extrusion aids so as to obtain an M/m ratio in a range of 150+% for low retentivity, which is contrary to conventional wisdom, and obtain low flow restriction vent-side particulate adsorbents. Thus, the description surprisingly and unexpectedly provides a canister system including a vent-side particulate adsorbent volume with 150+M/m properties, and with <40 Pa/cm pressure drop flow restriction properties under 46 cm/s apparent linear air flow velocity when measured as a 43 mm diameter bed.

U.S. Pat. No. 9,174,195, for example, teaches away from making a low flow-restriction adsorbent particulate material that provides superior DBL emissions control, good strength, and low retentivity properties. As such, the present findings are surprising and unexpected. In addition, the 2.6 mm diameter (as measured by calipers) conventional solid activated carbon pellet, 2GK-C7 (Kuraray Chemical Co., Ltd.) as described in U.S. Patent application 2007/78056A1 also teaches that such performance cannot be obtained from a larger pellet that limits flow restriction.

2GK-C7 may be found in canister systems installed in 2010 model year Mitsubishi Outlander™ "PZEV" and "federal" vehicles (i.e., those certified via EPA Tier 2, meeting a 500 mg/day 2-day full vehicle test requirement), and in 2010 model year Suzuki SX-4 vehicles. As obtained in 2010 from canister systems made for such vehicles, the 2GK-C7 has a pellet diameter of about 2.7 mm, has an M/m property of 164%, and a retentivity of about 0.6 g/dL as determined using the methods as described herein. The 2GK-C7 pellet has a strength of 99+ by the commercially accepted method employed here. The '195 patent teaches that, in preparing a large diameter pellet with M/m increased to levels greater than 150%, there is an asymptotic leveling off of retentivity to about 1 g/dL and a sharp decrease in strength (FIGS. 5 and 6, respectively of the '195 patent), thereby restricting large diameter pellets with suitable strength and adsorptive properties to a space defined by an M/m of less than 150%, and preferably in the range of 65-150%.

In certain embodiments, present description provides evaporative emission canister systems comprising at least one vent-side particulate adsorbent volume, wherein the particulate adsorbent material has an M/m of greater than 200%, and <1 g/dL butane retentivity. In another embodiment, the particulate adsorbent material has an M/m of above 150%, and <0.5 g/dL butane retentivity. Inventive examples for these embodiments are described herein.

The use of Pa/cm flow restriction as measured by the protocol defined herein is more appropriate than pellet diameter because complicated geometric shapes could preclude accurate measurement of a characteristic diameter as otherwise easily assigned for circular cross-sections cylinders, triangular solids, square solid, pentagonal solids, hexagonal solids, etc. For purposes of physical examples of the invention, a hollow solid-walled cylinder has been employed herein. Yet, alternative shapes for low flow restriction with hollow characteristics (e.g., thin walls and low diffusional path length resistance between the bulk phase and the adsorbent interior) may be utilized, and these shapes include twisted ribbons, coiled strands, saddles, or hollow shells. These shapes may further include striations, indentations, and perforations for imparting better strength and adsorbate purgeability properties. Furthermore, these more complex shapes may enable a smaller apparent geometric "diameter" that could accommodate lower flow restriction than a simple cylinder or geometric solid of similar diameter might otherwise accommodate, e.g., an open spring, twisted ribbon, or saddle compared with a particulate formed as solid walled cylinder with axially oriented parallel channels.

Figure 26:
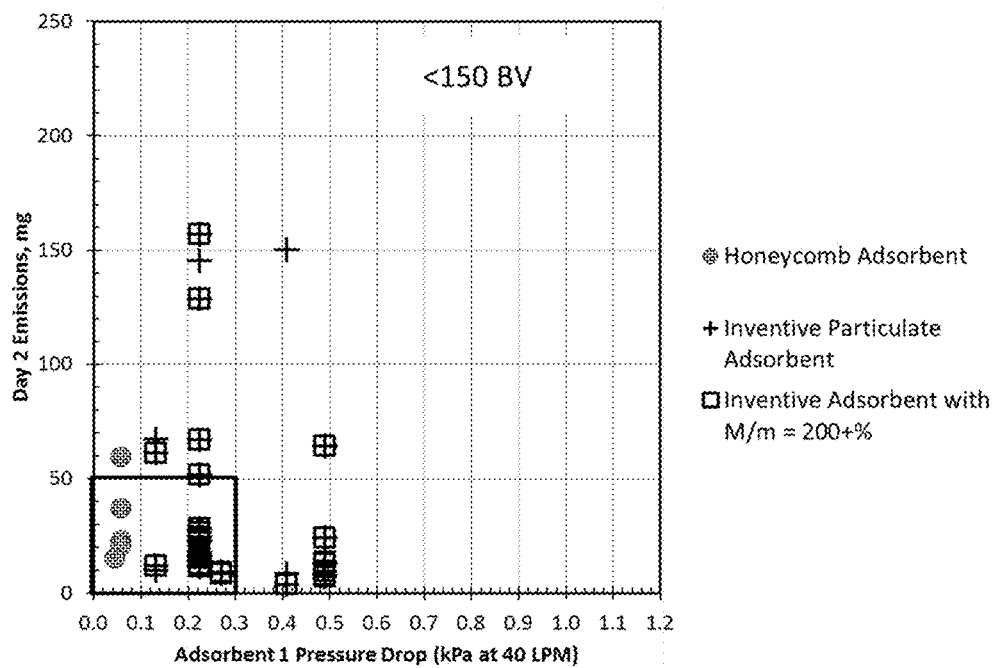
FIG. 26 shows inventive examples of particulate adsorbent capable of providing for low DBL emissions and low flow restriction performance as compared to the conventional materials exemplified in FIG. 21.

In contrast with the conventional particulate adsorbent examples in FIG. 21, FIG. 26 shows examples of particulate adsorbent having the features as described herein capable of providing low DBL emissions and low flow restriction performance was not possible with the conventional materials as exemplified in FIG. 21. Certain configurations of carbon honeycombs as well as the materials as described herein ("the inventive examples") do not fill the performance box. Numerous inventive examples do fill the performance box with lower DBL emissions than exhibited by the carbon honeycombs, with chamber flow restrictions approaching that of the carbon honeycombs. While all of these high performing examples characteristically have M/m properties greater than 150%, many have M/m properties greater than 200%.

Figure 27:
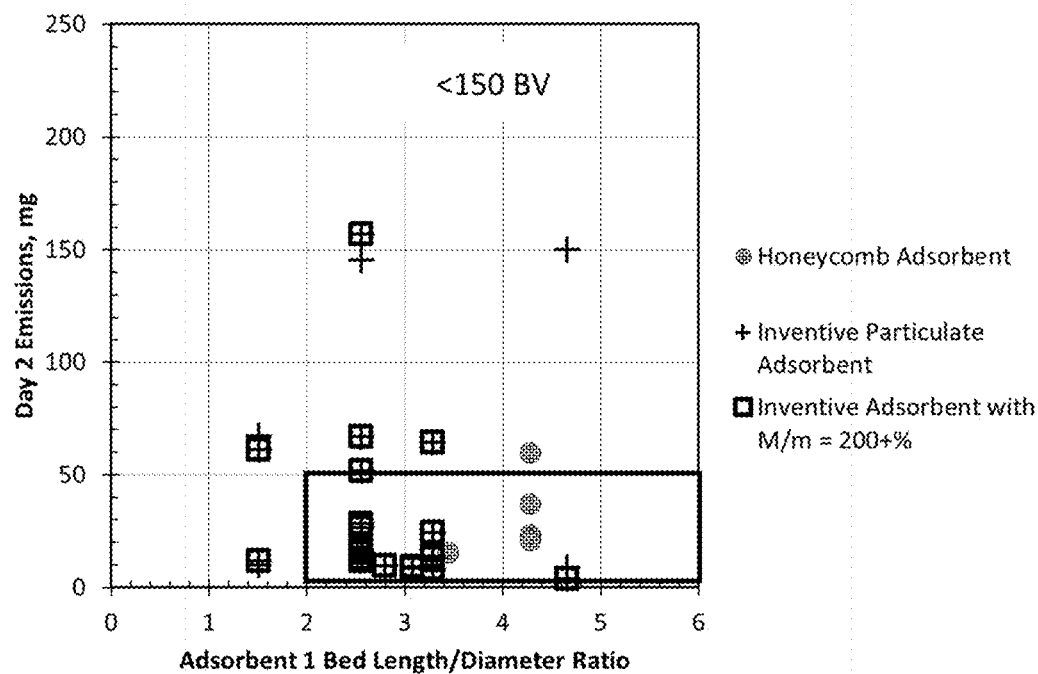
FIG. 27 illustrates high performing exemplary or inventive vent-side particulate adsorbent volumes compared with carbon honeycombs with high chamber L/D of greater than 2.
Figure 28:
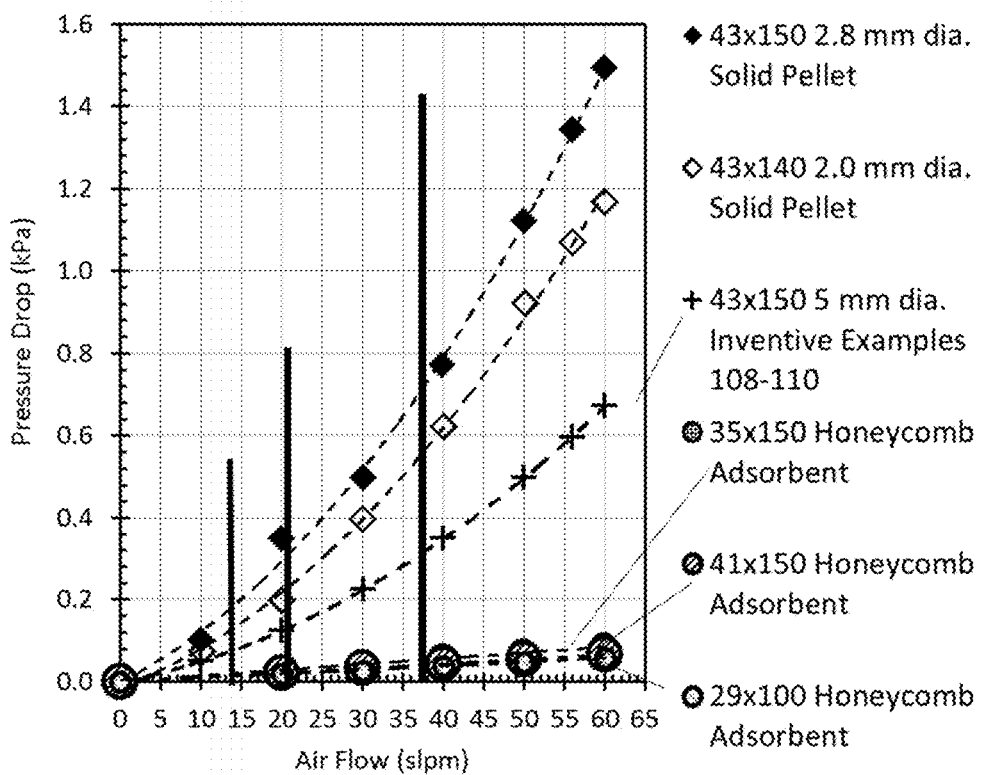
FIG. 28 illustrates the flow restriction of exemplary or inventive particulate adsorbents and carbon honeycombs for typical flow rates (slpm).
Figure 29:
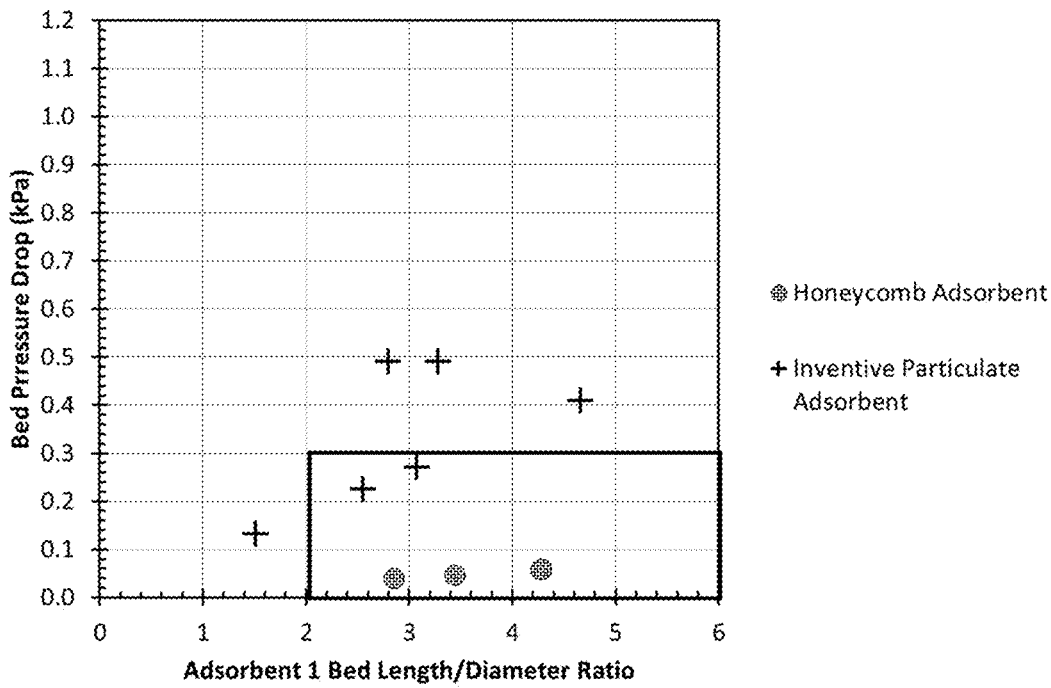
FIG. 29 illustrates the effects of the length/diameter ratio on pressure drop for an evaporative emission control system having one or more exemplified or inventive vent-side particulate adsorbent volumes compared with carbon honeycombs.
Figure 30:
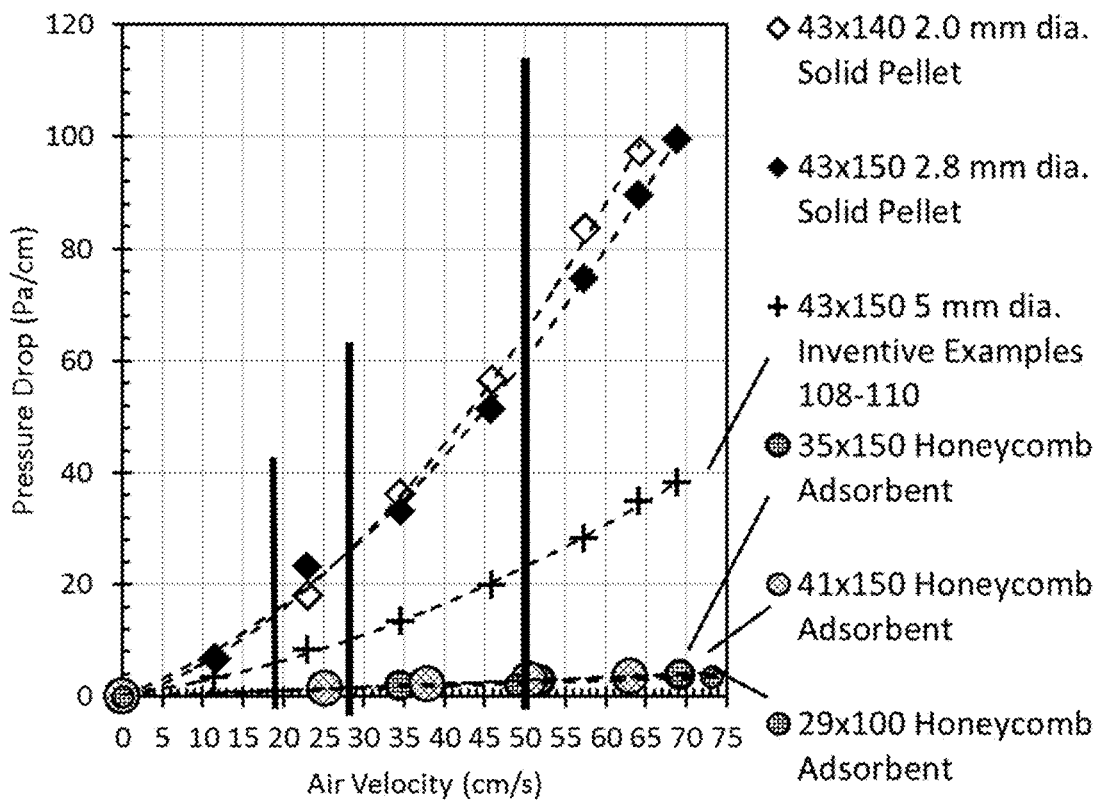
FIG. 30 shows flow rates in terms of the gas velocities for emission canister systems including the exemplary or inventive vent-side particulate adsorbent volumes compared with carbon honeycombs.

FIG. 27 illustrates high performing inventive examples with favorably high chamber L/D of greater than 2 which is considered to be a contributing factor for the low DBL emissions. FIGS. 28, 29, and 30 and show how the feasibility of low flow restriction for the favorably high L/D is made possible by the low flow restriction properties of the inventive examples. At 46 cm/s apparent linear air flow velocity, the inventive examples are a bare fraction of the Pa/cm pressure drop flow restriction of the conventional 2-2.8 mm diameter solid conventional pellets when placed in similar 43 mm diameter chambers.

Figure 42:
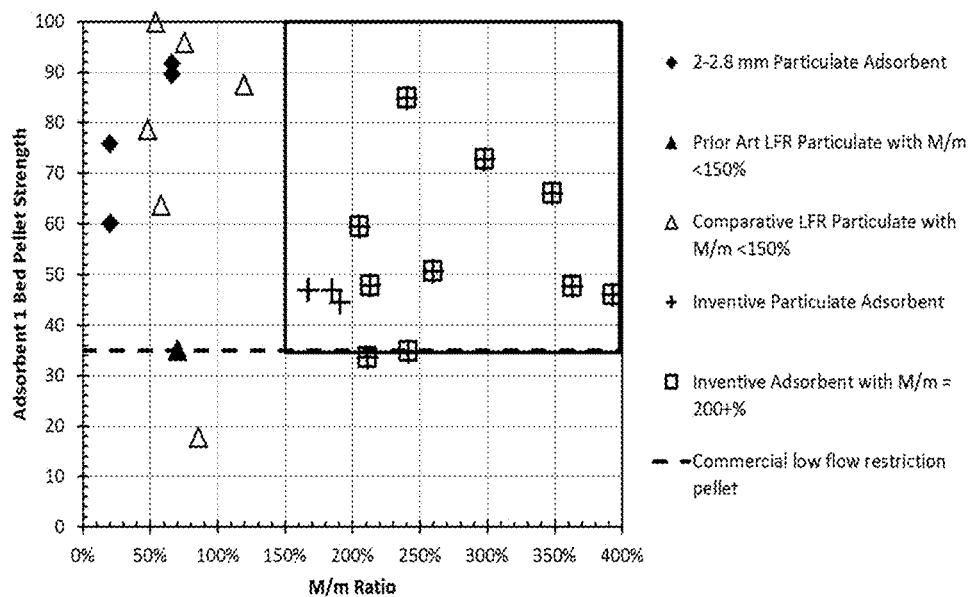
FIG. 42 shows the pellet strength of the particulate adsorbent in the examples of FIGS. 26 and 27 as a function of the M/m properties, where "LFR" indicates low flow restriction.
Figure 43:
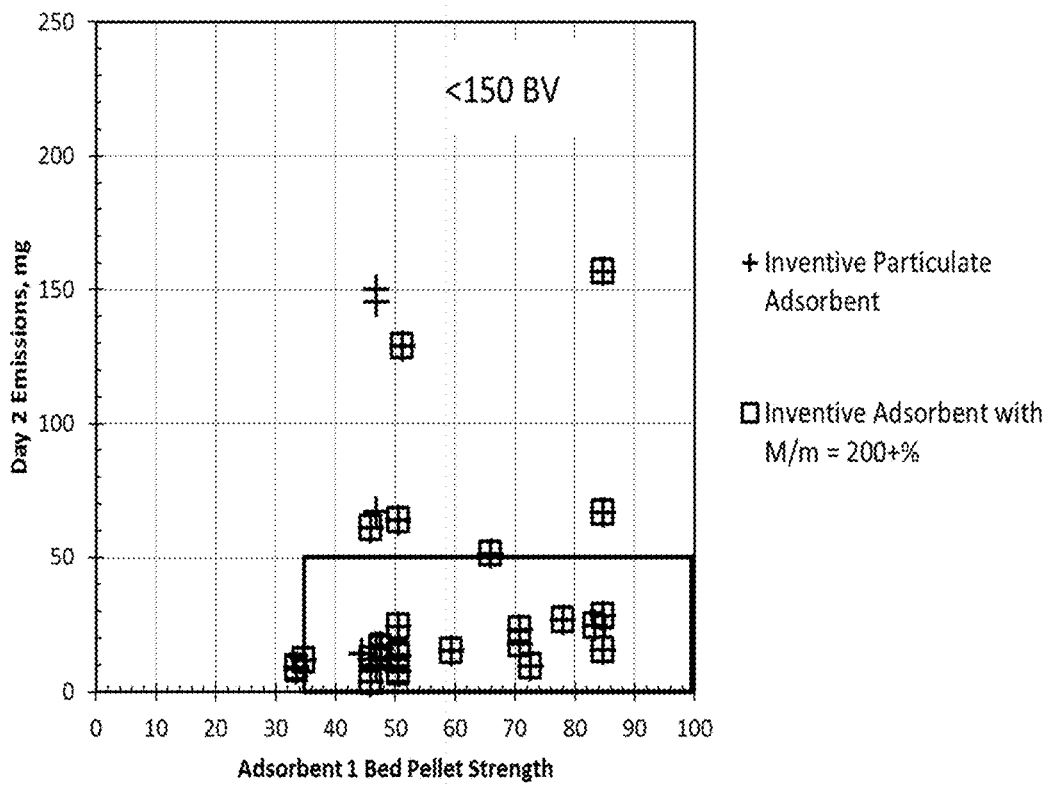
FIG. 43 shows the low flow restriction particulate adsorbents of the examples of FIGS. 26 and 27, which are able to achieve excellent control of DBL emissions while demonstrating good pellet strength, and with (or despite) their high M/m properties.

A further surprising aspect of the present invention is the good strength properties of the inventive samples at M/m ratio of >150%, despite the teachings of prior art, particularly U.S. Pat. No. 9,174,195. FIG. 42 shows the pellet strength of the particulate adsorbent in the examples of FIGS. 26 and 27 as a function of the M/m properties, where "LFR" indicates low flow restriction. For comparison purposes, one metric of acceptable strength is 35 by this test. A 35 strength is the property measured for MPAC1 (Kuraray Chemical Co., Ltd.; shown as a solid triangle symbol in FIG. 42) that was obtained from canister systems manufactured for evaporative emissions control in vehicles. MPAC1 is hollow, cylindrical, low flow restriction pellet with geometry and properties that fall within the ranges taught by U.S. Pat. No. 9,174,195 pellet, including an M/m of 66%, and was found as an adsorbent fill within a vent-side volume in commercial canister systems. A second industry accepted metric for comparison purposes is the minimum product strength specification of 40 that is required by some canister system manufacturers for the high working capacity 2 mm Nuchar® BAX 1700 activated carbon pellets. As apparent from FIG. 42, the inventive examples have strengths well above the commercially typical value of 35 for a low flow restriction pellet and well above the 40 minimum specification of a high working capacity pellet. As shown in FIG. 43 for the set of inventive canister system examples of FIGS. 26 and 27, the inventive low flow restriction particulate adsorbents are able to achieve excellent control of DBL emissions while demonstrating good pellet strength, and with (or despite) their high M/m properties. While a couple of the inventive low flow restriction particulate adsorbents in the canister system examples have pellet strength at, or just below, the comparative 35 and 40 strength metrics, the strength of the samples can be further optimized by, for example, modifying the binder formulation but maintaining the other desired characteristics according to the present disclosure.

Figure 31:
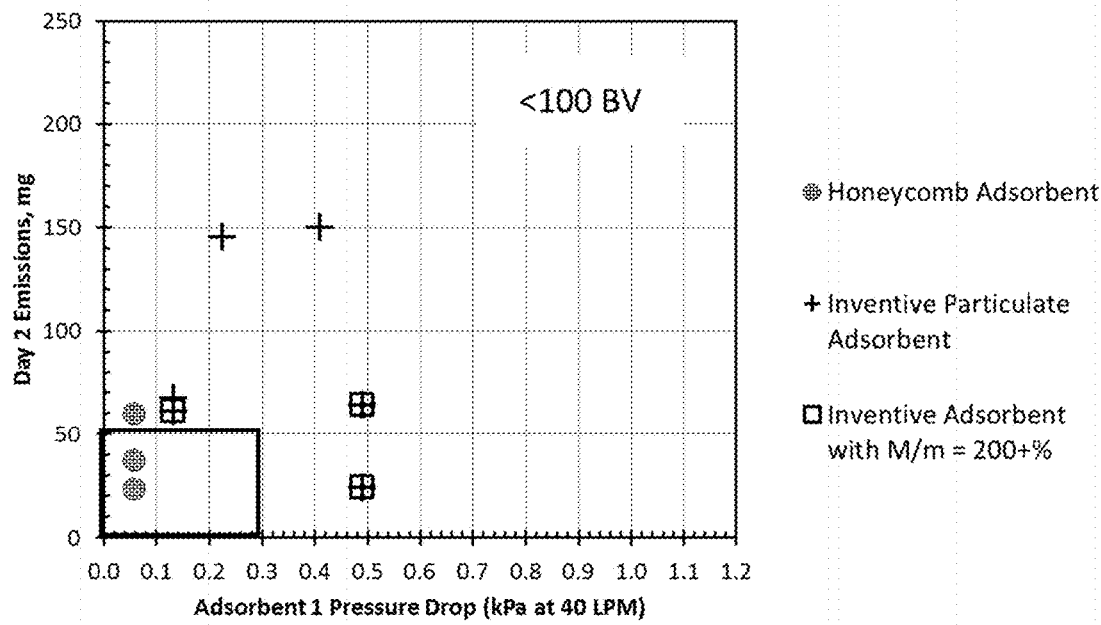
FIG. 31 shows the examples from FIG. 26 where <100 BV and <210 liter level of purge was applied after the 40 g/hr butane loading step.
Figure 32:
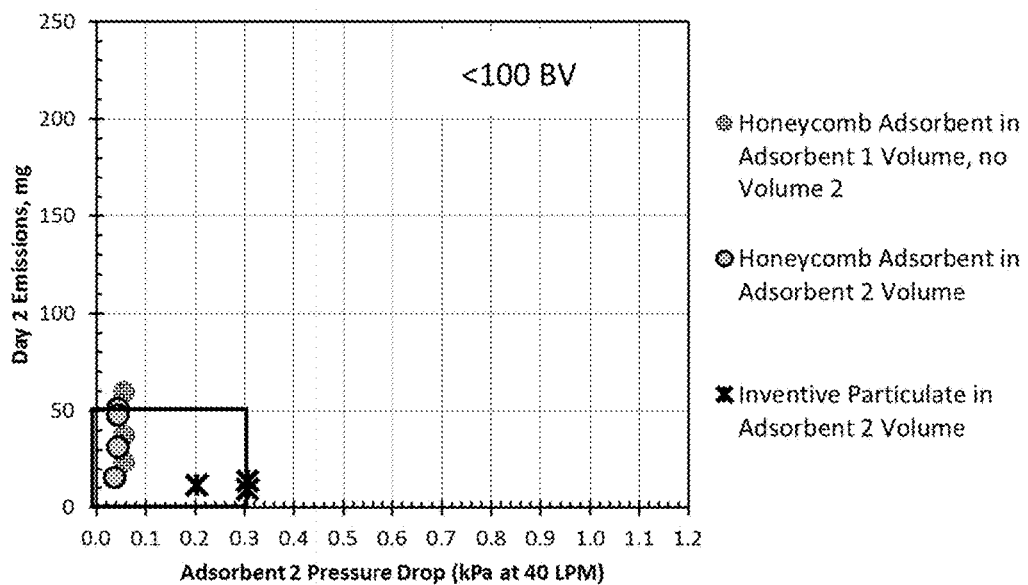
FIG. 32 shows that when a second chamber is added, which comprises inventive examples in a bed ("Adsorbent 2"), the system emissions shows low flow restriction and low emissions.
Figure 33:
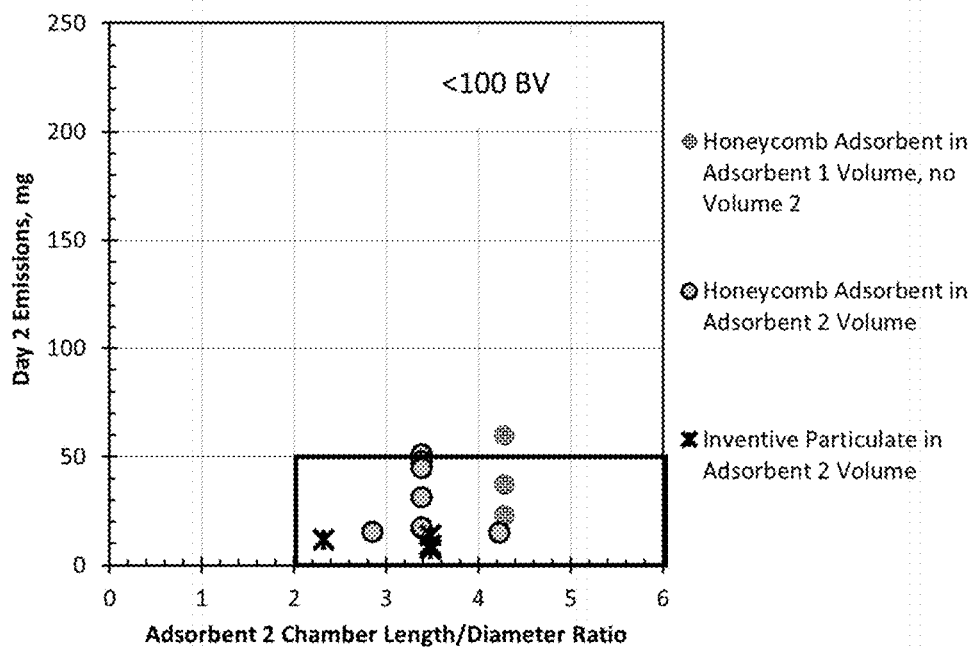
FIG. 33 shows two-day DBL emissions under low purge conditions (i.e., <100 BV) for the vent-side particulate adsorbent volumes as described herein contained in Adsorbent 2 chamber with L/D proportions similar to those of the carbon honeycombs, with a shift to a lower L/D value.
Figure 34:
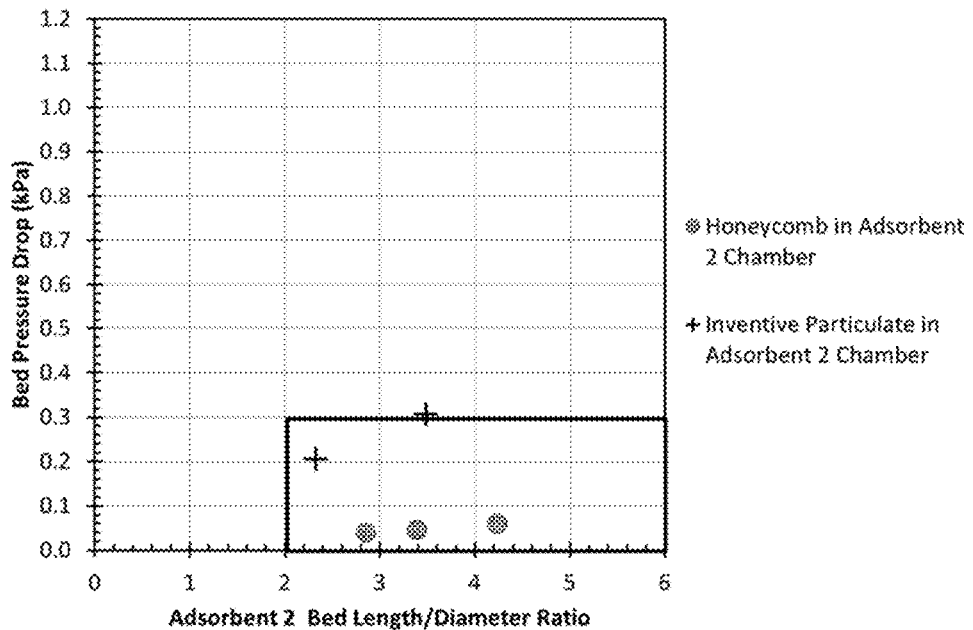
FIG. 34 shows bed pressure drop for the exemplary or inventive vent-side particulate adsorbent volumes of FIGS. 32 and 33 contained in Adsorbent 2 chamber with L/D proportions similar to those of the carbon honeycombs.

The versatility of the inventive examples is shown by their performance under the especially challenging conditions of low purge. For example, U.S. Pat. No. 9,732,649 teaches that control of DBL emissions to very low levels under low purge conditions of less than 100 BV applied after the 40 g/hr butane loading step, or of less than 210 liters purge, can be difficult as tested under BETP test protocol. Under those challenges of low purge, FIG. 31 shows the examples from FIG. 26 filtered for the examples where that <100 BV and <210 liter level of purge was applied after the 40 g/hr butane loading step, where all examples in FIGS. 26 and 31 had only one vent-side adsorbent volume external to the main canister. FIG. 32 shows that when an additional vent-side particulate was added in a bed ("Adsorbent 2"), low system emissions with the low flow restriction is observed. As shown in FIGS. 33 and 34, the inventive particulates were contained as a bed in an Adsorbent 2 chamber with L/D proportions similar to those of the carbon honeycombs. The shift to a lower L/D value reflects the lack of a space-consuming and cross-sectional area-limiting sealing and retaining o-ring, or similar sealant that is otherwise required for a carbon honeycomb. Significantly, the inventive particulate bed of Adsorbent 2 in examples 107-110 that resulted in the low emissions of these canister systems under low purge conditions had pellet strength of 51 even with its high M/m ratio of 260%.

For this type 4 main canister the very low DBL emissions under low purge conditions was obtained for combinations of an inventive pellet adsorbent in combination with a particular 35×100 carbon honeycomb in subsequent adsorbent volumes. With the 35×100 carbon honeycomb as the final adsorbent volume towards the system vent (canister system in example 106), the day 2 DBL emissions were 15 mg. However, with the inventive pellets filling that final chamber containing as a 43×100 Adsorbent 2 (canister system in example 107), the day 2 DBL emissions were even lower, at 12 mg. This result is surprising because conventional wisdom suggested the benefits of a monotonically declining gradation in working capacity towards the system atmosphere vent as most beneficial to DBL emissions especially for attaining <20 mg under a low purge condition. The present disclosure provides new options with a vent-side particulate adsorbent fill to achieve that result, including, e.g., with only one adsorbent volume in the canister system containing a carbon honeycomb rather than in multiple volumes with flexibility of where that particulate volume may be placed, with particulate porosity properties that had been taught against yet are now shown to be of superior DBL emission performance. The implication and opportunity for canister system design, for example, is the advantage of being able to take an existing canister system, designed with multiple in-series adsorbent volumes accommodating carbon honeycombs at the vent-side, and, having the flexibility to opt for a vent-side particulate adsorbent solution in one or more of these volumes without having to redesign and retool the system, and still getting the desired DBL emissions performance outcome within total system pressure drop constraints.

Figure 35:
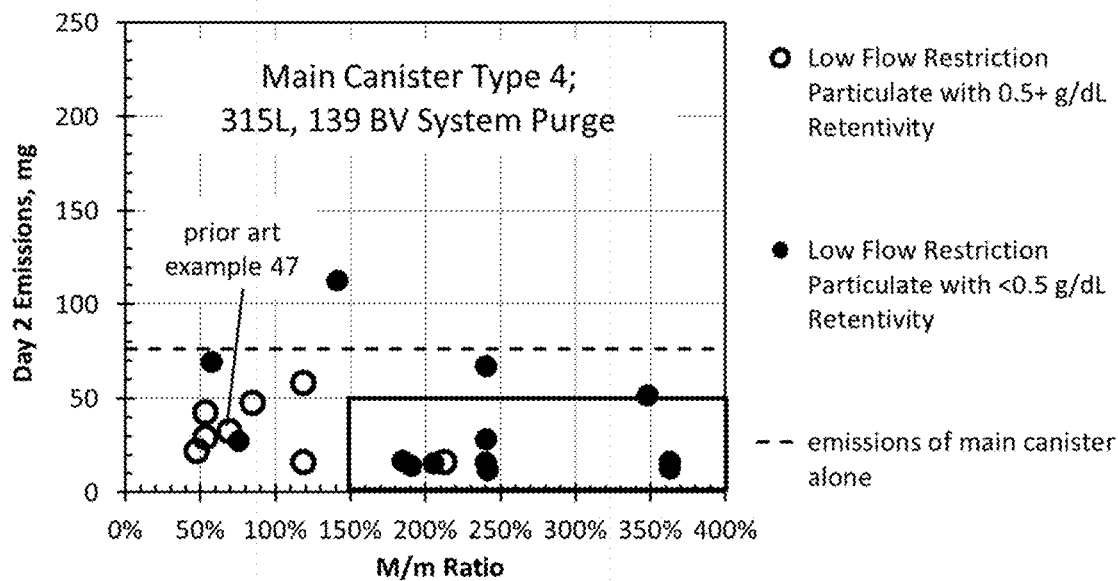
FIG. 35 shows two-day DBL emissions under 315 L (139 BV) purge conditions for the inventive particulates having M/m ratio of >150%.
Figure 36:
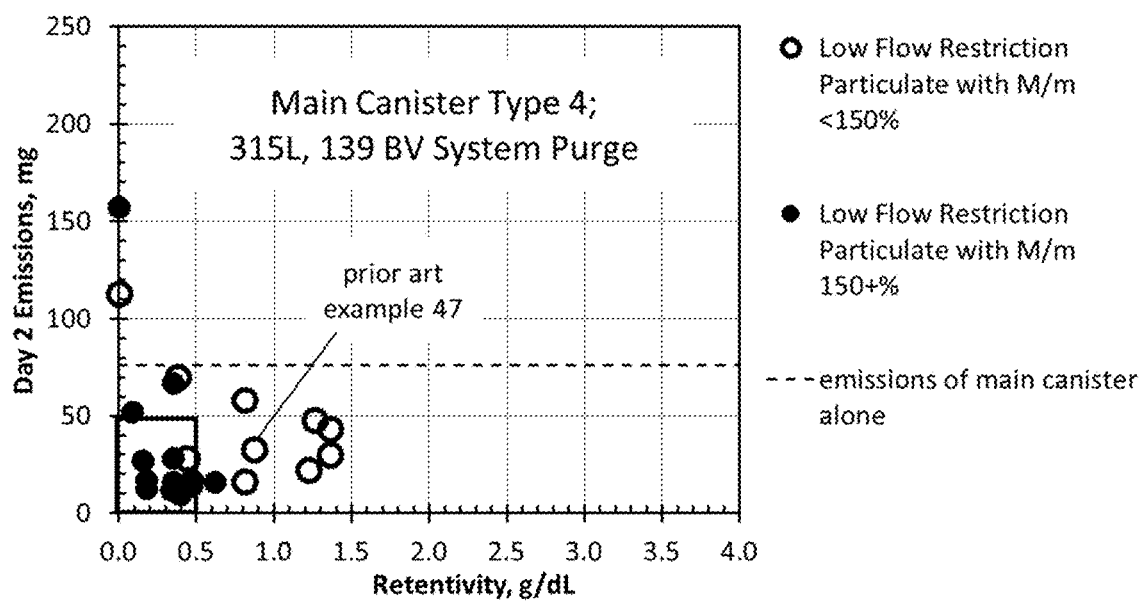
FIG. 36 shows two-day DBL emissions under 315 L (139 BV) purge conditions for the inventive particulates having retentivity of less than about 0.5 g/dL.
Figure 37:
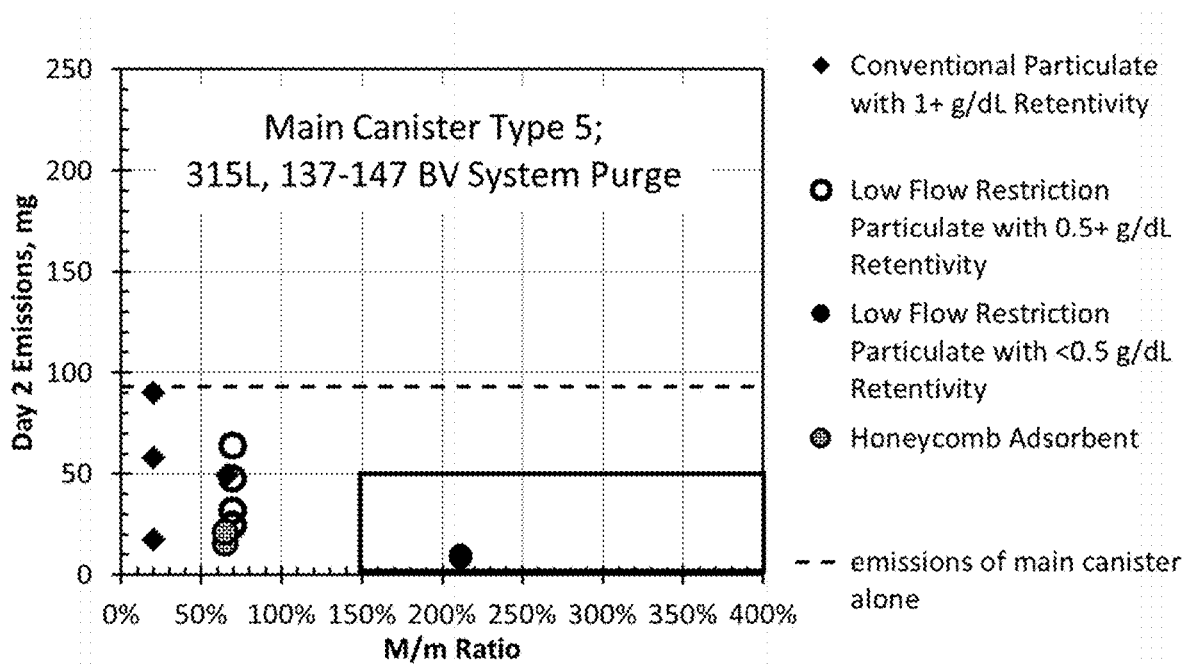
FIG. 37 shows two-day DBL emissions under 315 L (137-147 BV) purge conditions for the inventive particulates having M/m ratio of >150%.
Figure 38:
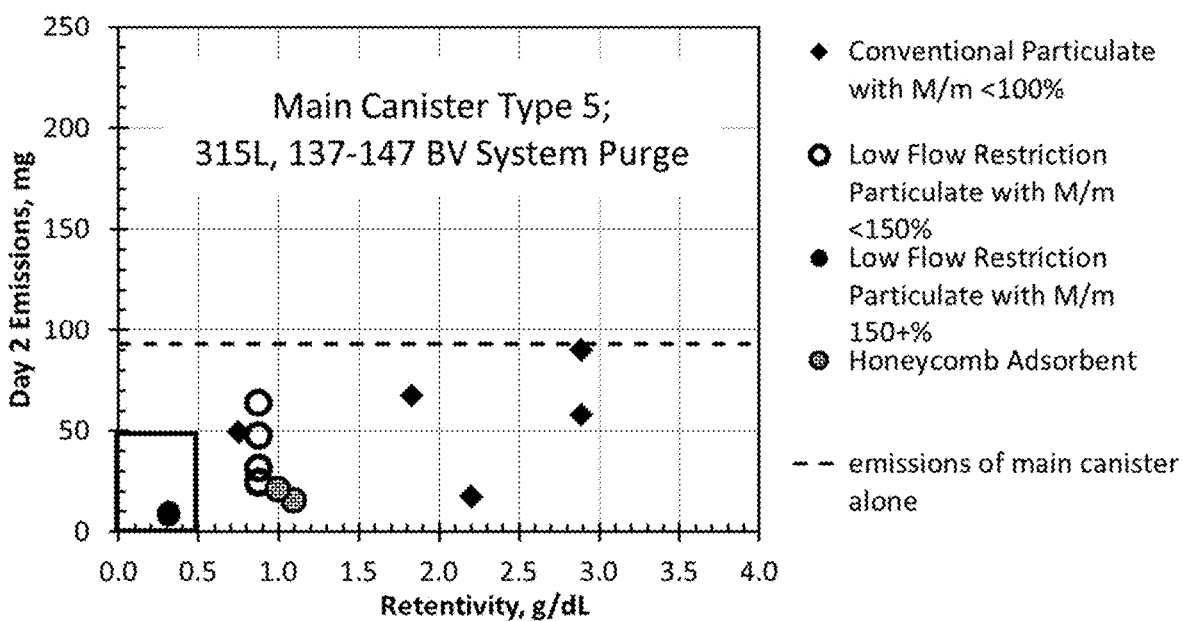
FIG. 38 shows two-day DBL emissions under 315 L (137-147 BV) purge conditions for the inventive particulates having retentivity of less than about 0.5 g/dL.
Figure 44:
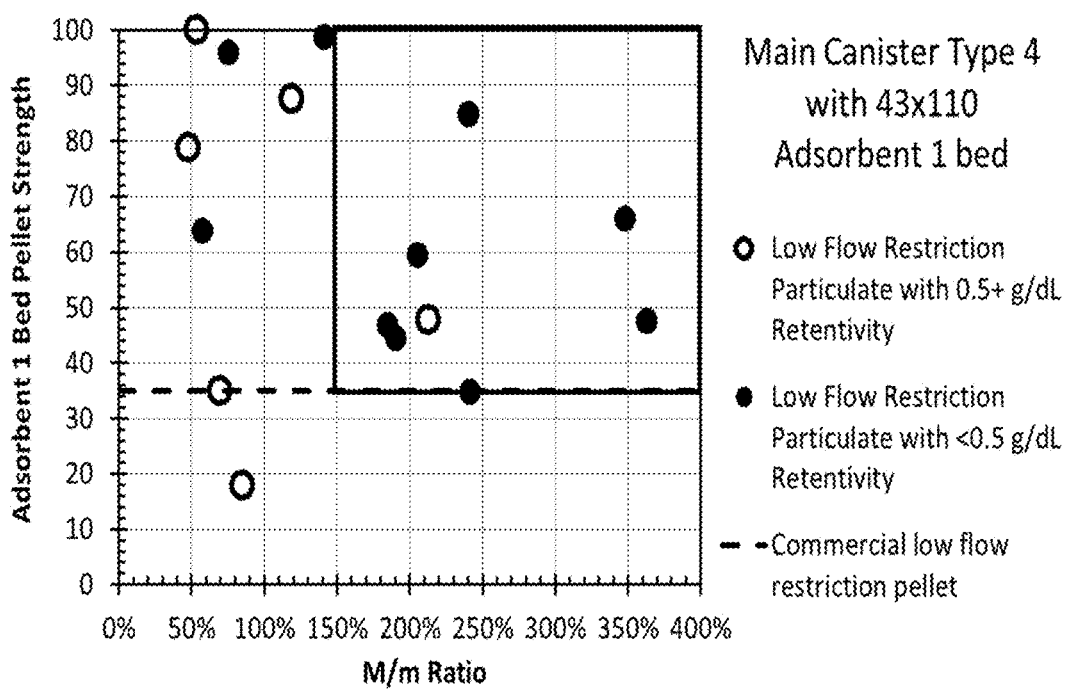
FIG. 44 illustrates the pellet strengths for exemplary low flow restriction particulate adsorbents in the examples of FIGS. 35 and 36.

In certain embodiments, the description provides emission control canister systems including a vent-side particulate adsorbent with the M/m greater than 150%, and a butane retentivity property of <0.5 g/dL where low DBL emissions result, accompanied by moderate flow restriction of the vent-side adsorbent volume. For example, a type 4 main canister (2.1 L carbon fill) was outfitted fitted on its vent-side with a chamber containing a 43 mm diameter by 100 mm long adsorbent bed of low flow restriction hollow pellet particulates, and the system was cycled with a 315 L purge applied after the 40 g/hr butane loading step, or a 139 BV purge for that total adsorbent volume (see examples 36-62). The 2 day DBL emissions for the base canister was 76 mg (e.g., example 28; the main canister tested without the 43×100 external vent-side chamber, so the 315 L purge was 150 BV for that 2.1 L of total adsorbent bed). The L/D ratio of the adsorbent volume in the auxiliary chamber located on the canister vent-side was 2.56. The flow restriction of the pellet bed in that chamber was 0.22 kPa at 40 lpm flow (10.0 Pa/cm at 46 cm/s apparent linear air flow velocity), except for the higher, 0.26 kPa (13.3 Pa/cm flow restriction property at 46 cm/s apparent linear air flow velocity) for the Kuraray MPAC1 prior art pellet in example 47. As shown in FIGS. 35 and 36, this canister system has multiple inventive examples with M/m of 150+% that have emissions of <20 mg, and some examples at <10 mg when the butane retentivity property of the low flow restriction pellets was <0.5 g/dL. FIG. 44 illustrates the pellet strengths for inventive low flow restriction particulate adsorbents in the examples of FIGS. 35 and 36. The inventive low flow restriction particulates of M/m of 150+%, including M/m properties that are well above 200+%, and of butane retentivity properties below 0.5 g/dL, have pellet strengths at, and frequently well above, 35.

Figure 39:
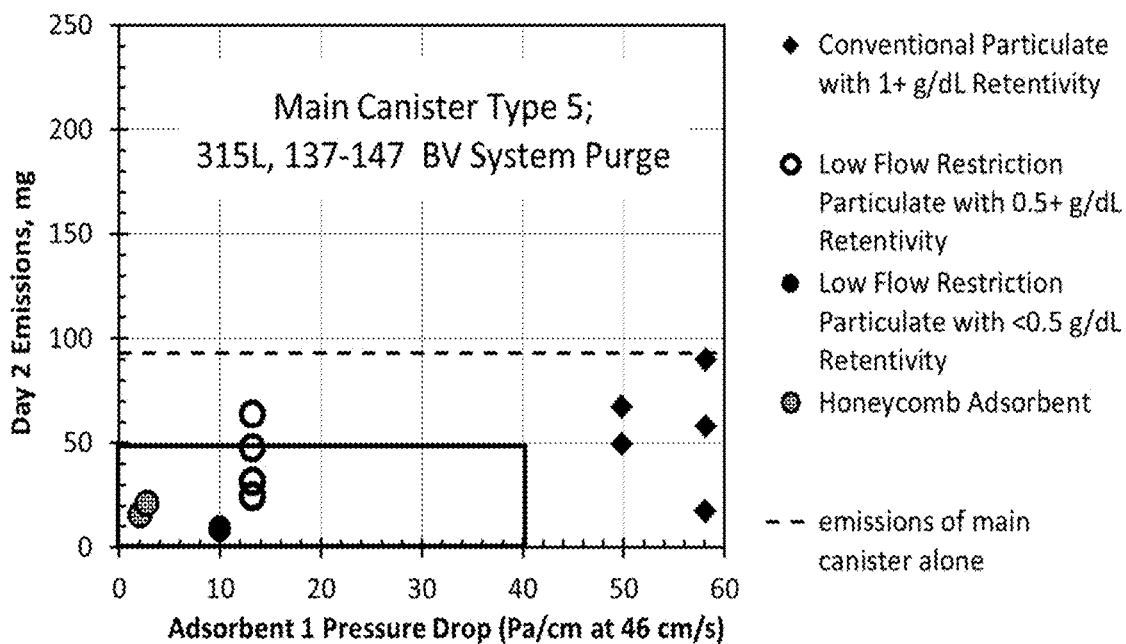
FIG. 39 shows the low flow restriction properties for an exemplary vent-side low flow restriction particulate in an emission canister system compared with carbon honeycombs and conventional particulate.
Figure 40:
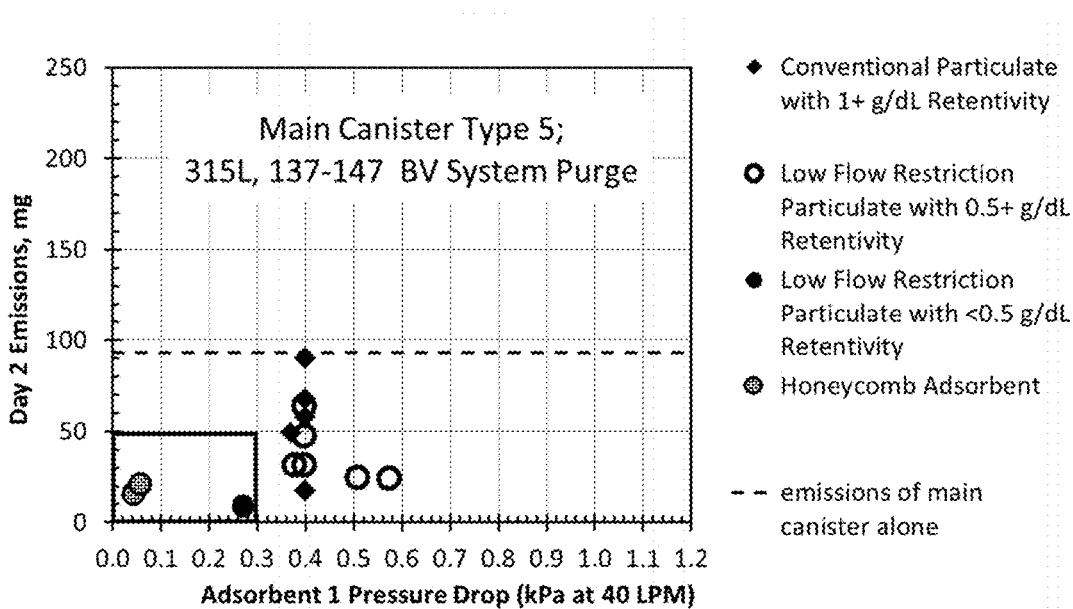
FIG. 40 shows the low flow restriction properties for an exemplary vent-side low flow restriction particulate in an emission canister system compared with carbon honeycombs and conventional particulate.
Figure 41:
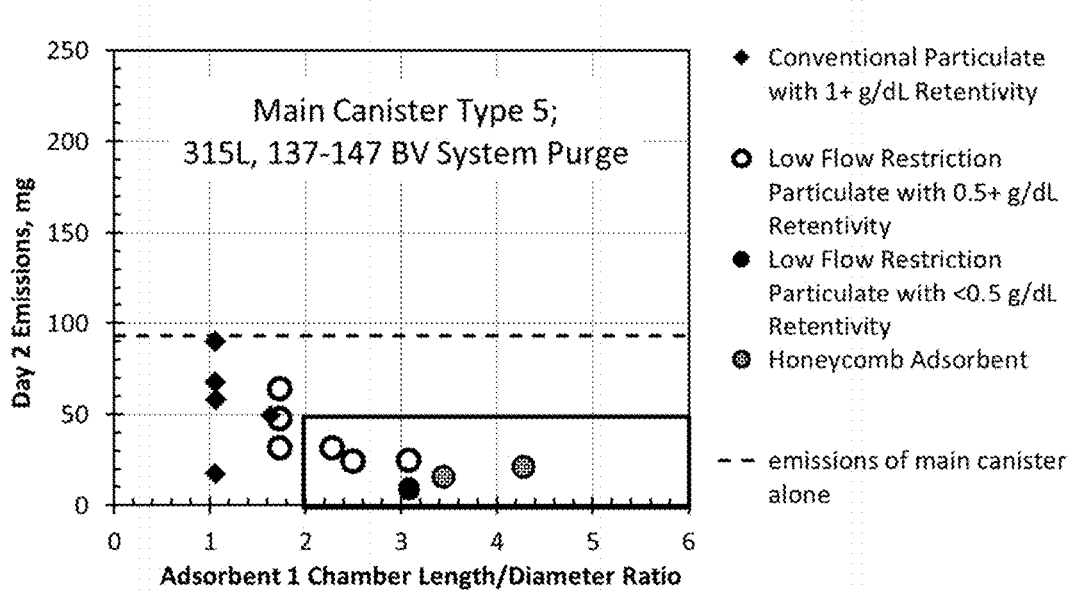
FIG. 41 illustrates high performing exemplary vent-side particulate adsorbent volume with high chamber L/D of greater than 2 compared with carbon honeycombs and conventional particulate.

Another embodiment is shown with a type 5 main canister (2.1 L carbon fill) which was outfitted fitted on its vent-side with an Adsorbent 1 auxiliary chamber. The 2 day DBL emissions for the base canister was 93 mg (e.g., example 63; the main canister tested without the auxiliary Adsorbent 1 chamber, so the 315 L purge was 150 BV for that 2.1 L of total adsorbent bed). The auxiliary chamber consisted of various size Adsorbent 1 beds of conventional pellets, low flow restriction hollow pellet particulates, or carbon honeycombs. The canister system was cycled with a 315 L purge applied after the 40 g/hr butane loading step, or a 137-147 BV purge for the total nominal adsorbent volumes. All examples were purged with the same 315 L, but the BV value depended on the size of the vent-side chamber external to the main canister which varied among the examples (see examples 64-69, 76, 79, and 88-92). Similar to the examples in FIGS. 35 and 36, FIGS. 37 and 38 show, of the tested adsorbents that include both particulate and honeycomb forms, the lowest emissions was by a flow restriction particulate adsorbent with an M/m property of greater than 150% and butane retentivity of less than 0.5 g/dL. This material was tested in replicate (examples 86 and 87), because of its surprising low bleed emission performance relative to the other tested particulate and honeycomb materials tested in the Adsorbent 1 volumes. The low flow restriction properties for that low flow restriction particulate (10 Pa/cm at 46 cm/s apparent linear air flow velocity in FIG. 39), enabled a reasonably low flow restriction of the Adsorbent 1 bed (0.72 kPa at 40 lpm in FIG. 40) with dimensions of 43 mm diameter with 132 mm length, therefore enabling a favorable bed L/D of just over 3 (see FIG. 41) that contributed to the enhanced bleed emissions control.

Exemplary Embodiments

In an aspect, the disclosure provides an evaporative emission control canister system comprising one or more canisters having a plurality of chambers, each chamber defining a volume, which are in fluid communication allowing a fluid or vapor to flow directionally from one chamber to the next, and at least one chamber comprises at least one particulate adsorbent volume, wherein the at least one particulate adsorbent volume includes a particulate adsorbent having microscopic pores with a diameter of less than about 100 nm, macroscopic pores having a diameter of about 100-100,000 nm, and a ratio of a volume of the macroscopic pores to a volume of the microscopic pores that is greater than about 150%, and wherein the particulate adsorbent volume has a flow restriction property of less than 40 Pa/cm under conditions of 46 cm/s apparent linear air flow velocity applied to a 43 mm diameter bed of the particulate adsorbent material.

In an additional aspect, the disclosure provides an evaporative emission control canister system including one or more canisters comprising at least one fuel-side adsorbent volume; and at least one vent-side particulate adsorbent volume comprising a particulate adsorbent having microscopic pores with a diameter of less than about 100 nm, macroscopic pores having a diameter of about 100-100,000 nm, and a ratio of a volume of the macroscopic pores to a volume of the microscopic pores that is greater than about 150%, wherein the vent-side adsorbent volume has a flow restriction property of less than 40 Pa/cm pressure drop when a 46 cm/s apparent linear air flow velocity is applied to a 43 mm diameter bed of the vent-side particulate adsorbent volume.

In a further aspect, the disclosure provides an evaporative emission control canister system including one or more canisters comprising at least one fuel-side adsorbent volume; and at least one vent-side low retentivity particulate adsorbent volume comprising a particulate adsorbent having microscopic pores with a diameter of less than about 100 nm, macroscopic pores having a diameter of about 100-100,000 nm, and a ratio of a volume of the macroscopic pores to a volume of the microscopic pores that is greater than about 150%, wherein the at least one vent-side low retentivity particulate adsorbent volume has a butane retentivity of less than 0.5 g/dL.

In an additional aspect, the disclosure provides an evaporative emission control canister system including one or more canisters comprising at least one fuel-side adsorbent volume; and at least one vent-side low retentivity particulate adsorbent volume comprising a particulate adsorbent having microscopic pores with a diameter of less than about 100 nm, macroscopic pores having a diameter of about 100-100,000 nm, a ratio of a volume of the macroscopic pores to a volume of the microscopic pores that is greater than about 200%, and wherein the at least one vent-side particulate adsorbent volume has a butane retentivity of less than 1 g/dL.

In another aspect, the disclosure provides an evaporative emission control canister system comprising a fuel tank for storing fuel; an engine having an air induction system and adapted to consume the fuel; an evaporative emission control canister system including one or more canisters comprising a plurality of adsorbent volumes including at least one fuel-side adsorbent volume; and at least one vent-side particulate adsorbent volume comprising a particulate adsorbent having microscopic pores with a diameter of less than about 100 nm, macroscopic pores having a diameter of about 100-100,000 nm, a ratio of a volume of the macroscopic pores to a volume of the microscopic pores that is greater than about 150%, and a retentivity of about 0.5 g/dL or less; a fuel vapor inlet conduit connecting the evaporative emission control canister system to the fuel tank; a fuel vapor purge conduit connecting the evaporative emission control canister system to the air induction system of the engine; and a vent port for venting the evaporative emission control canister system and for admission of purge air to the evaporative emission control canister system, wherein the evaporative emission control canister system is defined by: a fuel vapor flow path from the fuel vapor inlet conduit through a plurality of adsorbents to the vent port, and an air flow path from the vent port through the plurality of adsorbent volumes and the fuel vapor purge outlet.

In an additional aspect, the disclosure provides methods for reducing fuel vapor emissions in an evaporative emission control system, the method comprising contacting the fuel vapor with a plurality of adsorbent volumes including at least one fuel-side adsorbent volume; and at least one vent-side particulate adsorbent volume comprising a particulate adsorbent having microscopic pores with a diameter of less than about 100 nm, macroscopic pores having a diameter of about 100 nm or greater, a ratio of a volume of the macroscopic pores to a volume of the microscopic pores that is greater than about 150%, and a retentivity of about 1.0 g/dL or less.

In further aspects, the disclosure provides, an evaporative emission control canister system including one or more canisters comprising at least one fuel-side adsorbent volume comprising a particulate adsorbent having microscopic pores with a diameter of less than about 100 nm, macroscopic pores having a diameter of about 100-100,000 nm, a ratio of a volume of the macroscopic pores to a volume of the microscopic pores that is greater than about 150%, and a retentivity of less than about 1.0 g/dL; and at least one vent-side particulate adsorbent volume comprising a particulate adsorbent having microscopic pores with a diameter of less than about 100 nm, macroscopic pores having a diameter of about 100-100,000 nm, a ratio of a volume of the macroscopic pores to a volume of the microscopic pores that is greater than about 150%, wherein the at least one vent-side particulate adsorbent volume has a butane retentivity of less than 1.0 g/dL.

In any of the aspects or embodiments described herein, the at least one particulate adsorbent volume, at least one vent-side particulate adsorbent volume or at least one vent-side low retentivity particulate volume has at least one of: a flow restriction of less than 0.3 kPa under 40 lpm air flow, a flow restriction property of less than 40 Pa/cm pressure drop when a 46 cm/s apparent linear air flow velocity is applied to a 43 mm diameter bed, a length to diameter ratio of 2 or more, or a combination thereof.

In any of the aspects or embodiments described herein, the at least one particulate adsorbent volume, at least one vent-side particulate adsorbent volume or at least one vent-side low retentivity particulate volume has at least one of: (i) a retentivity of less than 1.0 g/dL, (ii) a ratio of a volume of the macroscopic pores to a volume of the microscopic pores that is greater than about 200%, (iii) a length to diameter ratio of 2 or more or (iv) a combination thereof.

In any of the aspects or embodiments described herein, the evaporative emission control canister system has two-day diurnal breathing loss (DBL) of no more than 50 mg at no more than 315 liters of purge applied after a 40 g/hr butane loading step as determined by the 2012 California Bleed Emissions Test Procedure (BETP).

In any of the aspects or embodiments described herein, the evaporative emission control canister system has two-day diurnal breathing loss (DBL) of no more than 20 mg at no more than 210 liters of purge applied after a 40 g/hr butane loading step as determined by the 2012 California Bleed Emissions Test Procedure (BETP).

In any of the aspects or embodiments described herein, the evaporative emission control canister system has two-day diurnal breathing loss (DBL) of no more than 50 mg at no more than 150 bed volumes of purge applied after a 40 g/hr butane loading step as determined by the 2012 California Bleed Emissions Test Procedure (BETP).

In any of the aspects or embodiments described herein, the evaporative emission control canister system has two-day diurnal breathing loss (DBL) of no more than 20 mg at no more than 100 bed volumes of purge applied after a 40 g/hr butane loading step as determined by the 2012 California Bleed Emissions Test Procedure (BETP).

In any of the aspects or embodiments described herein, the evaporative emission control canister system comprises at least one fuel-side adsorbent volume, at least one vent-side adsorbent volume or both.

In any of the aspects or embodiments described herein, the adsorbent volumes are located within a single canister or within a plurality of canisters that are connected to permit sequential contact by the fuel vapor.

In any of the aspects or embodiments described herein, the at least one particulate adsorbent volume, at least one vent-side particulate adsorbent volume or at least one vent-side low retentivity particulate volume, the at least one vent-side subsequent adsorbent volume or a combination thereof has a nominal BWC of less than 8 g/dL, a nominal IAC at 25 C of less than 35 g/L between vapor concentrations of 5 vol % and 50 vol % n-butane, or both.

In any of the aspects or embodiments described herein, the at least one vent-side subsequent adsorbent volume is an activated carbon honeycomb.

In any of the aspects or embodiments described herein, the at least one particulate adsorbent volume, at least one vent-side particulate adsorbent volume or at least one vent-side low retentivity particulate volume, has a retentivity of less than 0.5 g/dL.

In any of the aspects or embodiments described herein, the fuel-side adsorbent volume has a nominal butane working capacity of at least 8 g/dL (e.g., at least 10 g/L), a nominal incremental adsorption capacity (IAC) at 25° C. of at least 35 g/L between vapor concentrations of 5 vol % and 50 vol % n-butane, or both In any of the aspects or embodiments described herein, the at least one fuel-side adsorbent volume, the at least one particulate adsorbent volume, at least one vent-side particulate adsorbent volume or at least one vent-side low retentivity particulate volume, the at least one vent-side subsequent adsorbent volume, or a combination thereof includes an adsorbent material selected from the group consisting of activated carbon, carbon charcoal, zeolites, clays, porous polymers, porous alumina, porous silica, molecular sieves, ball clay, kaolin, titania, ceria, and combinations thereof.

In any of the aspects or embodiments described herein, the at least one vent-side subsequent adsorbent volume is an activated carbon honeycomb.

In any of the aspects or embodiments described herein, the activated carbon is derived from a material including a member selected from the group consisting of wood, wood dust, wood flour, cotton linters, peat, coal, coconut, lignite, carbohydrates, petroleum pitch, petroleum coke, coal tar pitch, fruit pits, fruit stones, nut shells, nut pits, sawdust, palm, vegetables, synthetic polymer, natural polymer, lignocellulosic material, and combinations thereof.

In any of the aspects or embodiments described herein, the form of the adsorbent includes a member selected from the group consisting of granular, pellet, spherical, honeycomb, monolith, pelletized cylindrical, particulate media of uniform shape, particulate media of non-uniform shape, structured media of extruded form, structured media of wound form, structured media of folded form, structured media of pleated form, structured media of corrugated form, structured media of poured form, structured media of bonded form, non-wovens, wovens, sheet, paper, foam, hollow-cylinder, star, twisted spiral, asterisk, configured ribbons, and combinations thereof.

In any of the aspects or embodiments described herein, the adsorbent volumes comprise a volumetric diluent. In any of the aspects or embodiments described herein, the volumetric diluent includes a member selected from the group consisting of inert spacer particles, trapped air spaces, foams, fibers, screens, and combinations thereof.

In any of the aspects or embodiments described herein, the canister system further comprises a heat unit.

While several embodiments of the invention have been shown and described herein, it will be understood that such embodiments are provided by way of example only. Numerous variations, changes and substitutions will occur to those skilled in the art without departing from the spirit of the invention. Rather, the present disclosure is to cover all modifications, equivalents, and alternatives falling within the scope of the present disclosure as defined by the following appended claims and their legal equivalents. Accordingly, it is intended that the description and appended claims cover all such variations as fall within the spirit and scope of the invention.

In one embodiment, described is an evaporative emission control canister system comprising one or more canisters having a plurality of chambers, each chamber defining a volume, which are in fluid communication allowing a fluid or vapor to flow directionally from one chamber to the next, and at least one chamber comprises at least one particulate adsorbent volume, wherein the at least one particulate adsorbent volume includes a particulate adsorbent having microscopic pores with a diameter of less than about 100 nm, macroscopic pores having a diameter of about 100-100,000 nm, and a ratio of a volume of the macroscopic pores to a volume of the microscopic pores that is greater than about 150%, and wherein the particulate adsorbent volume has a flow restriction property of less than 40 Pa/cm under conditions of 46 cm/s apparent linear air flow velocity applied to a 43 mm diameter bed of the particulate adsorbent material. In certain embodiments, the at least one particulate adsorbent volume has a flow restriction of less than 0.3 kPa under 40 lpm air flow, a length to diameter ratio of 2 or more, or both. In certain embodiments, the particulate adsorbent volume has at least one of: (i) a retentivity of less than 1.0 g/dL, (ii) a ratio of a volume of the macroscopic pores to a volume of the microscopic pores that is greater than about 200%, or (iii) a length to diameter ratio of 2 or more or (iv) a combination thereof. In certain embodiments, the particulate adsorbent volume has a nominal butane working capacity of at least 8 g/dL (e.g., at least 10 g/L), a nominal incremental adsorption capacity (IAC) at 25° C. of at least 35 g/L between vapor concentrations of 5 vol % and 50 vol % n-butane, or both. In certain embodiments, the two-day diurnal breathing loss (DBL) is no more than 50 mg at no more than 315 liters of purge applied after a 40 g/hr butane loading step as determined by the 2012 California Bleed Emissions Test Procedure (BETP). In certain embodiments, the two-day DBL is no more than 20 mg at no more than 210 liters of purge applied after a 40 g/hr butane loading step as determined by the 2012 California Bleed Emissions Test Procedure (BETP). In certain embodiments, the two-day DBL is no more than 50 mg at no more than 150 bed volumes of purge applied after a 40 g/hr butane loading step as determined by the 2012 California Bleed Emissions Test Procedure (BETP). In certain embodiments, the two-day DBL is no more than 20 mg at no more than 100 bed volumes of purge applied after a 40 g/hr butane loading step as determined by the 2012 California Bleed Emissions Test Procedure (BETP). In certain embodiments, the evaporative emission control canister system comprises at least one fuel-side particulate adsorbent volume, at least one vent-side subsequent adsorbent volumes or both. In certain embodiments, the particulate adsorbent volumes are located within a single canister or within a plurality of canisters that are connected to permit sequential contact by the fuel vapor. In certain embodiments, the particulate adsorbent volume, the at least one vent-side subsequent adsorbent volume or both has a nominal BWC of less than 8 g/dL, a nominal IAC at 25 C of less than 35 g/L between vapor concentrations of 5 vol % and 50 vol % n-butane, or both. In certain embodiments, the at least one fuel-side adsorbent volume, the at least one vent-side particulate adsorbent volume, the at least one vent-side subsequent adsorbent volume, or a combination thereof includes an adsorbent material selected from the group consisting of activated carbon, carbon charcoal, zeolites, clays, porous polymers, porous alumina, porous silica, molecular sieves, kaolin, titania, ceria, and combinations thereof. In certain embodiments, the at least one vent-side subsequent adsorbent volume is an activated carbon honeycomb. In certain embodiments, the activated carbon is derived from a material including a member selected from the group consisting of wood, wood dust, wood flour, cotton linters, peat, coal, coconut, lignite, carbohydrates, petroleum pitch, petroleum coke, coal tar pitch, fruit pits, fruit stones, nut shells, nut pits, sawdust, palm, vegetables, synthetic polymer, natural polymer, lignocellulosic material, and combinations thereof. In certain embodiments, the form of the adsorbent in the at least one fuel-side adsorbent volume, the at least one vent-side subsequent adsorbent volume, or both includes a member selected from the group consisting of granular, pellet, spherical, honeycomb, monolith, pelletized cylindrical, particulate media of uniform shape, particulate media of non-uniform shape, structured media of extruded form, structured media of wound form, structured media of folded form, structured media of pleated form, structured media of corrugated form, structured media of poured form, structured media of bonded form, non-wovens, wovens, sheet, paper, foam, hollow-cylinder, star, twisted spiral, asterisk, configured ribbons, and combinations thereof. In certain embodiments, the at least one vent-side subsequent adsorbent volume includes a volumetric diluent. In certain embodiments, the evaporative emission control system comprises a heat unit. In certain embodiments, the vent-side particulate adsorbent volume has a retentivity of less than 0.5 g/dL.

In an additional embodiment, the description provides an evaporative emission control canister system comprising: a fuel tank for storing fuel; an engine having an air induction system and adapted to consume the fuel; an evaporative emission control canister system including one or more canisters comprising a plurality of adsorbent volumes including at least one fuel-side adsorbent volume; and at least one vent-side particulate adsorbent volume comprising a particulate adsorbent having microscopic pores with a diameter of less than about 100 nm, macroscopic pores having a diameter of about 100-100,000 nm, a ratio of a volume of the macroscopic pores to a volume of the microscopic pores that is greater than about 150%, and a retentivity of about 0.5 g/dL or less; a fuel vapor inlet conduit connecting the evaporative emission control canister system to the fuel tank; a fuel vapor purge conduit connecting the evaporative emission control canister system to the air induction system of the engine; and a vent port for venting the evaporative emission control canister system and for admission of purge air to the evaporative emission control canister system, wherein the evaporative emission control canister system is defined by: a fuel vapor flow path from the fuel vapor inlet conduit through a plurality of adsorbents to the vent port, and an air flow path from the vent port through the plurality of adsorbent volumes and the fuel vapor purge outlet. In certain embodiments, the evaporative emission control system further comprises at least one vent-side subsequent adsorbent volume upstream, downstream or both from the vent-side particulate adsorbent volume.

The contents of all references, patents, pending patent applications and published patents, cited throughout this application are hereby expressly incorporated by reference.

Those skilled in the art will recognize, or be able to ascertain using no more than routine experimentation, many equivalents to the specific embodiments of the invention described herein. Such equivalents are intended to be encompassed by the following claims. It is understood that the detailed examples and embodiments described herein are given by way of example for illustrative purposes only, and are in no way considered to be limiting to the invention. Various modifications or changes in light thereof will be suggested to persons skilled in the art and are included within the spirit and purview of this application and are considered within the scope of the appended claims. For example, the relative quantities of the ingredients may be varied to optimize the desired effects, additional ingredients may be added, and/or similar ingredients may be substituted for one or more of the ingredients described. Additional advantageous features and functionalities associated with the systems, methods, and processes of the present invention will be apparent from the appended claims. Moreover, those skilled in the art will recognize, or be able to ascertain using no more than routine experimentation, many equivalents to the specific embodiments of the invention described herein. Such equivalents are intended to be encompassed by the following claims.

What is claimed is:

1. An adsorbent material comprising:
   a particulate activated carbon material having microscopic pores with a diameter of less than about 100 nm, macroscopic pores having a diameter of about 100-100,000 nm, and a ratio of the volume of the macroscopic pores to the volume of the microscopic pores that is greater than about 160%,
   wherein the particulate activated carbon material has at least one of (i) a nominal butane working capacity (BWC) of <8 g/dL, (ii) a butane retentivity of less than about 1 g/dL or (iii) a combination of (i) and (ii).

2. The adsorbent material of claim 1, wherein the adsorbent has a butane retentivity of 1.0 g/dL or less.

3. The adsorbent material of claim 1, wherein the adsorbent has a butane retentivity of about 0.25 to 1.0 g/dL.

4. The adsorbent material of claim 1, wherein the adsorbent further includes at least one of porous polymers, porous alumina, clay, porous silica, kaolin, zeolites, metal organic frameworks, titania, ceria, or a combination thereof.

5. The adsorbent material of claim 1, wherein the adsorbent has a micropore volume as determined by BJH of about 0.5 cc/g or less.

6. The adsorbent material of claim 1, wherein the adsorbent comprises a body defining an exterior surface and a hollow shape or morphology.

7. The adsorbent material of claim 6, wherein the morphology is at least one of substantially a cylinder, substantially an oval prism, substantially a sphere, substantially a cube, substantially an elliptical prism, substantially a rectangular prism, a trilobe prism, a three-dimensional spiral, or a combination thereof.

8. The adsorbent material of claim 1, wherein the particulate activated carbon material has a cross-sectional width of about 1 mm to about 20 mm.

9. The adsorbent material of claim 1, wherein the adsorbent has a hollow shape in cross-section.

10. The adsorbent material of claim 1, wherein the adsorbent includes at least one cavity in fluid communication with an exterior surface of the adsorbent.

11. The adsorbent material of claim 10, wherein the exterior surface of the adsorbent has a thickness of about 0.1 mm to about 3.0 mm.

12. The adsorbent material of claim 9, wherein at least one of:
   at least one exterior wall of the hollow shape has a thickness in a range of about 0.1 mm to about 1.0 mm;
   the hollow shape has at least one interior wall extending between the at least one exterior wall and having a thickness in a range of about 0.1 mm to about 1.0 mm; or
   a combination thereof.

13. The adsorbent material of claim 12, wherein the thickness of the at least one of the interior wall, the at least one exterior wall or a combination thereof is about 0.3 mm to about 0.8 mm.

14. The adsorbent material of claim 13, wherein the thickness of the at least one of the interior wall, the at least one exterior wall or a combination thereof is about 0.4 mm to about 0.7 mm.

15. The adsorbent material of claim 13, wherein the at least one interior wall extends outward to the at least one exterior wall in at least two directions from a hollow portion of the particulate adsorbent material.

16. The adsorbent material of claim 13, wherein the at least one interior wall extends outward to the at least one exterior wall in at least three directions from a hollow portion of the particulate adsorbent material.

17. The adsorbent material of claim 13, wherein the at least one interior wall extends outward to the at least one exterior wall in at least four directions from a hollow portion of the particulate adsorbent material.

18. The adsorbent material of claim 1, wherein the adsorbent has a length of about 1 mm to about 20 mm.

19. The adsorbent material of claim 1, wherein the activated carbon is derived from at least one material selected from the group consisting of wood, wood dust, wood flour, cotton linters, peat, coal, coconut, lignite, carbohydrates, petroleum pitch, petroleum coke, coal tar pitch, fruit pits, fruit stones, nut shells, nut pits, sawdust, palm, vegetables, synthetic polymer, natural polymer, lignocellulosic material, and combinations thereof.

20. The adsorbent material of claim 4, wherein the clay is at least one of Zeolite clay, Bentonite clay, Montmorillonite clay, Illite clay, French Green clay, Pascalite clay, Redmond clay, Terramin clay, Living clay, Fuller's Earth clay, Ormalite clay, Vitallite clay, Rectorite clay, or a combination thereof.

21. The adsorbent material of claim 1, further comprises at least one of:
   a pore forming material or processing aid that decomposes, solubilizes, sublimates, vaporizes, or melts when heated to a temperature of 100° C. or more;
   a binder;
   a filler; or
   a combination thereof.

22. The adsorbent material of claim 21, wherein the pore forming material or processing aid is a cellulose derivative.

23. The adsorbent material of claim 21, wherein the pore forming material or processing aid is methylcellulose.

24. The adsorbent material of claim 21, wherein the pore forming material or processing aid sublimates, vaporizes, chemically decomposes, solubilizes or melts when heated to a temperature in a range of about 125° C. to about 640° C.

25. The adsorbent material of claim 21, wherein the binder is clay or a silicate material.

26. The adsorbent material of claim 25, wherein the clay is at least one of Zeolite clay, Bentonite clay, Montmorillonite clay, Illite clay, French Green clay, Pascalite clay, Redmond clay, Terramin clay, Living clay, Fuller's Earth clay, Ormalite clay, Vitallite clay, Rectorite clay, or a combination thereof.

* * * * *